(12) United States Patent
Merriman et al.

(10) Patent No.: US 9,805,108 B2
(45) Date of Patent: Oct. 31, 2017

(54) LARGE DISTRIBUTED DATABASE CLUSTERING SYSTEMS AND METHODS

(71) Applicant: MongoDB, Inc., New York, NY (US)

(72) Inventors: Dwight Merriman, New York, NY (US); Eliot Horowitz, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 13/929,109

(22) Filed: Jun. 27, 2013

(65) Prior Publication Data

US 2013/0290249 A1    Oct. 31, 2013

Related U.S. Application Data

(63) Continuation-in-part of application No. 12/977,563, filed on Dec. 23, 2010, now Pat. No. 8,572,031, and a continuation-in-part of application No. 13/078,104, filed on Apr. 1, 2011.

(60) Provisional application No. 61/665,042, filed on Jun. 27, 2012, provisional application No. 61/787,275, filed on Mar. 15, 2013.

(51) Int. Cl.
*G06F 17/30* (2006.01)

(52) U.S. Cl.
CPC .. *G06F 17/30584* (2013.01); *G06F 17/30578* (2013.01)

(58) Field of Classification Search
CPC .............. G06F 17/30578; G06F 17/30584
USPC ............... 707/100, 102, 737, 610, 899, 792
See application file for complete search history.

(56) References Cited

U.S. PATENT DOCUMENTS

| 5,551,027 | A |   | 8/1996  | Choy et al.          |
|-----------|---|---|---------|----------------------|
| 5,710,915 | A |   | 1/1998  | McElhiney            |
| 5,999,179 | A | * | 12/1999 | Kekic et al. ...... 715/734 |
| 6,324,540 | B1|   | 11/2001 | Khanna et al.        |
| 6,324,654 | B1|   | 11/2001 | Wahl et al.          |
| 6,363,389 | B1|   | 3/2002  | Lyle et al.          |
| 6,505,187 | B1|   | 1/2003  | Shatdal              |

(Continued)

OTHER PUBLICATIONS

Migrate DB2 application to a partition database, IBM, Apr. 24, 2008.*

(Continued)

*Primary Examiner* — Jeff A Burke
*Assistant Examiner* — Thong Vu
(74) *Attorney, Agent, or Firm* — Wolf, Greenfield & Sacks, P.C.

(57) ABSTRACT

Systems and methods are provided for managing asynchronous replication in a distributed database environment, while providing for scaling of the distributed database. A cluster of nodes can be assigned roles for managing partitions of data within the database and processing database requests. In one embodiment, each cluster includes a node with a primary role to process write operations and mange asynchronous replication of the operations to at least one secondary node. Each cluster or set of nodes can host one or more partitions of database data. Collectively, the cluster or set of nodes define a shard cluster that hosts all the data of the distributed database. Each shard cluster, individual nodes, or sets of nodes can be configured to manage the size of any hosted partitions, splitting database partitions, migrating partitions, and/or managing expansion of shard clusters to encompass new systems.

28 Claims, 22 Drawing Sheets

(56) References Cited

U.S. PATENT DOCUMENTS

| | | | |
|---|---|---|---|
| 6,687,846 B1 | 2/2004 | Adrangi et al. | |
| 6,823,474 B2* | 11/2004 | Kampe | G06F 11/1464 714/13 |
| 7,032,089 B1 | 4/2006 | Ranade et al. | |
| 7,177,866 B2 | 2/2007 | Holenstein et al. | |
| 7,191,299 B1 | 3/2007 | Kekre et al. | |
| 7,246,345 B1 | 7/2007 | Sharma et al. | |
| 7,548,928 B1 | 6/2009 | Dean et al. | |
| 7,567,991 B2 | 7/2009 | Armangau et al. | |
| 7,617,369 B1* | 11/2009 | Bezbaruah et al. | 711/162 |
| 7,647,329 B1* | 1/2010 | Fischman | G06F 17/30094 707/999.1 |
| 7,962,458 B2 | 6/2011 | Holenstein et al. | |
| 8,126,848 B2 | 2/2012 | Wagner | |
| 8,363,961 B1 | 1/2013 | Avidan et al. | |
| 8,386,463 B2 | 2/2013 | Bestgen et al. | |
| 8,392,482 B1* | 3/2013 | McAlister et al. | 707/899 |
| 8,572,031 B2 | 10/2013 | Merriman et al. | |
| 8,843,441 B1 | 9/2014 | Rath et al. | |
| 9,317,576 B2 | 4/2016 | Merriman et al. | |
| 2004/0236743 A1* | 11/2004 | Blaicher et al. | 707/7 |
| 2006/0235905 A1 | 10/2006 | Kapur | |
| 2008/0140971 A1* | 6/2008 | Dankel | G06F 12/0284 711/163 |
| 2008/0288646 A1 | 11/2008 | Hasha et al. | |
| 2009/0222474 A1* | 9/2009 | Alpern | G06F 9/45558 |
| 2009/0240744 A1 | 9/2009 | Thomson et al. | |
| 2009/0271412 A1 | 10/2009 | Lacapra et al. | |
| 2010/0030793 A1 | 2/2010 | Cooper et al. | |
| 2010/0030800 A1* | 2/2010 | Brodfuehrer et al. | 707/102 |
| 2010/0106934 A1 | 4/2010 | Calder et al. | |
| 2010/0198791 A1 | 8/2010 | Wu et al. | |
| 2011/0202792 A1 | 8/2011 | Atzmony | |
| 2011/0225122 A1 | 9/2011 | Denuit et al. | |
| 2011/0231447 A1* | 9/2011 | Starkey | 707/792 |
| 2012/0078848 A1 | 3/2012 | Jennas, II et al. | |
| 2012/0084414 A1 | 4/2012 | Brock et al. | |
| 2012/0109892 A1 | 5/2012 | Novik et al. | |
| 2012/0166390 A1 | 6/2012 | Merriman et al. | |
| 2012/0254175 A1 | 10/2012 | Horowitz | |
| 2014/0164831 A1 | 6/2014 | Merriman et al. | |
| 2016/0203202 A1 | 7/2016 | Merriman et al. | |

OTHER PUBLICATIONS

Migrate DB2 applications to a partitioned Database IBM, Apr. 24, 2008.

"Bigtable: A DIstriubted Storage System for Structured Data," by Fay Chang, Jeffrey Dean, Sanjay Ghemawat, Wilson C. Hsieh, Deborah A. Wallach, Mike Burrows, Tushar Chandra, Andrew Fikes, Robert E. Gruber, OSDI'06: Seventh Symposium on Operating System Design and Implementation, Seattle, WA, Nov. 2006.

"PNUTS: Yahoo!'s Hosted Data Serving Platform," by Brain F. Cooper, Raghu Ramakrishnan, Utkarsh Srivastava, Adam Silberstein, Phillip Bohannon, HansArno, Jacobsen, Nick Puz, Daniel Weaver and Ramana Yemeni, VLDB '08, Aug. 24-30, 2008, Auckland, New Zealand Copyright 2008 VLDB Endowment, ACM 000-0-00000-000-0/00/00.

"Dynamo: Amazon's Highly Available Key-value Store," by Giuseppe DeCandia, Deniz Hastorun, Madan Jampani, Gunavardhan Kakulapati, Avinash Lakshman, Alex Pilchin, Swaminathan Sivasubramanian, Peter Vosshall and Werner Vogels, SOSP 2007, Oct. 2004, Stevenson, WA, USA.

"Chain Replication for Supporting High Throughput and Availability," by Robbert van Renesse and Fred B. Schneider, OSDI '04, pp. 91-104 of the Proceedings.

* cited by examiner

LARGE DISTRIBUTED DATABASE CLUSTERING SYSTEMS AND METHODS

RELATED APPLICATIONS

This application is a continuation-in-part of, and claims priority under 35 U.S.C. §120 to U.S. application Ser. No. 12/977,563, entitled "METHOD AND APPARATUS FOR MAINTAINING REPLICA SETS," filed on Dec. 23, 2010; this application is also a continuation-in-part of, and claims priority under 35 U.S.C. §120 of U.S. application Ser. No. 13/078,104, entitled "SYSTEM AND METHOD FOR OPTIMIZING DATA MIGRATION IN A PARTITIONED DATABASE," filed on Apr. 1, 2011; this application also claims priority to U.S. Provisional Application Ser. No. 61/665,042, entitled "LARGE DISTRIBUTED DATABASE CLUSTERING SYSTEMS AND METHODS" filed on Jun. 27, 2012; and U.S. Provisional Application Ser. No. 61/787,275, entitled "LARGE DISTRIBUTED DATABASE CLUSTERING SYSTEMS AND METHODS" filed on Mar. 15, 2013; all of which applications are incorporated herein by reference in their entirety.

FIELD OF THE INVENTION

The present invention relates to management of distributed database systems and methods having eventually consistent data architectures.

BACKGROUND

Conventional database architectures are designed to provide for reliable processing of database transactions, such as read and write operations performed on the database. Different database architecture designs stress different aspects of the well-known ACID properties (atomicity, consistency, isolation, durability), and such designs typically provide trade-offs between the properties and/or processing concerns based on which properties are stressed. As the demand for processing power and speed has increased, data stores have been developed to provide scaling of databases across a number of systems, vastly increasing the capability of handling large volumes of requests. Ecommerce websites, in particular, have vast need of quick and reliable processing of transactions.

In typical distributed database systems, no single node is responsible for all data affecting a transaction. Distribution of responsibility introduces significant additional complexity to ensure such ACID properties are fulfilled by the database design. Communication failures, failures of individual nodes, and inconsistent transactions all present additional complexity in reliable processing of database transactions. Some conventional approaches resolve some of these reliability issues by separating responsibility for read and write operations among elements of a distributed database. For example, master-slave relationships can be established between nodes in a distributed database. Other systems provide for multiple nodes within a data store that can process write requests, replicate their data to other nodes, and respond to read requests. For example, the well-known Amazon Dynamo database system provides an architecture that employs keys to determine a set of nodes that can process writes and reads for particular data. The Dynamo system emphasizes availability of data over other concerns, including consistency. By always permitting write operations whenever possible, conflicting transactions can and do arise. Thus, the Dynamo system requires implementation of reconciliation logic for conflicting transactions in the database and may require vector clocks, for example, to associate timing information with various updates. The timing information can then be processed to resolve conflicting operations.

Further complications can result when trying to find the appropriate balance for these concerns while at the same time providing for scalability of a database system.

SUMMARY

It is realized that methods and systems are needed to address some of the shortcomings of conventional distributed database approaches. In particular, there is a need for a database system that provides configurable consistency and simplicity of management in an eventually or strongly consistent setting (depending on consistency settings) while also preserving scalability and fault tolerance. According to some aspects, replication architectures can provide fault tolerance and redundancy, which can be coupled to sharding data architectures configured to provide scalability. According to one aspect, sharding is the tool for scaling a distributed database system, and replication (e.g., replica sets) is the architecture implemented for data safety, high availability, and disaster recovery. In some embodiments, sharding refers to partitioning data within a distributed database. A database shard hosts one or more partitions of the database data, allowing scaling of a number of systems to implement a large database architecture having high throughput, among other advantages. Each shard system and the associated partitions of data can be implemented as a replica set. In some embodiments, replica sets comprise a plurality of nodes, which provide data redundancy and availability in case of, for example, system failures. According to various embodiments, the two features are executed in tandem to facilitate management and administration. In other embodiments, either can be used alone to manage a distributed database system.

An eventually consistent database refers to a database type where replication of database changes can occur asynchronously, and thus when write operations cease, all replicas of the database will eventually become consistent. In one embodiment, simplicity and consistency can be achieved by establishing a primary node in a plurality of nodes hosting database instances (e.g., a primary node in a replica set). In some settings, simplicity and consistency can include making any replication strategy transparent from the perspective of the data requestors. For example, data requestors do not need to know or account for the replication strategy being employed. In some embodiments, the primary node is responsible for accepting write operations and propagating them to the secondary nodes in its replica set. An example replica set includes a cluster of nodes that host a database. The replica set contains a node with a primary role that can transition between nodes of the cluster. The remaining nodes can be assigned a secondary role and host replicas of the primary node's database. A database and/or data store can be made up of multiple replica sets each set having its own primary node. In one embodiment, the secondary nodes share the responsibility of responding to read requests.

In one embodiment, replica sets can be configured to provide for failover of a primary node, by automatically electing a new primary node from within the replica set. In one example implementation, a new primary can be elected by a majority of the nodes in the set. The new primary establishes a new point of consistency for the database based on its current state (potentially requiring roll back of uncommitted transactions) and provides for processing of any new transactions seamlessly. Simplicity can be achieved in this setting while maintaining consistency by permitting uncommitted write operations to be removed in the event of primary node failures. Further, permitting uncommitted write operations to be removed can permit even strongly consistent behavior. As discussed in greater detail below, automatic failover in response to replication errors solves some of the issues presented in conventional approaches, permits maintaining consistency in the database during failover, in some examples by accepting data loss. In some examples, such configurations can reduce some of the complexity associated with other conventional systems.

According to another aspect, a distributed database system comprises a plurality of nodes that host database instances, where each node is intended to host a copy of a database. Primary nodes are elected from within the plurality of nodes. In one example, a primary node is elected using a consensus protocol. A consensus protocol can include querying the plurality of nodes to determine the node with the freshest data. Once a majority of nodes agree on the best node, consensus exists and the node is elected primary. Various consensus protocols can be configured to elect on different criteria including freshest data, best location, most robust hardware, among other options.

A primary node is configured to accept write operations received from client systems. Changes to the primary node database can be written to an operation log and the operations are then propagated asynchronously to secondary nodes hosting replicas of the primary node's database. In some settings, a replica set comprising the plurality of nodes can be configured to wait to acknowledge a write request until a threshold number of secondary nodes have replicated the data associated with the write request. Acknowledged writes can permit a client to know that a particular write request will not be lost. That is, the write operation is durable even in the event of failures in the replica set.

In some examples, the threshold number of secondary nodes required to acknowledge a write can be configured to require that a majority of the nodes responsible for the written data have applied the write operation, providing strongly consistent operation. Further, a threshold for committing an operation at a primary node can be established to require that a majority of nodes responsible for the written data have performed a replication of the operation prior to acknowledging the write request. Writes can be considered durable (retained even during node failure) upon reaching a majority of the responsible nodes and these durable writes will not be lost even upon partitions and/or failures of nodes within the distributed database.

According to one aspect of the present, a computer-implemented method for asynchronous replication in a distributed database system is provided. The method comprises acts of establishing a primary node within a plurality of nodes, wherein the plurality of nodes comprise the distributed database system and the distributed database system provides responses to database requests from client computer systems, restricting processing of write operations to the primary node, establishing at least one secondary node which hosts a replica of the primary node database from the plurality of nodes, replicating, asynchronously, from the primary node the write operations to the at least two secondary nodes, and automatically recovering the primary node role in the distributed database system in response to a failure of the primary node, wherein the act of automatically recovering includes an act of establishing one of the at least one secondary node as the primary node. According to one embodiment of the present invention, the method further comprises an act of providing for strong consistency in the distributed database system. According to another embodiment of the invention, the method further comprises an act of providing for immediate consistency in the distributed database system. According to another embodiment of the invention, the act of automatically recovering the primary node responsibility further comprises the acts of detecting by at least one node in the plurality of nodes a replication failure, electing automatically, in response to the act of detecting, a new primary node from the plurality of nodes, establishing for the new primary node at least one secondary node to replicate operations, and synchronizing a state of a respective database hosted on each of the secondary nodes with a state of the database hosted on the new primary node.

According to one embodiment of the present invention, the method further comprises an act of transitioning a state of the primary node in response to the act of detecting the replication failure. According to another embodiment of the invention, the original primary node transitions to a recovery state. According to another embodiment of the invention, the method further comprises an act of restoring the original primary node to the database system, wherein the act of restoring includes an act of identifying a consistent state in the database hosted on the original primary node and the new primary node. According to another embodiment of the invention, the act of identifying the consistent state includes an act of identifying a database state of the new primary node where the database state establishes a last committed write operation received from the original primary node. According to another embodiment of the invention, the act of restoring includes an act of reversing transactions for the database hosted on the original primary node to reach the consistent state. According to another embodiment of the invention, the method further comprises an act of applying any transactions from the database hosted on the new primary node to the database hosted on the original primary node. According to another embodiment of the invention, the method further comprises an act of transitioning the state of the original primary node to an active state as a secondary node. According to another embodiment of the invention, the act of electing the new primary node includes an act of establishing a consensus within the plurality of nodes. According to another embodiment of the invention, the act of establishing a consensus includes an act of requiring a majority of the plurality of nodes to agree on the new primary node.

According to one embodiment of the present invention, the method further comprises an act of voting by at least one node in the plurality of nodes for the new primary node. According to another embodiment of the invention, the act of voting by the at least one node in the plurality of nodes for the new primary node includes an act of determining a priority value for the at least one node. According to another embodiment of the invention, the act of establishing a consensus includes acts of determining the new primary node based, at least in part, on the priority value, and resolving equal priority values based on a state of a respective database of the at least one node. According to another embodiment of the invention, the act of determining consensus is based at least in part one at least one of a priority value for a respective node, a status of a database for a respective node, a location of a respective node, and an availability measure for a respective node. According to another embodiment of the invention, the method further comprises an act of guaranteeing a write operation is not lost in response to the act of replicating occurring on a majority of nodes responsible for any written data associated with the write operation. According to another embodiment of the invention, the act of replicating from the primary node the write operations to the plurality of nodes, includes an act of committing the write operation in response to an acknowledgement of the write operation from the majority of nodes responsible for the written data. According to another embodiment of the invention, the act of replicating from the primary node the write operations to the plurality of nodes, includes an act of committing the write operation in response to an acknowledgement of the write operation from a threshold number of the nodes responsible for the written data.

According to one embodiment of the present invention, the method further comprises an act of permitting read operations from the plurality of nodes to occur with data corresponding to uncommitted write operations. According to another embodiment of the invention, the majority of nodes responsible for the written data include the primary node and at least two secondary nodes. According to another embodiment of the invention, the method further comprises an act of generating on the primary node an operation log for each processed write operation, wherein the operation log includes a unique identifier for each processed operation. According to another embodiment of the invention, the method further comprises an act of transmitting the processed write operation with the unique identifier. According to another embodiment of the invention, the unique identifier includes an identifier for the primary system and a monotonically increasing value for each operation. According to another embodiment of the invention, the method further comprises an act of receiving a status signal from at least one of the plurality of nodes. According to another embodiment of the invention, the status signal provides an indication of communication state on a network connecting the plurality of nodes.

According to one embodiment of the present invention, the act of detecting the replication failure includes an act of determining that the primary node cannot communicate with a majority of the plurality of nodes based at least in part on a status signal. According to another embodiment of the invention, the method further comprises an act of generating a heartbeat signal from at least one of the plurality of nodes. According to another embodiment of the invention, the status signal provides an indication that a threshold number of nodes from the plurality of nodes have not executed the write operation. According to another embodiment of the invention, the status signal provides an indication that a threshold number of nodes from the plurality of nodes have executed the write operation. According to another embodiment of the invention, the act of synchronizing a state of a respective database hosted on each of the secondary nodes with a state of the database hosted on the new primary node, includes an act of identifying any operation on the respective node that is inconsistent with an operation on the new primary node. According to another embodiment of the invention, the act of synchronizing the state of the respective database includes an act of updating an object on the respective node that corresponds to an inconsistent operation. According to another embodiment of the invention, the act of updating includes an act of deleting the object if the object does not exist on the new primary node. According to another embodiment of the invention, the method further comprises an act of generating a comparison value associated with the state of the respective database. According to another embodiment of the invention, the method further comprises an act of establishing at least one node as a backup node, wherein the backup node is configured to maintain a copy of the database without indexes. According to another embodiment of the invention, the method further comprises an act of generating different indexes for at least one of the secondary nodes hosting the database replica.

According to one aspect of the present invention, a system for performing asynchronous replication in a distributed database environment comprising a plurality of nodes is provided. The system comprises a role component configured to establish a role associated with each node in a plurality of nodes, wherein the role component is configured to establish a primary node with a primary role and at least one secondary node with a secondary role, an execution component configured to restrict write requests to the primary node, a replication component configured to asynchronously replicate write operations performed on the primary node to the at least one secondary node, and a recovery component configured to automatically establish a new primary node in the distributed database system in response to a replication failure, wherein the recovery component is further configured to establish one of the at least one secondary node as the primary node. According to one embodiment of the present invention, the system further comprises a durability component configured to commit a write operation in response to replication of the write operation to a threshold number of the nodes responsible for the written data. According to another embodiment of the invention, the threshold number of the nodes responsible for the written data comprises a majority of the nodes responsible for the written data. According to another embodiment of the invention, the majority of nodes responsible for the written data include the primary node and at least two secondary nodes. According to another embodiment of the invention, the recovery component further comprises a status component configured to monitor replication status in the distributed database an election component configured to automatically establish a new node with the primary role in response to detecting a replication failure, and a synchronization component configured to synchronize a database hosted on the at least one node with the secondary role and a database hosted on the new primary node.

According to one embodiment of the present invention, the election component is further configured to establish the new node with the primary role based on evaluation of election criteria. According to another embodiment of the invention, the election criteria includes at least one of a state of a node's data, a geographic location, a rack position, a processing capability, and a hardware capability. According to another embodiment of the invention, the election component is further configured to evaluate database state information to establish the new node with the primary role. According to another embodiment of the invention, the system is configured to maintain strong consistency in the distributed database. According to another embodiment of the invention, the system is configured to maintain immediate consistency in the distributed database. According to another embodiment of the invention, the majority of nodes responsible for the written data include the primary node and at least two secondary nodes. According to another embodiment of the invention, the system further comprises a re-integration component configured to automatically restore a former primary node to the distributed database. According to another embodiment of the invention, the re-integration component is further configured to establish a point of consistency between the respective databases of the new primary node and the former primary node, roll back any operations on the former primary node to achieve the point of consistency, and wherein the replication component is further configured to replication asynchronously replicate any write operations performed on the new primary node executed after the point of consistency.

According to one aspect of the present invention, a system for managing asynchronous replication in a distributed database environment comprising a plurality of nodes is provided. The system comprises a role component configured to establish a role associated with each node in a plurality of nodes, wherein the role component is configured to establish a primary node with a primary role and at least one secondary node with a secondary role, an execution component configured to restrict write requests to the primary node, a replication component configured to asynchronously replicate write operations performed on the primary node to the at least one secondary node, a durability component configured to commit a write operation in response to asynchronous replication of the write operation to a threshold number of the nodes responsible for the written data.

According to some aspects, it is realized that horizontal scaling, the addition of computer systems, can achieve significant efficiencies for database processing. By partitioning a database across a number of additional systems, database requests can be distributed and data throughput significantly increased based on the number of systems. Incorporating a transparent front end to manage the distribution of database records allows system to leverage low processing costs associated with multiple machines while still providing a single source interface to handle client requests. According to some aspects, it is realized that conventional horizontal scaling architectures can also require burdensome computational overhead in implementation and operation. According to one aspect, horizontal scaling architectures can be implemented and operated with minimal overhead. In one embodiment, a system is configured to identify and test database key properties. For example, a system can optimize database partitioning where the database key used to organize a given collection of data is sequential. In one embodiment, databases can be partitioned in an order preserving manner such that the overhead associated with moving the data for a given partition can be minimized. Such data split and migrations are typically required during normal operation and/or management of a partitioned database. A partitioned database architecture implements divisions within the data of a database so that database operations can be spread over multiple computer systems. In some implementations, a routing process handles request for data access, providing a single interface for interaction with requesting systems. The routing process can direct requests to each system for handling of actual data resident within a given partition.

In one example, database partitions are configured as shards. Each database shard can be accessed as an instantiation of the database for the data within a given partition, for example, by a routing process. The database shard can be configured to handle reads, writes, and updates to the data within the given partition. The term shard can be used to refer to the data within a given partition, as well as a reference to the instantiation of the database for the given partition (e.g. the data and the processes for reading, writing, updating the data, etc.). Each shard of data can be configured to include a contiguous range of the data within a partitioned database. According to one embodiment, shards of data are generated in such a way to minimize overhead associated with maintained sharded data. In one example, network transmission required to migrate sharded data can be reduced by optimizing creation of new shards of data. New shards of data can be created as needed, typically, as the size of the database grows.

In some embodiments, a managed database can include a database organized into shards, where for example, some of the sharded data is organized based on a sequential database key and/or sequential database key phrase. For data associated with a sequential key or key pattern, new data (e.g. document, data entity, etc.) can be assigned a new and increasing key value. In some embodiments, new data can be directed to new shards based on the sequential key. Generation of new shard having little or no data requires little overhead. Further migration of these new shards can result in a significant reduction in network traffic. In some instances, a database management system can exploit the ordering of the data contained within a database, or the ordering of subset of the data, to insure that as new shards are created, little or no records need to be moved from one shard to another.

According to one aspect provided is a system for optimizing data distribution. The system comprises at least one processor operatively connected to a memory for executing system components, a database comprising a plurality of database partitions, wherein at least one of the plurality of database partitions includes a contiguous range of data from the database, and a partition component configured to detect a partition size for the at least one of the plurality of database partitions that exceeds a size threshold, split the at least one of the database partitions into at least a first and a second partition, control a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions. According to one embodiment, the partition component is further configured to identify a collection comprising a group of database partitions having a sequential database key, and wherein controlling the distribution occurs in response to an identification of the sequential database key.

According to one embodiment, the partition component is further configured to define the first partition having a minimum key value and a maximum key value less than or equal to the maximum key value for the partition's data, define the second partition range to include values greater than or equal to the maximum key value. According to one embodiment, the partition component is further configured to lock the partition for write requests in response to splitting operations. According to one embodiment, the contiguous range comprises a range of one or more key values associated with the database data. According to one embodiment, the database is organized into a plurality of collections, and each collection comprises a plurality of partitions. According to one embodiment, each partition within a collection includes a contiguous range of data from the database, wherein the contiguous range comprises a range of one or more key values associated with the database data.

According to one embodiment, the partition component is further configured to assign at least any data in the at least one of the plurality of database partitions having associated database key values less than the maximum value to the first partition, and assign at least any data in the at least one of the plurality of database partitions having database key values greater that the maximum value to the second partition. According to one embodiment, the partition component is further configured to identify database partitions having a sequential database key.

According to one embodiment, the system further comprises a plurality of servers, wherein the plurality of servers are configured to host the plurality of database partitions. According to one embodiment, the system further comprises a migration component configured to migrate database partitions between a plurality of servers configured to host the database partitions. According to one embodiment, the migration component is further configured to migrate the second partition responsive to the partition component splitting the partition. According to one embodiment, the migration component is further configured to determine a distribution of the plurality of partitions across the plurality of servers, in response to splitting, wherein the migration component is configured to migrate the second partition to a least loaded server identified based on the distribution. According to one embodiment, the migration component is further configured to deny write operations to data within the partition.

According to one embodiment, the system further comprises a rebalancing component configured to determine a state of the database based on a distribution of the plurality of partitions across the plurality of servers, wherein the rebalancing component is further configured to migrate at least one partition in response to the state indicating an imbalanced distribution of partitions. According to one embodiment, the rebalancing component is further configured to determine a partition count for each server. According to one embodiment, the rebalancing component is further configured to determine a different between a least loaded server and a most loaded server. According to one embodiment, the rebalancing component is further configured to migrate partitions until difference between the most loaded server and the least loaded server is less than or equal to 2. According to one embodiment, the rebalancing component is further configured to migrate partition from most loaded server to least loaded server.

According to one embodiment, the system further comprises a routing component configured to route database requests to identified partitions, wherein the routing component is further configured to identify partitions based, at least, on key values associated with the data request. According to one embodiment, the routing component is further configured to identify partitions based on the key values used to organize range of data in at least one partition. According to one embodiment, the routing component is further configured to identify partitions based on indexed values within the data. According to one embodiment, the routing component is further configured to identify all partitions in response to data request requiring global access. According to one embodiment, the routing component is further configured to identify all partitions based on inability to identify specific partitions. According to one embodiment, the routing component is further configured to determine a received query does not include keyed information to identify specific partitions.

According to one embodiment, the system further comprises a configuration component configured to manage metadata information associated with each of the plurality of partitions, the metadata information including a defined range of key values associated with each partition. According to one embodiment, the configuration component is further configured to replicate the metadata across any routing component of the system. According to one embodiment, the configuration component is further configured to control versioning of the plurality of partitions. According to one embodiment, the configuration component is further configured to assign version numbers to the second partitions. According to one embodiment, the configuration component is further configured to verify split occurred properly. According to one embodiment, the configuration component is further configured to verify migration occurred properly. According to one embodiment, the configuration component is further configured to assign version numbers in response to verification.

According to one embodiment, the configuration component is further configured to update the metadata information in response to the partition component splitting the at least one of the plurality of database partitions into at least the first and the second partition. According to one embodiment, the configuration component is further configured to guarantee updates to the metadata. According to one embodiment, the configuration component is further configured to executed a two phase commit for updates to the metadata. According to one embodiment, the configuration component is further configured to update the metadata information in response to migration of database partitions between the plurality of servers. According to one embodiment, the configuration component is further configured to update the metadata in response to verification.

According to one embodiment, the system further comprises a reconciliation component configured to log database operations received on partitions during at least one of a migration operation and a splitting operation, wherein the reconciliation component is further configured to update at least one partition in response to the completion of a respective migration and splitting operation.

According to one aspect, provided is a computer implemented method for optimizing data distribution. The method comprises monitoring, by a computer system, a distributed database including a plurality of database partitions, wherein at least one of the plurality of database partitions includes a contiguous range of data from the database, detecting, by the computer system, a partition size of the at least one of the plurality of database partitions exceeds a size threshold, splitting, by the computer system, the at least one of the plurality of database partitions into at least a first and a second partition, controlling, by the computer system, a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions.

According to one embodiment, the method further comprises identifying a collection comprising a group of database partitions having a sequential database key, and wherein controlling the distribution occurs in response to an identification of the sequential database key. According to one embodiment, the method further comprises defining the first partition having a minimum key value and a maximum key value less than or equal to the maximum key value for the partition's data and defining the second partition range to include values greater than or equal to the maximum key value. According to one embodiment, the method further comprises locking the partition for write requests in response to execution of splitting operations.

According to one embodiment, minimizing any data distributed to the second partition includes acts of assigning at least any data in the at least one of the plurality of database partitions having database key values less than the maximum value to the first partition, and assigning at least any data in the at least one of the plurality of database partitions having database key values greater that the maximum value to the second partition.

According to one embodiment, the method further comprises hosting the distributed database on a plurality of servers, wherein the act of hosting the distributed database includes hosting the plurality of database partitions on the plurality of servers. According to one embodiment, the method further comprises an act of identifying a sequential database key, wherein the act of controlling is executed responsive to the act of identifying the sequential database key.

According to one embodiment, the method further comprises an act of migrating database partitions between the plurality of servers. According to one embodiment, migrating the database partitions further comprises migrating the second partition responsive to splitting the database partition. According to one embodiment, migrating the database partitions further comprises determining a distribution of the plurality of partitions across the plurality of servers, in response to splitting, wherein migrating the database partitions includes an act of migrating the second partition to a least loaded server identified based on the distribution. According to one embodiment, the method further comprises denying write operations to data within the partition.

According to one embodiment, the method further comprises determining a state of the distributed database based on a distribution of the plurality of partitions across the plurality of servers, and migrating at least one partition in response to the state indicating an imbalanced distribution of partitions. According to one embodiment, the method further comprises determining a partition count for each server. According to one embodiment, the method further comprises determining a different between a least loaded server and a most loaded server. According to one embodiment, the method further comprises migrating partitions until difference between the most loaded server and the least loaded server is less than or equal to 2. According to one embodiment, the method further comprises migrating partitions from the most loaded server to the least loaded server.

According to one embodiment, the method further comprises an act of routing database requests to identified partitions, wherein the act of routing includes identifying partitions based, at least, on key values associated with the data request. According to one embodiment, identifying partitions includes identifying partitions based on the key values used to organize range of data in at least one partition. According to one embodiment, identifying partitions includes identifying partitions based on indexed values within the data. According to one embodiment, the method further comprising an act of identifying all partitions in response to data request requiring global access. According to one embodiment, the act of identifying all partitions includes identifying all partitions based on inability to identify specific partitions. According to one embodiment, the act of identifying all partitions includes determining a received query does not include keyed information to identify specific partitions.

According to one embodiment, the method further comprises an act of managing metadata information associated with each of the plurality of partitions, wherein the metadata information includes a defined range of key values associated with the data contained in each partition. According to one embodiment, the method further comprises an act of replicating the metadata across any routing component of the system. According to one embodiment, the method further comprises an act of controlling versioning of the plurality of partitions. According to one embodiment, the method further comprises an act of assigning version numbers to the second partition. According to one embodiment, the method further comprises an act of verifying splitting occurred properly. According to one embodiment, the method further comprises an act of verifying migration occurred properly. According to one embodiment, the method further comprises an act of assigning version numbers in response to verification.

According to one embodiment, the method further comprises an act of updating the metadata information in response to splitting the at least one of the plurality of database partitions into at least the first and the second partition. According to one embodiment, the method further comprising an act of updating the metadata information in response to migration of database partitions between the plurality of servers. According to one embodiment, the method further comprises an act of guaranteeing updates to the metadata. According to one embodiment, the method further comprises an act of executing a two phase commit for updates to the metadata.

According to one embodiment, the method further comprising acts of logging database operations received during at least one of a migration operation and a splitting operation, reconciling at least one partition after completing the at least one of the migration operation and the splitting operation, wherein the act of reconciling includes an act of executing the logged database operations.

According to one aspect, provided is a computer-readable storage medium having computer-readable instructions that, as a result of being executed by a computer, instruct the computer to perform a method for optimizing data distribution. The method comprises acts of monitoring a distributed database including a plurality of database partitions, wherein at least one of the plurality of database partitions includes a contiguous range of data from the database, detecting a partition size of the at least one of the plurality of database partitions exceeds a size threshold, splitting the at least one of the plurality of database partitions into at least a first and a second partition, controlling a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions.

According to one embodiment, the method further comprises identifying a collection comprising a group of database partitions having a sequential database key, and wherein controlling the distribution occurs in response to an identification of the sequential database key. According to one embodiment, the method further comprises defining the first partition having a minimum key value and a maximum key value less than or equal to the maximum key value for the partition's data and defining the second partition range to include values greater than or equal to the maximum key value. According to one embodiment, the method further comprises locking the partition for write requests in response to execution of splitting operations.

According to one embodiment, minimizing any data distributed to the second partition includes acts of assigning at least any data in the at least one of the plurality of database partitions having database key values less than the maximum value to the first partition, and assigning at least any data in the at least one of the plurality of database partitions having database key values greater that the maximum value to the second partition.

According to one embodiment, the method further comprises hosting the distributed database on a plurality of servers, wherein the act of hosting the distributed database includes hosting the plurality of database partitions on the plurality of servers. According to one embodiment, the method further comprises an act of identifying a sequential database key, wherein the act of controlling is executed responsive to the act of identifying the sequential database key.

According to one embodiment, the method further comprises an act of migrating database partitions between the plurality of servers. According to one embodiment, migrating the database partitions further comprises migrating the second partition responsive to splitting the database partition. According to one embodiment, migrating the database partitions further comprises determining a distribution of the plurality of partitions across the plurality of servers, in response to splitting, wherein migrating the database partitions includes an act of migrating the second partition to a least loaded server identified based on the distribution. According to one embodiment, the method further comprises denying write operations to data within the partition.

According to one embodiment, the method further comprises determining a state of the distributed database based on a distribution of the plurality of partitions across the plurality of servers, and migrating at least one partition in response to the state indicating an imbalanced distribution of partitions. According to one embodiment, the method further comprises determining a partition count for each server. According to one embodiment, the method further comprises determining a different between a least loaded server and a most loaded server. According to one embodiment, the method further comprises migrating partitions until difference between the most loaded server and the least loaded server is less than or equal to 2. According to one embodiment, the method further comprises migrating partitions from the most loaded server to the least loaded server.

According to one embodiment, the method further comprises an act of routing database requests to identified partitions, wherein the act of routing includes identifying partitions based, at least, on key values associated with the data request. According to one embodiment, identifying partitions includes identifying partitions based on the key values used to organize range of data in at least one partition. According to one embodiment, identifying partitions includes identifying partitions based on indexed values within the data. According to one embodiment, the method further comprising an act of identifying all partitions in response to data request requiring global access. According to one embodiment, the act of identifying all partitions includes identifying all partitions based on inability to identify specific partitions. According to one embodiment, the act of identifying all partitions includes determining a received query does not include keyed information to identify specific partitions.

According to one embodiment, the method further comprises an act of managing metadata information associated with each of the plurality of partitions, wherein the metadata information includes a defined range of key values associated with the data contained in each partition. According to one embodiment, the method further comprises an act of replicating the metadata across any routing component of the system. According to one embodiment, the method further comprises an act of controlling versioning of the plurality of partitions. According to one embodiment, the method further comprises an act of assigning version numbers to the second partition. According to one embodiment, the method further comprises an act of verifying splitting occurred properly. According to one embodiment, the method further comprises an act of verifying migration occurred properly. According to one embodiment, the method further comprises an act of assigning version numbers in response to verification.

According to one embodiment, the method further comprises an act of updating the metadata information in response to splitting the at least one of the plurality of database partitions into at least the first and the second partition. According to one embodiment, the method further comprising an act of updating the metadata information in response to migration of database partitions between the plurality of servers. According to one embodiment, the method further comprises an act of guaranteeing updates to the metadata. According to one embodiment, the method further comprises an act of executing a two phase commit for updates to the metadata.

According to one embodiment, the method further comprising acts of logging database operations received during at least one of a migration operation and a splitting operation, reconciling at least one partition after completing the at least one of the migration operation and the splitting operation, wherein the act of reconciling includes an act of executing the logged database operations.

According to one aspect, a system for managing a large distributed database is provided. The system comprises at least one processor operatively connected to a memory; a configuration component, executed by the at least one processor, configured to organize a plurality of database partitions; and a shard server configured to host one or more of the plurality of database partitions, wherein the shard server further comprises a replica set, which includes a primary system and at least two secondary systems for replication of a primary copy of the one or more of the plurality of the database partitions to secondary copies of the one or more partitions; wherein the configuration component is further configured to manage cloning the one or more partitions by adding configuration information for a new computer system into configuration information for the replica set implementing the shard server hosting the one or more partitions, and wherein the replica set is further configured to split the one or more partitions into additional partitions by filtering at least some data from the one or more partitions into the additional partitions responsive to the added configuration information.

In one embodiment, the system further comprises a partition component configured to detect a partition size for the at least one of the plurality of database partitions that exceeds a size threshold; split the at least one of the database partitions into at least a first and a second partition; control a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions. In one embodiment, the partition component is further configured to assign at least any data in the at least one of the plurality of database partitions having associated database key values less than the maximum value to the first partition; and assign at least any data in the at least one of the plurality of database partitions having database key values greater that the maximum value to the second partition. In one embodiment, the partition component is further configured to identify database partitions having a sequential database key.

In one embodiment, the system further comprises a plurality of shard servers, wherein the plurality of servers are configured to host the plurality of database partitions. In one embodiment, the system further comprises a migration component configured to migrate database partitions between a plurality of servers configured to host the database partitions. In one embodiment, the system further comprises a rebalancing component configured to determine a state of the database based on a distribution of the plurality of partitions across the plurality of servers, wherein the rebalancing component is further configured to migrate at least one partition in response to the state indicating an imbalanced distribution of partitions. In one embodiment, the system further comprises a routing component configured to route database requests to identified partitions, wherein the routing component is further configured to identify partitions based, at least, on key values associated with the data request. In one embodiment, the system further comprises a configuration component configured to manage metadata information associated with each of the plurality of partitions, the metadata information including a defined range of key values associated with each partition.

In one embodiment, the configuration component is further configured to replicate the metadata across any routing component of the system. In one embodiment, the configuration component is executed on the shard server. In one embodiment, the system further comprises a routing component configured to accept and route data requests from based on configuration information provided by the configuration component. In one embodiment, the replica set further comprises a management process executed on the primary node configured to accept data requests from the routing component and return results to the routing component. In one embodiment, the management processes is configured to define consistency settings for managing replicated data. In one embodiment, the management process is configured to limit writes to primary nodes. In one embodiment, the management process is configured to limit reads to primary nodes responsive to consistency settings. In one embodiment, the configuration component is further configured to update the metadata information in response to the partition component splitting the at least one of the plurality of database partitions into at least the first and the second partition. In one embodiment, the configuration component is further configured to update the metadata information in response to migration of database partitions between the plurality of servers. In one embodiment, the system further comprises a reconciliation component configured to log database operations received on partitions during at least one of a migration operation and a splitting operation, wherein the reconciliation component is further configured to update at least one partition in response to the completion of a respective migration and splitting operation.

According to one aspect, a computer-implemented method for managing a distributed database, implementing a sharded data architecture and replica set configuration of computer systems hosting the distributed database is provided. The method comprises organizing, by a computer system, a plurality of database partitions; hosting, by a shard server, one or more of the plurality of database partitions, wherein the shard server comprises a replica set; replicating, by the replica set, the one or more of the plurality of database partitions from a primary system to at least two secondary systems that comprise the replica set; cloning, automatically, the one or more of the plurality of database partitions by adding a new computer system to the replica set; and splitting, the one or more of the plurality of database partitions into at least one additional partition during the act of cloning, wherein the act of splitting includes filtering at least some data from the one or more of the plurality of database partitions into the at least one additional partition.

In one embodiment, the method further comprises acts of monitoring, by a computer system, a distributed database including a plurality of database partitions, wherein at least one of the plurality of database partitions includes a contiguous range of data from the database; detecting, by the computer system, a partition size of the at least one of the plurality of database partitions exceeds a size threshold; splitting, by the computer system, the at least one of the plurality of database partitions into at least a first and a second partition; controlling, by the computer system, a distribution of data within the first and the second partition based on a value for a database key associated with the data in the at least one of the plurality of database partitions, wherein controlling the distribution includes minimizing any data distributed to the second partition based on a maximum value for the database key associated with the data in the at least one of the plurality of database partitions. In one embodiment, the act of minimizing any data distributed to the second partition includes acts of assigning at least any data in the at least one of the plurality of database partitions having database key values less than the maximum value to the first partition; and assigning at least any data in the at least one of the plurality of database partitions having database key values greater that the maximum value to the second partition. In one embodiment, the method further comprises hosting the distributed database on a plurality of servers, wherein the act of hosting the distributed database includes hosting the plurality of database partitions on the plurality of servers. In one embodiment, the method further comprises an act of identifying a sequential database key, wherein the act of controlling is executed responsive to the act of identifying the sequential database key. In one embodiment, the method further comprises an act of migrating database partitions between the plurality of servers. In one embodiment, the method further comprises acts of determining a state of the distributed database based on a distribution of the plurality of partitions across the plurality of servers; and migrating at least one partition in response to the state indicating an imbalanced distribution of partitions. In one embodiment, the method further comprises an act of routing database requests to identified partitions, wherein the act of routing includes identifying partitions based, at least, on key values associated with the data request.

In one embodiment, the method further comprises an act of managing metadata information associated with each of the plurality of partitions, wherein the metadata information includes a defined range of key values associated with the data contained in each partition. In one embodiment, the method further comprises an act of replicating the metadata across any routing component of the system. In one embodiment, the method further comprises an act of updating the metadata information in response to splitting the at least one of the plurality of database partitions into at least the first and the second partition. In one embodiment, the method further comprises an act of updating the metadata information in response to migration of database partitions between the plurality of servers. In one embodiment, the method further comprises acts of logging database operations received during at least one of a migration operation and a splitting operation; reconciling at least one partition after completing the at least one of the migration operation and the splitting operation, wherein the act of reconciling includes an act of executing the logged database operations.

According to one aspect, a computer-readable storage medium having computer-readable instructions that, as a result of being executed by a computer, instruct the computer to perform the preceding method and/or steps is provided. In one embodiment, the method further comprises establishing a primary node within a plurality of nodes, wherein the plurality of nodes comprise the distributed database system and the distributed database system provides responses to database requests from client computer systems; restricting processing of write operations to the primary node; establishing at least one secondary node which hosts a replica of the primary node database from the plurality of nodes; replicating, asynchronously, from the primary node the write operations to the at least two secondary nodes; and automatically recovering the primary node role in the distributed database system in response to a failure of the primary node, wherein the act of automatically recovering includes an act of establishing one of the at least one secondary node as the primary node. In one embodiment, the method further comprises an act of providing for strong consistency in the distributed database system. In one embodiment, the method further comprises an act of providing for immediate consistency in the distributed database system.

In one embodiment, the act of automatically recovering the primary node responsibility further comprises the acts of detecting by at least one node in the plurality of nodes a replication failure; electing automatically, in response to the act of detecting, a new primary node from the plurality of nodes; establishing for the new primary node at least one secondary node to replicate operations; and synchronizing a state of a respective database hosted on each of the secondary nodes with a state of the database hosted on the new primary node.

In one embodiment, the method further comprises an act of transitioning a state of the primary node in response to the act of detecting the replication failure. In one embodiment, the method further comprises an act of restoring the original primary node to the database system, wherein the act of restoring includes an act of identifying a consistent state in the database hosted on the original primary node and the new primary node. In one embodiment, the act of identifying the consistent state includes an act of identifying a database state of the new primary node where the database state reflects a last committed write operation received from the original primary node. In one embodiment, the act of restoring includes an act of reversing transactions for the database hosted on the original primary node to reach the consistent state. In one embodiment, the act of electing the new primary node includes an act of establishing a consensus within the plurality of nodes.

In one embodiment, the act of establishing a consensus includes an act of requiring a majority of the plurality of nodes to agree on the new primary node. In one embodiment, the method further comprises an act of voting by at least one node in the plurality of nodes for the new primary node. In one embodiment, the act of voting by the at least one node in the plurality of nodes for the new primary node includes an act of determining a priority value for the at least one node. In one embodiment, the act of establishing a consensus includes acts of determining the new primary node based, at least in part, on the priority value; and resolving equal priority values based on a state of a respective database of the at least one node. In one embodiment, the act of determining consensus is based at least in part one at least one of a priority value for a respective node, a status of a database for a respective node, a location of a respective node, and an availability measure for a respective node. In one embodiment, the method further comprises an act of guaranteeing a write operation is not lost in response to the act of replicating occurring on a majority of nodes responsible for any written data associated with the write operation. In one embodiment, the act of replicating from the primary node the write operations to the plurality of nodes, includes an act of committing the write operation in response to an acknowledgement of the write operation from a threshold number of the nodes responsible for the written data. In one embodiment, the method further comprises an act of permitting read operations from the plurality of nodes to occur with data corresponding to uncommitted write operations. In one embodiment, the method further comprises an act of generating on the primary node an operation log for each processed write operation, wherein the operation log includes a unique identifier for each processed operation.

In one embodiment, the unique identifier includes an identifier for the primary system and a monotonically increasing value for each operation. In one embodiment, the method of further comprises an act of receiving a status signal from at least one of the plurality of nodes. In one embodiment, the status signal provides an indication of communication state on a network connecting the plurality of nodes. In one embodiment, the act of detecting the replication failure includes an act of determining that the primary node cannot communicate with a majority of the plurality of nodes based at least in part on a status signal. In one embodiment, the act of synchronizing a state of a respective database hosted on each of the secondary nodes with a state of the database hosted on the new primary node, includes an act of identifying any operation on the respective node that is inconsistent with an operation on the new primary node. In one embodiment, the act of synchronizing the state of the respective database includes an act of updating an object on the respective node that corresponds to an inconsistent operation. In one embodiment, the act of updating includes an act of deleting the object if the object does not exist on the new primary node. In one embodiment, the method further comprises an act of establishing at least one node as a backup node, wherein the backup node is configured to maintain a copy of the database without indexes. In one embodiment, the method further comprises an act of generating different indexes for at least one of the secondary nodes hosting the database replica.

In one embodiment the system further comprises a role component configured to establish a role associated with each node in a plurality of nodes, wherein the role component is configured to establish a primary node with a primary role and at least one secondary node with a secondary role; an execution component configured to restrict write requests to the primary node; a replication component configured to asynchronously replicate write operations performed on the primary node to the at least one secondary node; and a recovery component configured to automatically establish a new primary node in the distributed database system in response to a replication failure, wherein the recovery component is further configured to establish one of the at least one secondary node as the primary node.

In one embodiment, the system further comprises a durability component configured to commit a write operation in response to replication of the write operation to a threshold number of the nodes responsible for the written data. In one embodiment, the threshold number of the nodes responsible for the written data comprises a majority of the nodes responsible for the written data. In one embodiment, the recovery component further comprises a status component configured to monitor replication status in the distributed database; an election component configured to automatically establish a new node with the primary role in response to detecting a replication failure; and a synchronization component configured to synchronize a database hosted on the at least one node with the secondary role and a database hosted on the new primary node. In one embodiment, the election component is further configured to establish the new node with the primary role based on evaluation of election criteria. In one embodiment, the election criteria includes at least one of a state of a node's data, a geographic location, a rack position, a processing capability, and a hardware capability. In one embodiment, the system is configured to maintain strong consistency in the distributed database. In one embodiment, the system is configured to maintain immediate consistency in the distributed database. In one embodiment, the system further comprises a re-integration component configured to automatically restore a former primary node to the distributed database. In one embodiment, the re-integration component is further configured to establish a point of consistency between the respective databases of the new primary node and the former primary node; roll back any operations on the former primary node to achieve the point of consistency; and wherein the replication component is further configured to replication asynchronously replicate any write operations performed on the new primary node executed after the point of consistency.

According to one aspect, a system for managing a large distributed database is provided. The system comprises a distributed database; a configuration component configured to organize the distributed database into a plurality of database partitions, wherein the configuration component provides data routing information for accepting and routing client requests to the plurality of database partitions; a shard server configured to host one or more of the plurality of database partitions, wherein the shard server further comprises a replica set, wherein the replica set comprises a primary node and at least two secondary nodes for replication of a primary copy of the one or more of the plurality of the database partitions to secondary copies of the one or more partitions hosted on the secondary nodes; and wherein the replica set is configured to replicate data operations within the replica set based on an eventually consistent model. In one embodiment, the system is configured limit database write operations to respective primary nodes of the replica sets to provide for strong consistency within the distributed database. In one embodiment, the system is configured to limit database read operations to the respective primary nodes to provide read your own writes consistency. In one embodiment, the system is configured to provide strong consistency for committed operations, wherein the system is configured to commit operations in response to the operations being replicated to a majority of nodes in a respective replica set. In one embodiment, the configuration component is executed on the shard server.

According to one aspect, a computer implemented method for managing a large distributed database is provide. The method comprises organizing, by a computer system, a distributed database into a plurality of database partitions, wherein organizing the distributed database includes defining data routing information for accepting and routing client requests to the plurality of database partitions; hosting, by the computer system, one or more of the plurality of database partitions; replicating, by the computer system, a respective one of the one or more of the plurality of database partitions between a primary node and at least two secondary nodes; wherein the primary node and at least two secondary nodes host a primary copy of the one or more of the plurality of the database partitions at the primary node, and the act of replicating includes replicating the primary copy to secondary copies of the one or more partitions hosted on the secondary nodes. In one embodiment, the method further comprises limiting database write operations to respective primary nodes to provide for strong consistency within the distributed database. In one embodiment, the system further comprises limiting database read operations to the respective primary nodes to provide read your own writes consistency. In one embodiment, the method further comprises committing operations in response to the operations being replicated to a majority of secondary nodes associated with a respective primary node.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
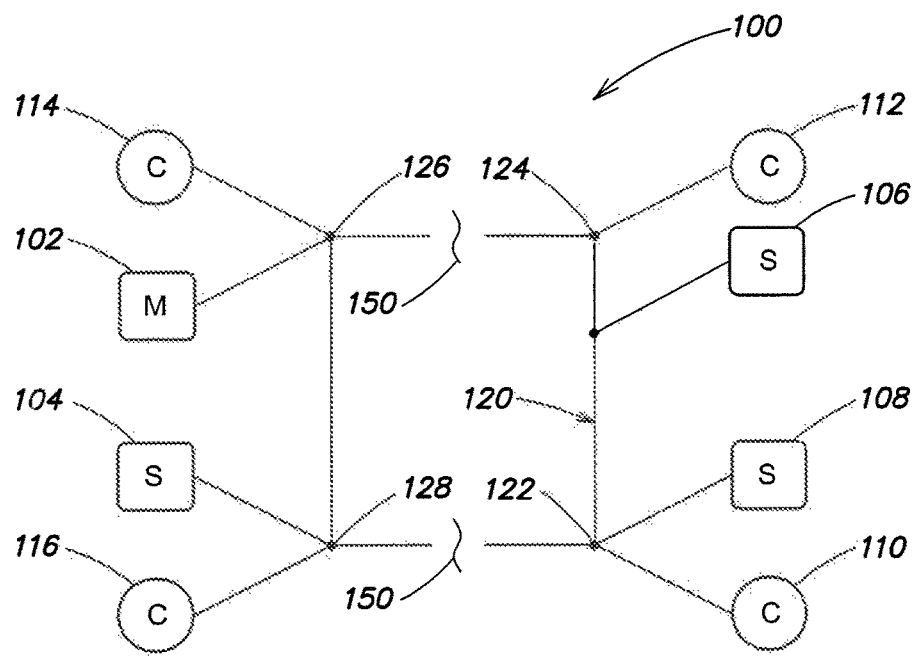
FIG. 1 illustrates a block diagram of an example distributed database system, according to one aspect of the present invention.

According to one aspect, provided are methods and systems for implementing and/or managing distributed databases. According to some embodiments, the data stored with the distributed database is managed across a plurality of database servers, each hosting a portion of the underlying data. The portions of data can be organized as chunks, which are defined by ranges of key values. The defined ranges for each portion or chuck can be stored on configuration servers. Data requests received from clients can be routed to appropriate chunk(s) based on the metadata from the configuration servers. (see e.g., FIG. 13). A shard can be a server or system that hosts one or more chunks of the data. Each one of the chunks on a shard can be managed by a database management process that is configured to respond to data request delivered from the routing processes.

In some embodiments, each shard is implemented as a replica set which can be configured to provide for automatic failover and recovery of each shard in the distributed database. For shards implemented as replica sets, each shard/replica set includes a set of nodes (e.g., servers, computer systems, etc.) hosting one or more of a plurality of databases instances. (See e.g., FIG. 12A-F). According to one embodiment, within the set of nodes a primary node hosts a primary instance of any database instances associated with the shard and secondary nodes within the replica set host eventually consistent copies of the database instances. Each of the database instances can be configured to respond to data requests received from routing processes. In some implementations, write operations on the database can be limited to primary nodes, with each write operation being replicated from the primary to the secondary nodes.

As discussed, a distributed database can implement sharding for the data architecture. Sharding can be implemented as a tool for scaling a distributed database system. Replication of sharded data (e.g., replica sets) can be implemented as the tool for data safety, high availability, and disaster recovery. According to various embodiments, the two features are executed in tandem to facilitate management and administration, yet either can be used alone to manage a distributed database system.

As discussed, the properties of the replica sets can be used in conjunction with sharding of database data to facilitate management and administration of the distributed database. In one embodiment, shard cloning can be executed seamlessly by adding new nodes to a replica set for the shard to replicate. The addition of the new node causes the system to execute replication processes to bring the new node into an active status as a secondary node. Once the shard has been cloned, the sharded data can be further split into additional chucks or shards of data. Typically, splitting a shard once the data has been replicated represents a relatively small computational cost, as generating and distributing new configuration data can be all that is required in some implementations. In some embodiments, the cloned shard can be removed from the replica set and the data further divided into additional partitions, the metadata associated with the additional partitions can be processed by the configuration servers, while the original replica set still services data requests. In some implementations, write operations can be reconciled once the new node is made active, and in response to reconciling any new writes, be made active as a new primary node. Additional secondary nodes can be added to a replica set having the new cloned and sharded system being a primary.

Various embodiments implementing sharded data architectures can be supported by replica sets to facilitate and administer large distributed database systems. Various embodiments, incorporate aspects and embodiments of the replica set environment with aspects and embodiments of the sharded environment. The embodiments and examples discussed below are intended to be used individually and in combination with other embodiments and examples. Specifically, various embodiments discussed with respect to replica sets are implemented in conjunction with any one or more of the embodiments and examples discussed with respect to sharded environments. Further, various embodiments discussed with respect to sharded databases/environments are implemented in conjunction with any one or more of the embodiments and examples discussed with respect to replica set environments.

Replica Set Environment

According to one embodiment, an automatic failover and recovery system for a distributed database includes a set of nodes hosting a plurality of databases instances. The database instances are configured to respond to client requests for information. In one embodiment, the database instances serve as an information data store for a website with which client systems interact.

In one embodiment, a database system can be configured to permit read operations from any node in response to requests from clients. For reads, scalability becomes a function of adding nodes (e.g. servers) and database instances. Within the set of nodes, at least one node is configured as a primary server. A primary server/node provides the system with a writable copy of the database. In one implementation, only a primary node is configured to permit write operations to its database in response to client requests. The primary node processes write requests against its database and replicates the operation/transaction asynchronously throughout the system to connected secondary nodes.

Figure 2:
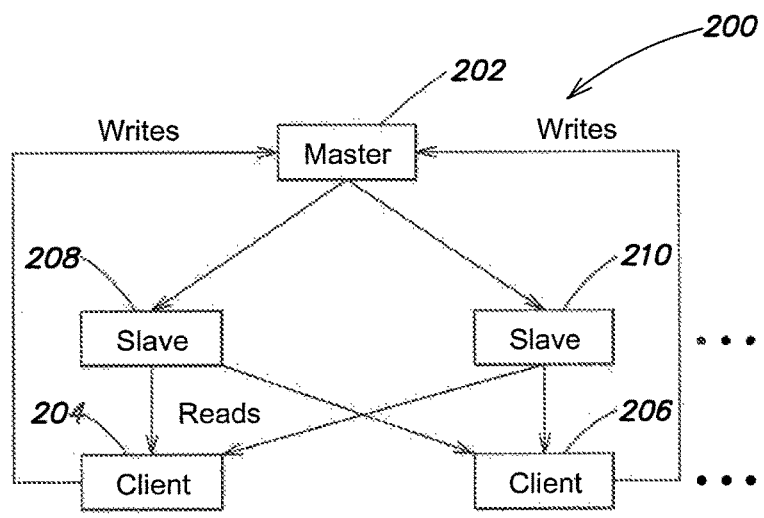
FIG. 2 illustrates a block diagram of an example replica set hosting a distributed database, according to one aspect of the present invention.

In another example, the group of nodes, primary and secondary nodes operate in conjunction to process and replicate database operations. This group of nodes can be thought of a logical unit, a replica set, for handling database operations. Shown, for example, in FIG. 2 are the basic elements of a replica set, a primary or master node 202 and secondary or slave nodes 208-210. The primary node's responsibility can transition between nodes 202, 208, and 210 within the replica set, permitting operation even in light of failures within the replica set. The secondary nodes 208-210 host replicas of the primary database and are configured to take on the primary role automatically in the event of a failure.

In another example, the primary node receives and performs client writes operations and generates an operation log. Each logged operation is replayed by the secondary nodes bringing the replicated databases into synchronization. In some embodiments, the secondary nodes query the primary node to identify operations that need to be replicated. The replica set and/or individual nodes can be configured to response to read request from clients by directing read request to slave nodes 208-210.

In one embodiment, write operations are only committed once a majority of the nodes in a replica set have performed the operation. Any committed operation is viewed as a durable write as the operation will not be lost in the event of failover operations. The write operations are also durable in the sense that node failures, communications failures and network partitions should not compromise the durable operation. Acknowledgement of replicated operations can take place based on executing a return error operation.

According to one aspect, data scaling is provided in a distributed database through sharding of the database into partitions or chunks of data. Each partition or chunk can be managed on a shard server to insure sufficient database resources are assigned to each database partition. According to some embodiments, handling scalability issues based on shards of data while insuring data availability using replica sets can enable high availability, ease of management, and even strongly consistent behavior in an eventual consistency environment. In some embodiments, each shard server is implemented as a replica sets having primary and multiple secondary nodes. In one example, the replica set is treated as a single node by the database system, and the replica set manages data operations received to control their processing. In one example, the replica set can provide strongly consistent behavior by limiting writes to the primary node of the replica sets and committing writes in response to replication of the operation to more than half of the secondary nodes in a replica set. In other embodiments, the replica set can even provide read your own writes consistency based on configurations of the replica set (e.g., primary nodes handle writes and reads with secondary nodes providing for data reliability and durability).

In one example, a client request can include a requirement that the requested operation be confirmed. Environmental specification can include requirements that confirmed operations are durable (e.g., are not lost in the event of primary node failure). In one example, a getlasterror function can return information on the requested operations, and once, for example, a majority of nodes in the replica set have executed the operation, the operation is acknowledged to a client. In some embodiments, read requests can be performed prior to true commitment of the operation across the plurality of nodes. Thus, an implementation that permits loosening of the consistency constraints can achieve improvements on read performance. However, even immediate consistency can be achieved in an eventually consistent environment by configuring the replica set (e.g., read and writes occur at the primary and writes must be acknowledged before committed).

Clients, for example 204-206, from the perspective of a distributed database can include any entity requesting database services. A client can include an end-user system requesting database access and/or a connection to the database. An end-user system can request database services through an intermediary, for example an application protocol interface (API). The client can include the API and/or its associated drivers. Additionally, web based services can interact with a distributed database, and the web based services can be a client for the distributed database.

In another embodiment, write operations can be committed upon reaching a threshold number of nodes in a replica set. In one embodiment, the return error operation can be used in conjunction with asynchronous replication to insure that a predetermined threshold number of systems receive and update their respective databases based on the replicated transaction.

Any node in a set of nodes can be configured to respond to read operations from client computer systems. Both primary and secondary nodes can accept and respond to read requests. In implementations that do not require immediate or strong consistency read operations are typically handled by secondary nodes. In such a setting, consistency may not be strong, as a write operation may exist not yet replicated by the secondary nodes, further consistency may not be immediate for the same reason. According to one embodiment, reads can be restricted to the primary node providing for immediate and/or strong consistency as required.

Figure 6:
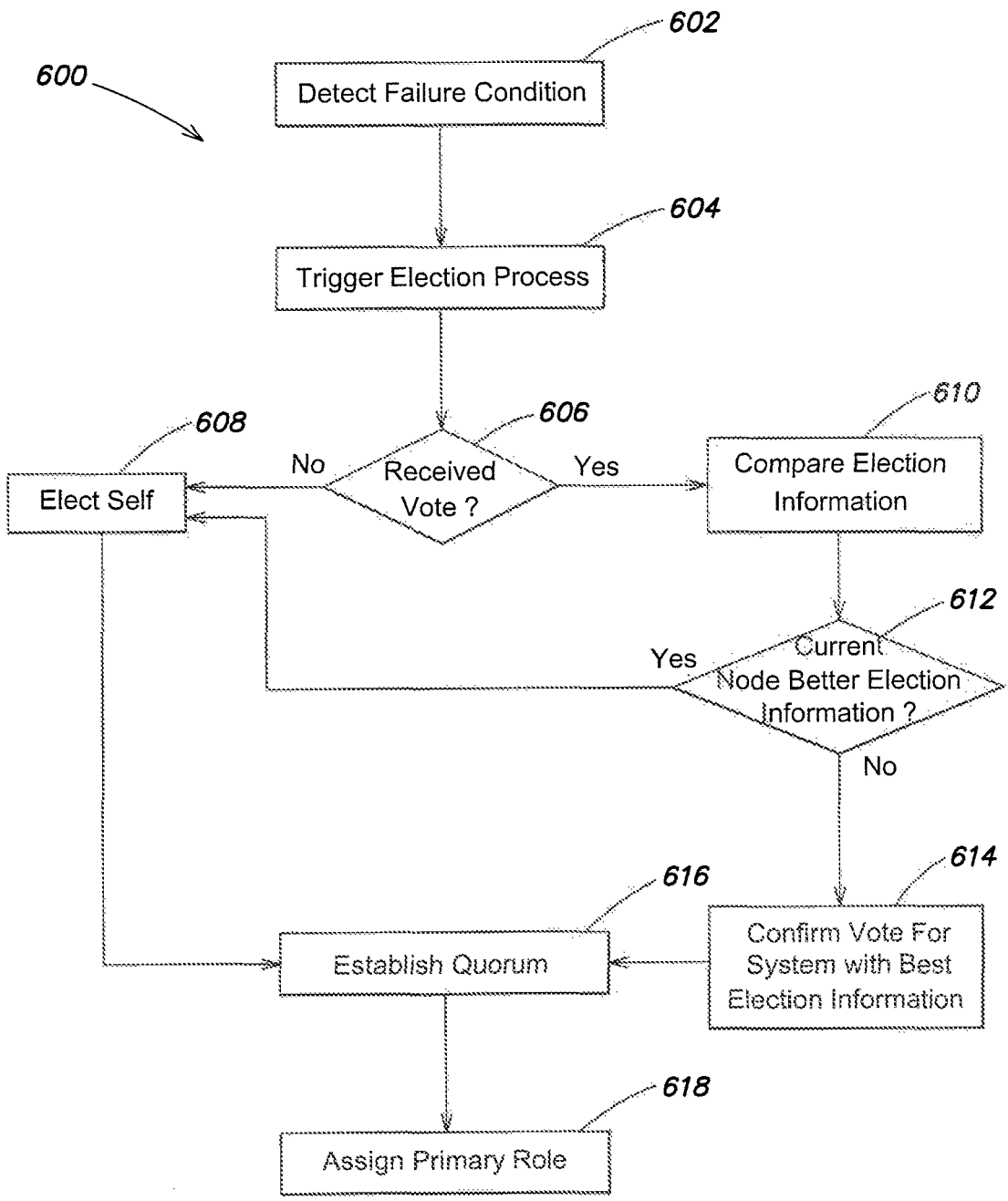
FIG. 6 illustrates an example process flow for automatically electing a primary node in response to a failure, according to one aspect of the present invention.

Typically, there are multiple secondary nodes for each primary node which make up a cluster of nodes. During initial configuration of a replica set, the nodes within a particular cluster of nodes can be identified as peers. New nodes can be added to the cluster and identified as peers. Secondary nodes are configured to identify the primary node for a given replica set. Identification can take place as part of an initial setup operation and/or can occur as part of an election protocol, wherein the nodes within a cluster automatically elect a primary node based on consensus, as discussed in greater detail below. FIG. 6 illustrates an example process for electing a primary node in response to failure, however, similar algorithms can be employed at initialization to elect a primary node.

The secondary node can be referred to as a slave to a primary node/master node. The secondary/slave node uses a unique identifier for the primary/master node from which it will receive updates. According to one embodiment, each of the nodes in the set of nodes is configured with a local database which saves status information on the node's current state, and can also include information on replication status. In a typical setting, the local database is not replicated throughout the replica set. In some examples, additional node types beyond primary and secondary can be employed within any cluster of nodes, these additional nodes types can be configured with or without such local databases.

Each node can be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

In the event that the system detects a communication failure with a master server, for example no heartbeat signal is received, an election protocol can be triggered. In another example, if a master server determines that it cannot communicate with a majority of its slaves, the master can put itself in a recovery state, which will trigger or accelerate an election protocol to identify a new master. In another example, for an individual server that cannot connect to the master or has not received a heartbeat signal from the master, that individual server can be configured to determine the state of other systems, and based on the state information perform various operation including triggering an new master election.

For example, FIG. 1 illustrates example system 100 and a communication failure at 150. System 100 comprises master node 102, slave nodes 104-108, servicing clients 110-116. Communication failure, shown at 150, can trigger failover operation to assign a new master node. Slave nodes 104-108 can assume the master node role based on election.

According to one embodiment of the election protocol, an individual server can be configured to determine if the individual server itself is the source of a communication problem or if the master server is no longer reachable, or operating properly. If the individual server remains connected to, for example, a majority of the servers in the set, then the election protocol continues with a request to establish a new master server. Alternatively, if the server determines that it cannot reach a majority of the servers in the set, the server can be configured to go into an offline state and/or recovery state. In one example, offline servers can periodically check communication status and receive updates once re-connected.

The master server can also be configured to go into a recovery state discussed in greater detail below. When attempting to resynchronize, a secondary/slave node can be configured to request an operation log time to determine if its downtime exceeds the history of operations available. When the downtime exceeds the operation log time, the operation log is insufficient to resynchronize the secondary node. The secondary nodes may return to offline state, or in one embodiment, a resynchronization operation is triggered to refresh the entire database from its primary node.

In some embodiments of an election process, the request to establish a new master includes a state of the server's database that indicates how up-to-date the database for that server is. Each of the servers receiving a request to establish a new master can evaluate its own database against the other participating nodes to determine a most up-to-date server. In other embodiments, a node can be configured to query the other nodes in the set to identify the node with the "best" data. In one example, the election protocol identifies the server with the most up-to-date information and confirms a new master system once a majority of the communicating nodes agree on the new master to use for the system.

In some embodiments, additional considerations can impact the determination of a new master/primary node. In one example, the election protocol can be configured to be location aware. Slave systems can be configured to communicate location information in addition to data timeliness, and in some embodiments instead of data timeliness. For some implementations of the election protocol, various weights can be assigned to status values, so that timeliness of the data on a server is given a greater or lesser weight when evaluated against, for example, the location of the server. Location information can be configured to varying degrees of granularity. For example, geographic position can be used to determine the best system to use as a new master. In other examples, location can be expressed in terms of a position within a rack in a datacenter in lieu of or in addition to geographic position. In one implementation, a slave within the same rack as the failed master can be favored over slaves in nearby racks and/or slaves in different geographic locations.

In one example system, the election protocol establishes a consensus by evaluating votes received from participating slave systems to generate a quorum or consensus of reporting systems. In one example, a particular node can be voted for as the next master system based on a query against the other nodes in the database to determine which node has the freshest data. Once the vote identifying a particular slave system as the most up-to-date (or in another example, the server with the best location) reaches a threshold number of quorum participants, that slave system is confirmed as the new master. As a result, the elected system state is changed from slave to master and the remaining slave systems set the new master as the source for database update operations. According to some embodiments, the election does not require complete participation of the remaining slaves, and typically only a majority of the slave systems need to respond. The system propagates the change in the master server to the remaining slaves and the remaining slaves update their configurations accordingly. The slave servers then perform the operations necessary to bring the slave in sync with the new master database. FIG. 6, described in greater detail below, illustrates one example process, 600 for electing a new master in response to detecting a failure in a replica set.

In some systems, additional server types can be employed in addition to the servers established as masters and slaves (i.e. primary and second nodes). In one example, server systems can be configured with more than one role, functioning as both slave and as an arbiter. A node assigned an arbiter role can be configured to facilitate the election protocol and improve efficiency during election of a new master. Arbiter systems can be configured with "voting" rights in the election protocol, but typically, are not permitted to take on the master server role. In some settings, the arbiter system receives information on slave system status and facilitates reaching consensus by accumulating the status information and communicating information associated with the most suitable candidates. Arbiter system can also positioned advantageously with respect to other nodes in a cluster of nodes. For example, arbiter nodes can establish a different communication point of view of the nodes in a particular cluster and identify nodes most suitable to take on the primary node responsibility. In another example, an arbiter node can be located outside a particular datacenter to permit different views of a network's communication status. According to one embodiment, because the arbiter node can be configured with no data, any latency introduced by its location does not affect overall performance of a replication system, or any particular replica set.

Different election protocols can use arbiters in different capacities, as a conflict resolver where conflicts occur, as a replicator to transmit agreed upon information, and the arbiter can also participate in any grouping of agreeing systems, typically referred to as a quorum. Different consensus protocols have different processes to ensure a proper consensus is reached. In some protocols, certain nodes in a cluster may be given the authority to vote more than once. According to one example, a node can be given multiple votes in the consensus protocol to facilitate election. For example, multiple votes can insure a tie does not result. In one embodiment, a voting system becomes part of a quorum when its vote matches that submitted by another system. Each subsequent system that agrees with the vote becomes another member of the quorum. The quorum systems can be used to confirm votes, improving the consistency of the consensus determination.

Figure 8:
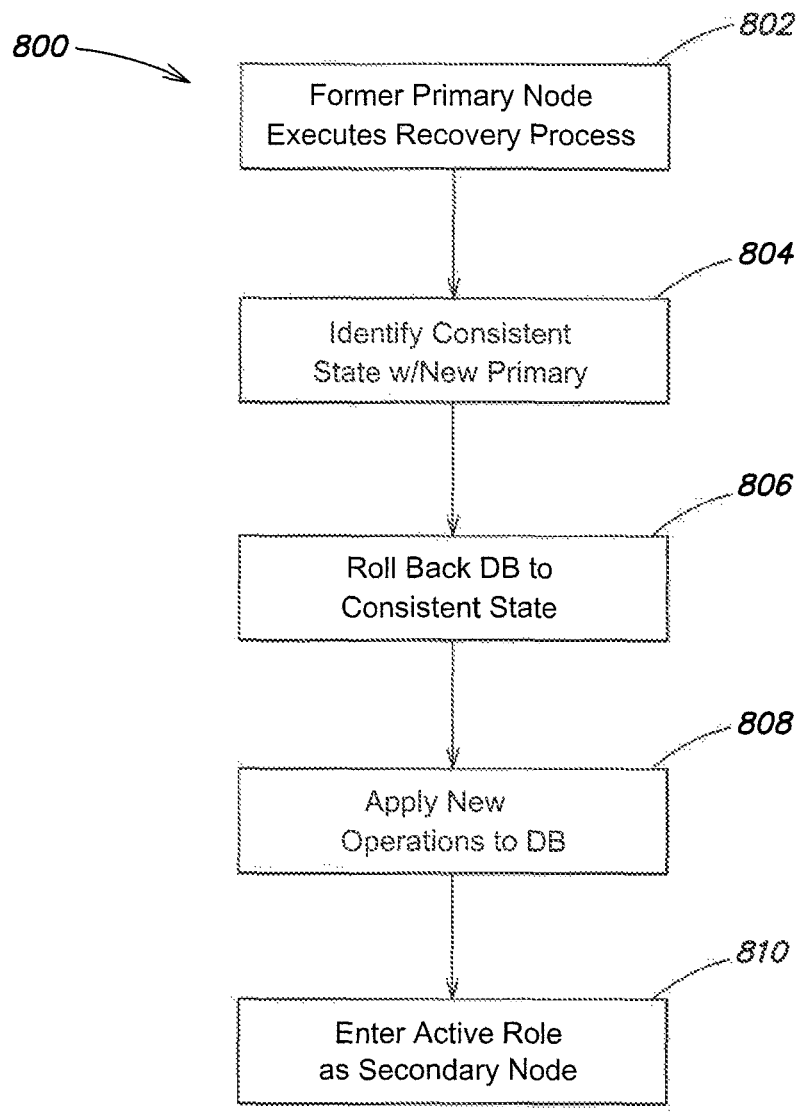
FIG. 8 illustrates an example process for automatic recovery of a former primary node into a replica set, according to one aspect of the present invention.

In additional to automatically establishing a new master server, a replication system can be further configured to re-integrate the former master server. In response to the former master reestablishing connection to the new master server, the former master server will perform reintegration operations automatically. For example, FIG. 8 illustrates an example process for re-integration of a failed master node into a replica set. In some embodiments, the former master detects that it cannot communicate with a majority of the servers in the set of servers. Upon detecting the failed communication, the former master can be configured to place itself in a recovery mode. This will prompt the slaves that could communicate with the former master to participate in the election of a new master. The former master can be configured to monitor its communication status and upon detecting a good connection, trigger reconciliation. The former master is configured to retrace the state of its database via its operation log and can identify the most current point that exists in the former master's database that is consistent with database on the new master server. In one setting, this represents the last durable operation replicated to the replica set.

In another example, a former master can be configured to query the new master to obtain a time associated with the new master's operation log and to identify the operations that need to be performed. The former master rolls back the operations performed on its copy of the database to reach a consistent state. In some embodiments, the consistent state represents the state of the database corresponding to committed transactions replicated from the former master. In one embodiment, the former master can be configured to perform roll back operations based on the operation log that it maintained to reach a point of consistency. In another embodiment, the former master maintains an undo log for the changes in the database. Once the former master has reached the point of consistency with the new master server—consistent with the new master's old state, the former master can execute the operations maintained by the new master server to bring it to the new master's current state. The former master executes the operations received from the new master and the former master becomes consistent with the current state of the datastore. Once the former master is consistent, the former master can be configured to change from recovery mode and become an active slave to system that can, for example, respond to any read request.

Example Resolution of Primary Failover

In one embodiment of the automatic failover system the following behavior can be observed in response to a hypothetical replication and write request scenario. The system is configured with a set of three nodes A, B, and C. Each node is configured with an operation log (reflected below by "oplog( )") where each operation on a respective database is written. The primary node receives and executes any write operation first. Secondary nodes query the primary's operation log to retrieve operations to replicate on their respective database. Typically, the primary node is configured to assign a monotonically increasing value to each operation. In some embodiments, a primary node identifier is also included (e.g., a1, a2, . . . c4, . . . ) with the increasing value.

The following statements report on server status and identify write operations to be performed on the respective nodes:

. . . initial state—no operations
   server-a: secondary oplog: ( )
   server-b: secondary oplog: ( )
   server-c: secondary oplog: ( )
   . . . receive write operations at primary (server-a) a1, a2, a3, a4, a5 . . .
   server-a: primary oplog: (a1, a2, a3, a4, a5)
   server-b: secondary oplog: ( )
   server-c: secondary oplog: ( )
   . . . asynchronous replication . . .
   server-a: primary oplog: (a1, a2, a3, a4, a5)
   server-b: secondary oplog: (a1)
   server-c: secondary oplog: (a1, a2, a3)
   . . . communication failure II server-a goes down . . .
   server-b: secondary oplog: (a1)
   server-c: secondary oplog: (a1, a2, a3)
   . . . initiate election process: server-c higher priority than b: alternatively c and b priority equal but maxoptime for c greater than b
   server-b: secondary oplog: (a1)
   server-c: primary oplog: (a1, a2, a3)//c has highest ordinal value and is elected primary
   . . . continue replication from c to a; receive write request c4 . . .
   server-b: secondary oplog: (a1, a2, a3)
   server-c: primary oplog: (a1, a2, a3, c4)
   . . . server-a resumes: former primary server-a enters recovery . . .
   server-a: recovering oplog: (a1, a2, a3, a4, a5)
   server-b: secondary oplog: (a1, a2, a3)
   server-c: primary oplog: (a1, a2, a3, c4)
   . . . server-a re-synchronizes with c and applies any pending operations b replication continues . . .
   server-a: recovering oplog: (a1, a2, a3, c4)
   server-b: secondary oplog: (a1, a2, a3, c4)
   server-c: primary oplog: (a1, a2, a3, c4)

... primary receives write requests c5, c6, c7, c8 ...
server-a: secondary oplog: (a1, a2, a3, c4)
server-b: secondary oplog: (a1, a2, a3, c4)
server-c: primary oplog: (a1, a2, a3, c4, c5, c6, c7, c8)
... replication to a and b ...
server-a: secondary oplog: (a1, a2, a3, c4, c5, c6, c7, c8)
server-b: secondary oplog: (a1, a2, a3, c4, c5, c6, c7, c8)
server-c: primary oplog: (a1, a2, a3, c4, c5, c6, c7, c8)
... eventual consistency reached for system and nodes ...

As illustrated in the above example, server-c is automatically elected primary after server-a fails. Operations (a4, a5) are lost/discarded during the election of the new primary (server-c) and subsequent recovery operations performed on server-a. Operations c4, c5, c6, c7, and c8 represent new writes operations handled by the new primary server-c. According to the illustration, each operation is assigned a new ordinal value that follows server-c's latest state=a3, and each operation is assigned a subsequent ordinal and the primary server identifier for server c: c4; c5; c6; c7; and c8.

According to one embodiment, a maxoptime function returns the current state of a respective node's database. Maxoptime(0) is an initial state—for each of the nodes, the system is clean with no updates. In some settings, the nodes in a replica set can be configured to obtain a full copy of a primary node's database as an initialization process. As can be observed in the example above, in response to a replication failure within a replica set, an election process is automatically initiated to establish a new primary system. The replication failure can be the result of failed communication from the primary node to a secondary node. For example, a primary node can detect that it cannot communicate with a majority of the nodes in the replica set, and automatically put itself in a recovery state. The nodes still communicating with the primary will now participate in an election process. Likewise, nodes that cannot communicate with the primary can also trigger an election process.

Once a new primary node is elected, the new primary and the remaining nodes in the replica set must reconcile their database states. Consistency is preserved during the reconciliation process by identifying a point of consistency in the new primary's database, reversing any transaction necessary to achieve the point of consistency, and then processing any new incoming transaction from that point forward. In essence, any operations that have not replicated to a majority of the nodes in the replica set are lost during a failover scenario. Secondary nodes in the replica set can be configured to determine if they can achieve the point of consistency with the new primary node and reconcile accordingly. According to one embodiment, permitting discard of uncommitted operations reduces complexity in preserving consistency, providing automatic failover, and/or providing for re-integration of failed primary nodes.

Figure 4:
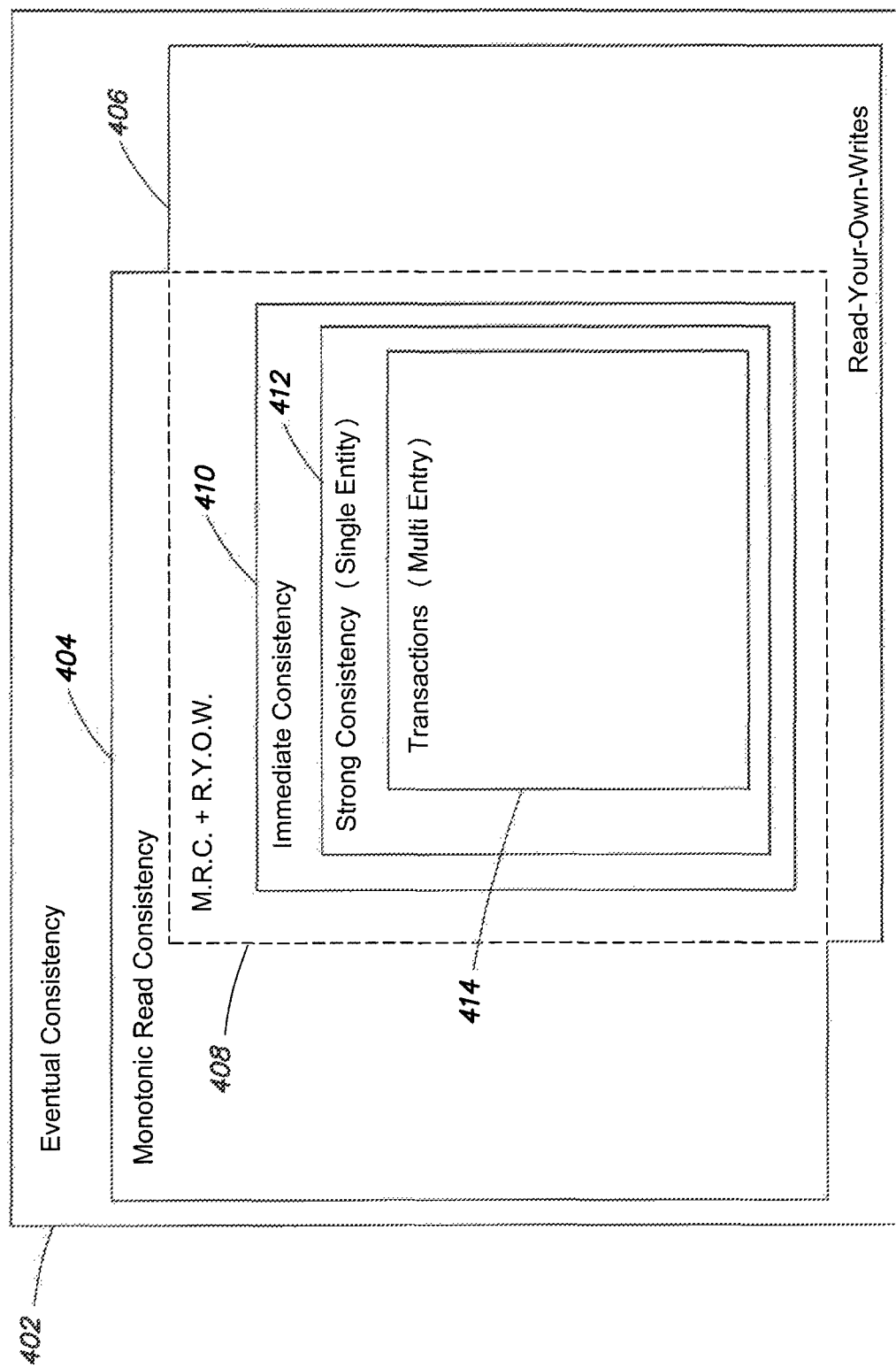
FIG. 4 is block diagram of an example relationship diagram of some consistency models, according to one aspect of the present invention.
Figure 5:
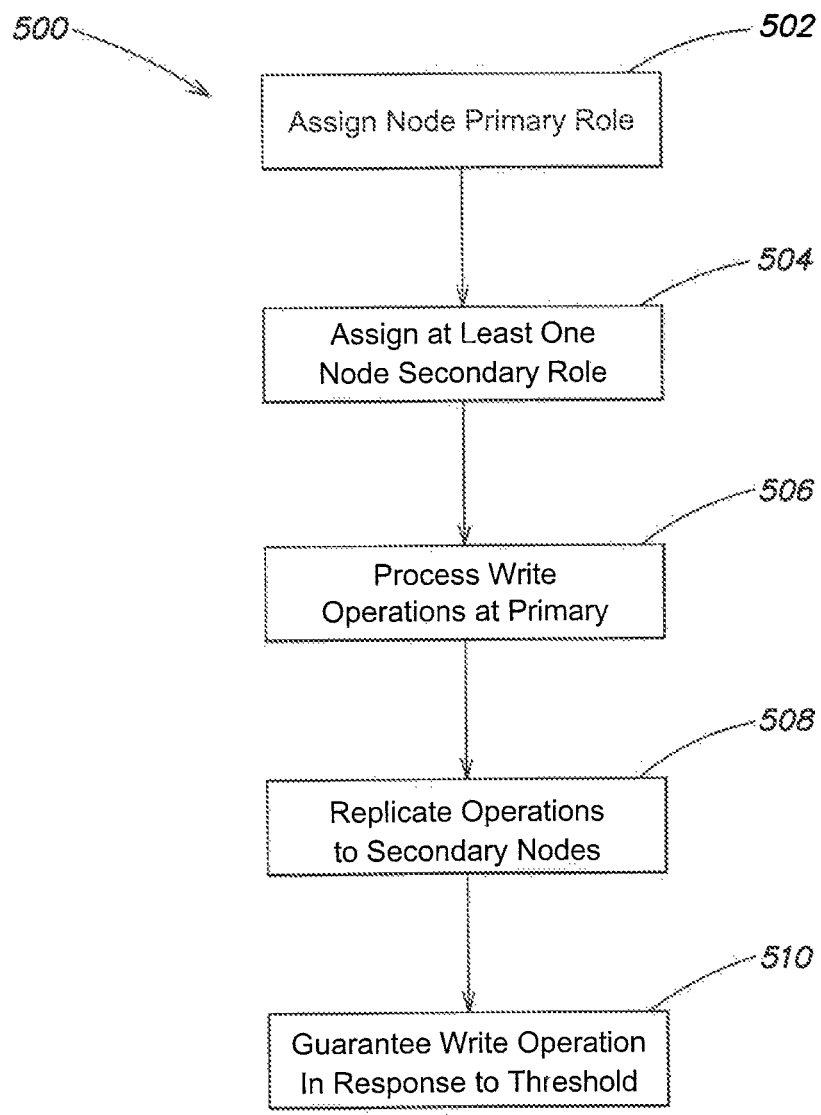
FIG. 5 illustrates an example process flow for asynchronous replication of operations in a distributed database system, according to one aspect of the present invention.

According to one aspect, provided are systems and methods for automatic failover of a distributed database system that maintains strong consistency for a distributed database. One strongly consistent model is shown in FIG. 4, which illustrates the relationship between some database consistency models. In an example setting, a plurality of nodes (e.g. servers) hosting database instances are configured to respond to read and write request made by client systems. Typically the nodes are assigned various roles to facilitate consistency and automatic failover operations. There are two major roles within a replica set hosting a database. A node with a primary role processes write requests and replicates the write requests as transactions to secondary nodes. In one embodiment, replication occurs in response to queries by the secondary nodes against the primary node. A node with a secondary role can be configured to respond to read requests and to process transactions from a primary node (node with the primary role). Other roles can be implemented, including arbiter roles. Arbiter nodes are configured to participate in quorums, for example, as part of an election process. An election process can be invoked in failover scenarios, to automatically select a new primary node in response to communication failures, primary node failures, etc. Typically, an arbiter node does not participate in handling of read or write requests. In one example, an arbiter node does not host any data contained in the replicated database.

Various modifications can be incorporated into the roles. For example, a node can be given a secondary role, with the restriction that it can never become a primary node. In effect, a never primary node, is removed from consideration in the event of a primary node failure. The never primary secondary node can, however, participate in an election process to establish a quorum identification of a new primary node. Other roles can be assigned and can include a back-up role. According to one embodiment, a node having a back-up role does not create indexes for a database it hosts. In essence the back-up node has a full back up of the data but is designated for back up purposes and does not provide its database copy for reading, failover election of primary operations, and/or re-integration of failed primary nodes. In another embodiment, additional roles can be provided, and can include secondary nodes configured to have different indexes than other members in the replica set (e.g. other secondary nodes or even the primary node).

According to one embodiment, a plurality of nodes can be organized in groups of nodes in which data is stored and replicated across the nodes of the set. Each group can be configured as a replica set. In another embodiment, one or more nodes are established as primary nodes that host a writable copy of the database. Each primary/master node can be responsible for a portion of the database, e.g. a database shard. Database sharding breaks up sections of the database into smaller portions based on, for example, ranges of the data. In some implementations, database sharding facilitates scaling a master-slave architecture over a large number of nodes and/or large database implementations. In one embodiment, each database shard has one primary node which replicates its data to its secondary nodes. Database shards can employ location preferences. For example, in a database that includes user records, the majority of accesses can come from specific locations. Migrating a shard primary node to be proximate to those requests can improve efficiency and response time. For example, if a shard for user profile includes address information, shards can be based on ranges within the user profiles, including address information. If the nodes hosting the shard and/or the shard primary node are located proximate to those addresses, improved efficiency can result, as one may observe the majority of requests for that information to come from locations proximate to the addresses within the shard.

In one example, a master node updates its database in response to client write requests, and replicates changes to the database throughout the set of nodes asynchronously. Multiple replica sets, each with their own master node, can be employed. Some traditional database systems employ master and slave nodes, however, these conventional systems fail to properly address the need for new master nodes in response to failures. Conventional systems may also fail to provide automatic assumption of master node responsibilities. Automatic assumption of primary/master node responsibility is particularly beneficial when, for example, the plurality of nodes making up a replica set are distributed across vast distances and include a large numbers of nodes. In these settings, communication failures present significant issues for availability and consistency of data within a distributed database. Under some conventional approaches, any failure of a master node can result in significant downtime and worse can require refreshing of entire databases of master and/or slave nodes during restoration and/or reconciliation.

According to one embodiment, restricting write operations to a primary node simplifies database architectures that favor consistency. However, establishing primary nodes to service write operations requires that primary node failures be resolved quickly, efficiently, while preserving data consistency. Eventually consistent database architectures (asynchronous replication) are potentially vulnerable to primary node failure because of the replication methodology. As discussed above, some conventional systems solve this problem by having multiple nodes that permit write operations (for example multiple master nodes) which host and replicate data. The additional complexity in having multiple nodes with writable database instances is disadvantageous in many settings. Additionally, having multiple writable nodes for the same data may introduce inconsistency that requires complex resolution logic to reconcile conflicting transactions.

According to one embodiment, implementing a primary node that replicates transactions throughout a replica set provides for consistency in a database copy on each node of the replica set using asynchronous replication. Replica sets can be used, for example, in conjunction with web sites that require consistency, and further web sites that can tolerate some loss of data to insure consistency. Because of the nature of the replication process, data may be lost due to a replication failure, and the system can maintain consistency in light of such failures by guaranteeing committed transactions. Other conventional systems focus on the availability of data over consistency and provide costly operations that must resolve inconsistent versions of database images read by client systems. By loosening constraints on availability, for example, better performance can be achieved. In another example, strong consistency can be achieved for systems that can tolerate loss of uncommitted operations.

According to another embodiment, replica sets are configured for automatic failover of primary node responsibilities, while at the same time the replica set is configured to preserve consistency of the database image throughout the replica set. According to one embodiment, strong consistency is achieved in an asynchronous setting through committing write operations that replicate to a majority of the nodes within the replica set and discarding operations that do not replicate to the majority of nodes in a failover scenario. In some embodiments, additional performance increases are achieved in the replica set by permitting reads operations to occur against operations that are not fully committed throughout the replica set.

FIG. 1 illustrates an example implementation of a distributed database system, with primary 102 and secondary nodes 104-108 servicing database requests received from client computer systems 110-116. Client computer systems 110-116 communicate request to the distributed database system over a communication network 120. The client computer systems 110-116 are connected to the communication network through for example router/switches 122-128. In some embodiments, other client computer systems can be configured to communicate requests to the distributed database system. The other client computer systems can be connected to the communication network 120 through communication networks, for example an intranet or private network (not shown). Illustrated at 150 is the effect of a partition event on the communication network 120. The result of the partition event is that slaves 106 and 108 are unavailable to the distributed database system. Slave systems 106 and 108 can be configured to continue processing requests from the client systems 110 and 112 that can reach them. As slave systems are configured to respond only to read requests, the access to such client systems would be restricted to read operations. The effect of a partition event on an example system 100 is discussed in greater detail below. Typically, an election process is triggered in response to loss of communication with the primary node 102. In one embodiment, primary 102 can detect communication failure to a majority of nodes and transition to a recovery state. In recovery state, original primary node 102 can become a secondary a node, and another node in the set of nodes can take on the primary node responsibility.

Shown in FIG. 2, is an example of a replica set, 200, hosting a distributed database 200. Master/primary node 202 accepts write requests from client systems 204-206. Slave/secondary nodes 208-210 accept reads requests from client systems 204-206. The three dots next to slaves 208-210 represent a system component that can be scaled out by adding additional systems. That is multiple additional slave systems can be installed and configured to replicate the database hosted on master system 202. Further, additional slaves systems can be installed and configured to provide responses to client read requests. Additional clients systems can request information and perform write operations on system 200 as also shown by three dots next to clients systems 204-206. In one example implementation, clients systems 204-206 can be permitted to randomly read from slaves 208-210. Other implementations can be configured to provide different levels of consistency, by restricting read requests. For example, read requests can be restricted to systems having up to date data, read requests can also in some settings be restricted to primary systems, among other options.

System 200 can be configured to perform according to a single writer eventually consistent model. The single writer eventually consistent model provides for a loose form of consistency. In one particular example, (assuming >3 slave systems) client systems (e.g. 204-206) request write operations: W(x=3); W(x=7); W(x=5). As the replication of the write requests occurs asynchronously, at some point all of the slave systems (e.g. 208-210) will respond to a read request with 5. However, in the short term (during replication operations) client systems randomly reading from slaves can see [read operations designated by R (variable and actual value)]: R(x==7); R(x==0); R(x==5); and R(x==3). In such a configuration system 200 provides eventual consistency and can permit out of order reads (in the short term). Other example implementations can increase the strength of consistency, and for example, can include monotonic read consistency (no out of order reads).

Figure 3:
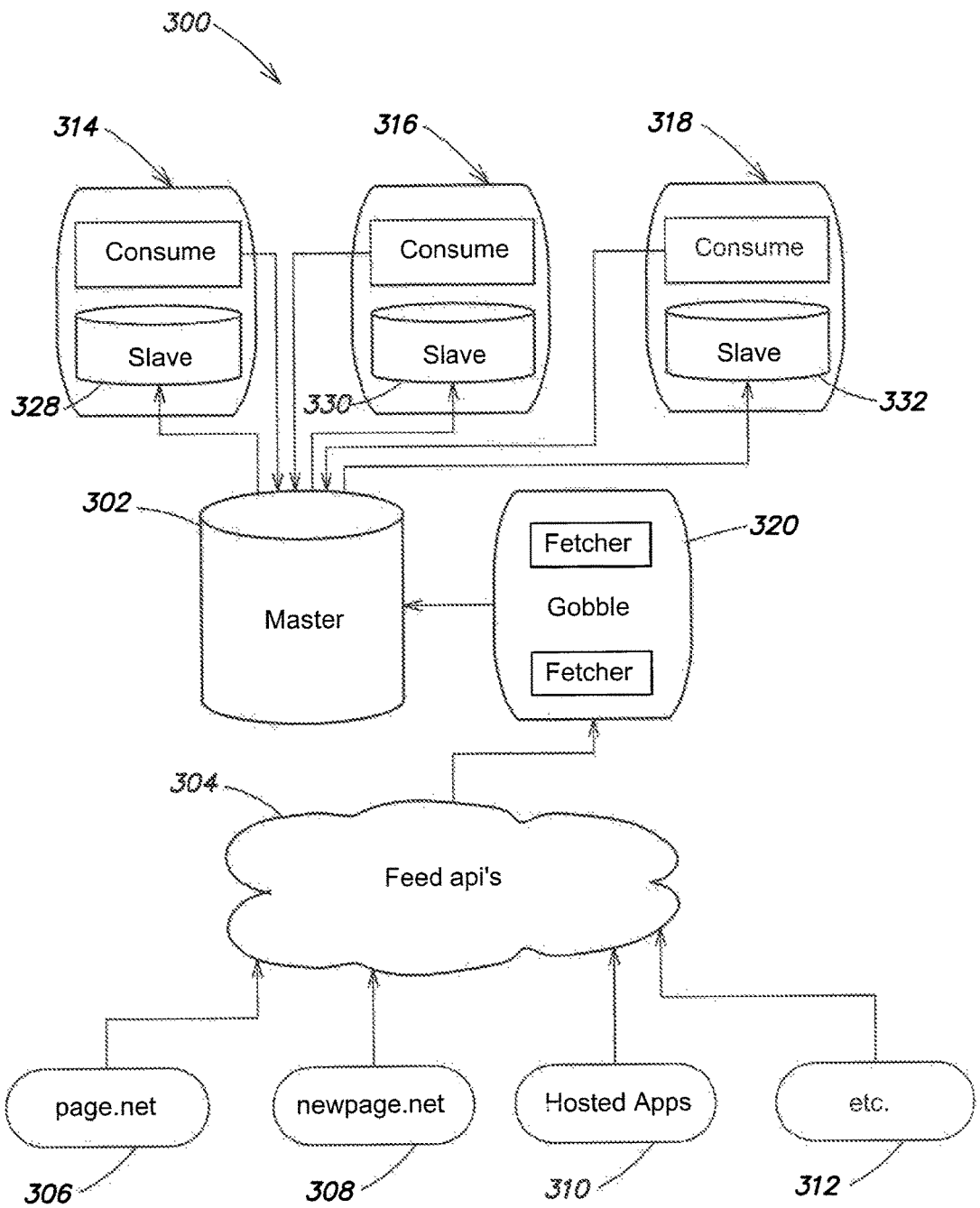
FIG. 3 illustrates an example system architecture for providing a distributed database with automatic failover capability, according to one aspect of the present invention.

Shown in FIG. 3 is an example system 300 that can be configured to provide monotonic read consistency. Master 302 responds to client write operations through various APIs (application protocol interfaces) 304. Various services and/or web based applications can be configured to transmit read and write requests through various APIs 304. For example, multiple webs pages 306 and 308 can be configured to accept and transmit requests from end users for database services, hosted applications 310 can also require that read and write operations be performed on a distributed database in addition to other services 312 that can be configured to process database requests through APIs 304 (for example rss feeds, ecommerce transaction requests, query operations, browsing operations, in other words any service which can invoke a database for storing and/or retrieving data). APIs 304 trigger a fetcher process 306 that coordinates write and read operations against the distributed database, master 304 and slaves 308-312. Replication is asynchronous from master 302 to slaves 308-312 and can be configured to provide for eventual consistency. The fetcher processes 306 can be configured to insure that no out of order reads are returned in response to client requests. Processes 314-318 are invoked by the slaves 308-312 to retrieve the operations on the master 302 that need to be executed. Processes 314-318 are executed periodically to keep the slave systems 308-312 in sync with the database on the master close or in real time.

Shown in FIG. 4 is an example relationship diagram of some consistency models. As shown, eventual consistent model 402 guarantees that if no new updates are made to an object, eventually all accesses will return the last updated value. This eventually consistent model permits out of order reads. Bounded within the broad eventual consistency model are 404 monotonic read consistency, eventual consistency with no out of order reads, and 406 read your own writes consistency models, where a client that requests a write operation is guaranteed to subsequently read that written operation. Read your own writes can result in out of order reads as illustrated by the portion of 406 outside the 404 portion of the diagram. The combination of 404 and 406 yields monotonic read consistency (MRW) and read your own writes (RYOW) at 408. An example system displaying MRW+RYOW properties would include a master-master replication system, where a given client always interacts with a single master. A stronger consistency property would include 410 an immediate consistency model, which provides for immediate consistency where readers and writers to a database always see the most up to date value for a record or document. At 412, shown is a strong consistency model for single entities, which includes a system that supports read and write atomic operations on single data entities. Last, at 414 shown is a full transaction based consistency model where multiple entities provide for consistency by using transaction protocols, and would include the ORACLE model. In the full transaction consistency model 414, as implemented by ORACLE both data consistency and availability are achievable, however, such a model cannot tolerate network partitions. In distributed database systems network partitions are a certainty, thus the transaction consistency model is inappropriate for distributed databases with even a possibility of communication failure.

Thus, it is recognized that solutions are needed that automatically preserve write access to database implementations in the presence of network partitions and other failure events, and further systems are needed that provide for assumption of a primary node's responsibilities within a replica set. Additionally, assurance of strong consistency within a replica set can also be provided based on the configuration of the replica set even during and after failover operations. Strong consistency can even be maintained using an eventual consistency framework, where replication operations are propagated from a primary system to secondary system asynchronously.

According to one embodiment, a system implementing one or more replica sets can be configured to provide for immediate consistency. In one example of an immediately consistent model, each reader and writer (e.g. client systems) to the database always sees the latest updated values within the database. In one embodiment, the operations performed on the database are atomic, i.e. an operation is successful or not. Thus any successful write on the database is immediately seen by subsequent read requests. In another embodiment, immediate consistency is achieved by limiting read operations to primary nodes. In some other embodiments, the system limits read requests to a primary node in response to having performed a write operation. Some example systems limit reads requests to the primary node for a period of time after processing a write operation. Once the period of time expires any node, primary or secondary, can respond to read requests. In some settings, the time period can be set to insure that a write operation has time to replicate throughout the replica set. Various timing parameters can be used, and the system can be configured with timing parameters to limit read requests to a primary node until the specified time elapses. In one example, the system can be monitored to determine a typical and/or average time for replication and a timing parameter can be set accordingly.

In another embodiment, a system implementing one or more replica sets can be configured to provide strong consistency, where at any given point of time there is no question of the latest version of a record and/or document found on a primary node. Some embodiments incorporate monotonically increasing values with operations on the database, thus the system can be configured to guarantee consistent versions of a record/document will be accessed in response to read/write requests on the database. The system can also insure that replication of operations occurs consistently. In some examples, secondary nodes monitor received operations based on the monotonically increasing value and reference the value for its last update. Thus any potential inconsistency can be detected and corrected by the system with a new query to a primary node to retrieve the operation with the appropriate value.

Process 500, illustrates an example of a process for asynchronous replication of operations in a distributed database system. Given a set of nodes on which a database is implemented, process 500 begins with assigning primary and secondary roles to nodes in a replica set. Assignment of a primary node can occur as part of an initialization at start up. In one alternative, assignment can occur based on the set of nodes that make up a replica set electing the primary at startup. Initialization can also include full replication of a database from one node to other node in the set. For example, a node may be added or initialized into a set using a synchronization operation that causes the node to capture a complete copy of a database as it exists on another node. Once synchronization is complete, replication operations can proceed for that node.

In some implementations, a single primary node provides a writable copy of a database, where write operations performed on the primary node are replicated asynchronously to all of the primary's secondary nodes. The primary node replicates operations, for example, writes, by generating an operation log that reflects the operations performed on the primary/master database. The operations are then transmitted asynchronously from the primary node to its respective secondary nodes. In some settings, the secondary nodes are configured to periodically query the operation log of the primary node to determine any operations that should be retrieved and executed. According to one embodiment, the operation log is configured to be part of the database itself. In another embodiment, the operation log is configured to not exceed a maximum size.

As operations occur they are logged until the maximum log size is obtained, at which time the oldest operations are discarded in favor of the newer operations. The transaction log thus reflects a window of time for operations that can be replicated based on the permitted size of the operation log. The larger the size of the operation log, the greater the tolerance for downtime of nodes in the replica set. In one example, an operation log can be configured to a maximum size of 5-10% of the node's hard drive space. Other sizing for the operation log can be employed.

Each operation in the log can be associated with a time and an increasing value so that an order can be determined for each operation. In one example, a monotonically increasing to value is employed and associated with each operation. Each operation can also be time stamped. In one embodiment, the time stamp reflects the time of the primary node. Based on analysis of a first and last operation, a maximum operation log time can be determined. The maximum operation log time can be used in conjunction with replication operations to identify systems too far out of synchronization to replay operations from the log and thus require refreshing of the entire database. In some embodiments, the operation log can be implemented as part of the collection of data and is thus replicated throughout the replica set. In some embodiments, each node can be also configured with a local database which is not replicated.

The local database can be configured to maintain information on local state. For example, a secondary node can maintain information on its lag time (any delay between synchronization with primary), time of last applied operation, address of primary node, as examples. Specific node configurations can also be configured in the node's local database. In one embodiment, a secondary node executes a query against a primary node to determine all operations on the primary with a time stamp equal or greater than the last applied operation time stamp in its local database. In another embodiment, the secondary node can query the primary node to determine all operations on the primary with an operation value (the increasing value) greater than or equal to the operation value last executed on the secondary.

In another embodiment, the secondary node can identify based on the first operation retrieved whether there are any missing operations. In the event of missing operations, a secondary node can be configured to halt replication and enter an offline state. Once in the offline state, a node may require intervention to restore function. In some examples, a node can be automatically returned from halted replication by refreshing the entire database for the node.

The transaction log of the operations performed on the primary node can reflect optimizations and/or transformations of the operations performed at the primary node. For example, increment operations performed on the master database can be transformed into set operations. In some examples, operations performed on the primary can be merged prior to generating an entry on the transaction log reducing the overall number of operations replicated to the secondary nodes.

According to one embodiment, the primary node also maintains an undo log that facilitates reversal of transactions performed on its database. Uncommitted transactions, for example, may need to be rolled back during failover situations. Replication from a primary to secondary nodes can include a commitment operation. In one embodiment, a distributed database can be hosted across multiple primary nodes with each primary node hosting a shard of the database. A database shard forms a distinct portion of the database. Each shard can be configured based on ranges of values, for example, with the entirety of the value ranges being represented across the primary nodes of the database.

In one embodiment, at 502 a node is assigned a primary role, making the node the primary node. Additional nodes can be assigned a secondary role at 504. Each secondary node hosts a replica of the database on the primary node. From a client perspective, the databases hosted on the secondary nodes are read only. The secondary node databases are only updated in response to operations received from the primary node.

In some implementations, in addition to hosting read only replicas of the primary database the secondary nodes are configured to assist in the operation of the replica set. In particular, the secondary nodes participate in protocols to elect a new primary node in the event of failures within the replica set. Such protocols can be based on establishing a new primary node based on a quorum of participating nodes. Such a quorum protocol can be configured to require majority participation, for example, or can be configured require a threshold number of participants prior to completing any quorum protocol. A secondary node is configured to respond read requests with its most up-to-date data. In some settings, the secondary node can be configured to respond to read requests with not fully committed data to provide the most up-to-date response. In one embodiment, read requests can be blocked for particular nodes or particular documents within a database until any write operations affecting the data have been committed.

Secondary nodes, as well as the primary, can monitor communication status with other nodes to determine if a failure has occurred. Communication failures can be readily detected by monitoring, for example, heartbeat signals from other nodes in a replica set. In some embodiments, the primary node can detect failure and place itself in a recovery state, triggering election processes by secondary nodes. Secondary nodes participate in voting processes, discussed in greater detail below.

Once a primary node and at least one secondary node have been established, steps 502 and 504, the basic elements of a replica set are configured. According to one embodiment, a replica set is initially configured with a primary node and at least one secondary node. In addition to primary and secondary nodes, other node types can be employed in a replica set. Additional nodes types can include a passive node, which can include any function performed by a secondary node, with the exception of being elected as a primary node. For example, a passive node can participate in voting for a new primary but will never take on the primary node role. Arbiter nodes can be established within a replica set. In some embodiments, arbiters are configured to facilitate the quorum/election protocols. For example, Arbiters can improve efficiency during election of a new primary node. Arbiter systems can be configured with "voting" rights in the election protocol, but typically, are not configured to take on the primary node role. In some settings, the arbiter system receives information on secondary system status and facilitates reaching consensus by accumulating and communication the status information for election protocols. Other example nodes can include back-up nodes used to maintain non-indexed copies of the database. Further, a replica set can also be configured to permit nodes with different indexes for their respective database instances.

At 506, a replica set is configured to respond to a client write request by processing the write operation on the primary node. In some settings, a client requests database access through application protocol interfaces (APIs). An API can be configured to execute a driver that can identify a primary node in a replica set. In one example, a driver program is configured to connect to the entire replica set and identify any primary. The API, and/or an associated driver, can be configured to retain information on any identified primary node. In the event of primary node failure an error can be returned when a request asks a non-primary node to perform primary only operations, e.g. write. In response to such an error, the API and/or any associated driver can be configured to re-indentify a new primary node.

The primary node generates an operation log for each database operation, and the operation is replicated asynchronously to the secondary nodes at 508 by having the secondary nodes execute the operation from the primary node's operation log. According to one embodiment, the secondary nodes also record operation records to a secondary local operation log to track applied operations. During generation of the operation log on the primary node, each operation can be assigned a monotonically increasing value. Further, each operation can also be associated with information on the primary node. For example, an identifier for the primary node can be assigned, and/or a time stamp can be assigned based on the primary node time. A maximum operation time can reflect the monotonically increasing value and thus can be used to identify how up-to-date a secondary node's database is. Various functions can request a maximum operation time from a node to determine the respective state of the node's database.

Each secondary node can be configured to participate in an election protocol that establishes by quorum comprising a threshold number of nodes that a particular node should be the new primary node. For example, the secondary node can be configured to join and/or announce membership in a group of secondary nodes that have also identified a particular node as the next primary node. Once the number of members in the group/quorum reaches a threshold number, the elected node can be assigned a primary role. In one example, an arbiter system can collect status information on quorum participants. The arbiter system can be further configured to communicate the quorum result and/or trigger the status change to primary. In some embodiments, the quorum protocol is configured to require that a majority of the nodes responsible for the written data participate in the quorum prior to sending an acknowledgement.

One example election process includes querying all others nodes for their maxappliedoptime. For a node that determines it has the greatest maxappliedoptime (freshest data set), that node will attempt to elect itself. The self elect operation can be restricted to nodes that can communicate with a majority of nodes in the replica set. Upon receipt of a vote message, a given node will determine if its data is fresher and if not, confirm the received vote, and if yes, respond to the vote message with a negative vote. The example process can be augmented, by including timeouts for sending vote messages. For example, after confirming a vote or electing self, a node can be configured to respond negatively to all other vote messages for a period of time. In addition, the above process can be repeated until a node is elected. In some examples, tie resolution can include a random wait period and a new check for freshest data/maxapplied optime.

In some settings, a primary node can be configured to block write requests when secondary nodes are too far behind. In one example, a maximum lag value can be configured for a replica set that triggers a primary node to block write requests when exceeded. In one embodiment, the maximum lag time can be expressed at a maximum lag time for a threshold number of nodes. If the number of number nodes with a lag time exceeds the threshold, the primary node blocks write operations. In one implementation, lag time for a particular node can be reported periodically. In another implementation, queries can be executed against nodes in the replica set to determine lag time. In some settings, secondary nodes can request that a primary node block write operations in response to lag time. Lag time can also be calculated and/or reported on by, for example, arbiter nodes based on queried maximum operation time. Additionally, arbiter nodes can report on status messages from secondary nodes that reflect maximum operation time for the given node. In some embodiment, secondary nodes are configured to provide reporting on status, and in some examples, can be configured to track status information on other nodes in a replica set.

At 510, once an operation has been replicated at a threshold number of nodes, the operations can be guaranteed to be retained by the replica set. For example, where the threshold number of nodes represents a majority of the nodes in the replica set, even in light of a failed primary, the operation that has reached the majority of nodes will be retained. Although automatic fail-over processing can result in lost data, an operation becomes durable once replicated across a majority of the nodes within the replica set. In one example, during a failover scenario an operation having reached a majority of nodes will be present on any node subsequently elected primary, preserving the operation. According to one embodiment, transactions that have not replicated to a majority of nodes in the replica set can be discarded during failover scenarios. For example, election of a new primary identifies a secondary node with the freshest data, and re-integration of the failed primary will result in loss of any data not present on the new primary.

In some embodiments, nodes can be prevented from taking on role of a primary to prevent data loss. In particular, transient failures of communication and even failure of an entire datacenter's power can occur in routine operation. By configuring each node with a local uptime counter, a node can check its uptime to determine eligibility for primary status. Requiring eligibility checks, for example based on uptime, can prevent data loss in the event of transient failures and even where a datacenter looses power. As the nodes in a replica are restored, depending on the order in which the nodes return to operation a secondary node could trigger a failover process. Failover procedures can result in the loss of data that has not replicated to a majority of nodes. Limiting a primary election process to eligible nodes can minimize resulting data loss.

Example process 600, FIG. 6, illustrates an example failure and primary node election process. Process 600 begins at 602 with the detection of a failure event. Failure events can be based on communication failures. For example, each node in a replica set can be configured to provide a heartbeat communication message, the absence of the heartbeat message permits identification of communication failures. Other examples include secondary nodes that receive error messages when attempting to query their primary nodes. Further, power failures and/or hardware failures on nodes can result in a failure event that triggers an election protocol at 604. The first node to participate in the election process will not have received any vote messages from any other nodes 606 NO and will seek to elect itself at 608. For other nodes participating in the election, the node may 606 YES or may not 606 NO have received a message from other nodes requesting that the node confirm a received vote. If a vote is received 606 YES, a node compares the election information of the received vote against its own values at 610. If the node has greater election values, for example, a higher priority, fresher data, better location, size of hardware, etc., the node attempts to elect itself at 608. The systems that attempt to elect themselves will become part of a quorum of systems at 616 representing the identification of a node that can take on the primary node role. Nodes will enter the quorum either by electing itself at 608 or by confirming a vote for another node at 614. If for example at 612 NO, it is determined that a node receiving a vote does not have election information greater than the received vote, then the receiving node confirms the vote for the node with the best election information at 614. If the receiving node has better election information 612 YES, the receiving node can vote for itself at 608. Once the quorum reaches a threshold value for the number of participating systems, the node identified for primary by the majority of participating nodes is assigned the primary node role at 618. In one embodiment, the threshold is set to require a majority of the nodes in the replica set to agree on the next primary node. Other embodiments can use different threshold values.

Figure 7:
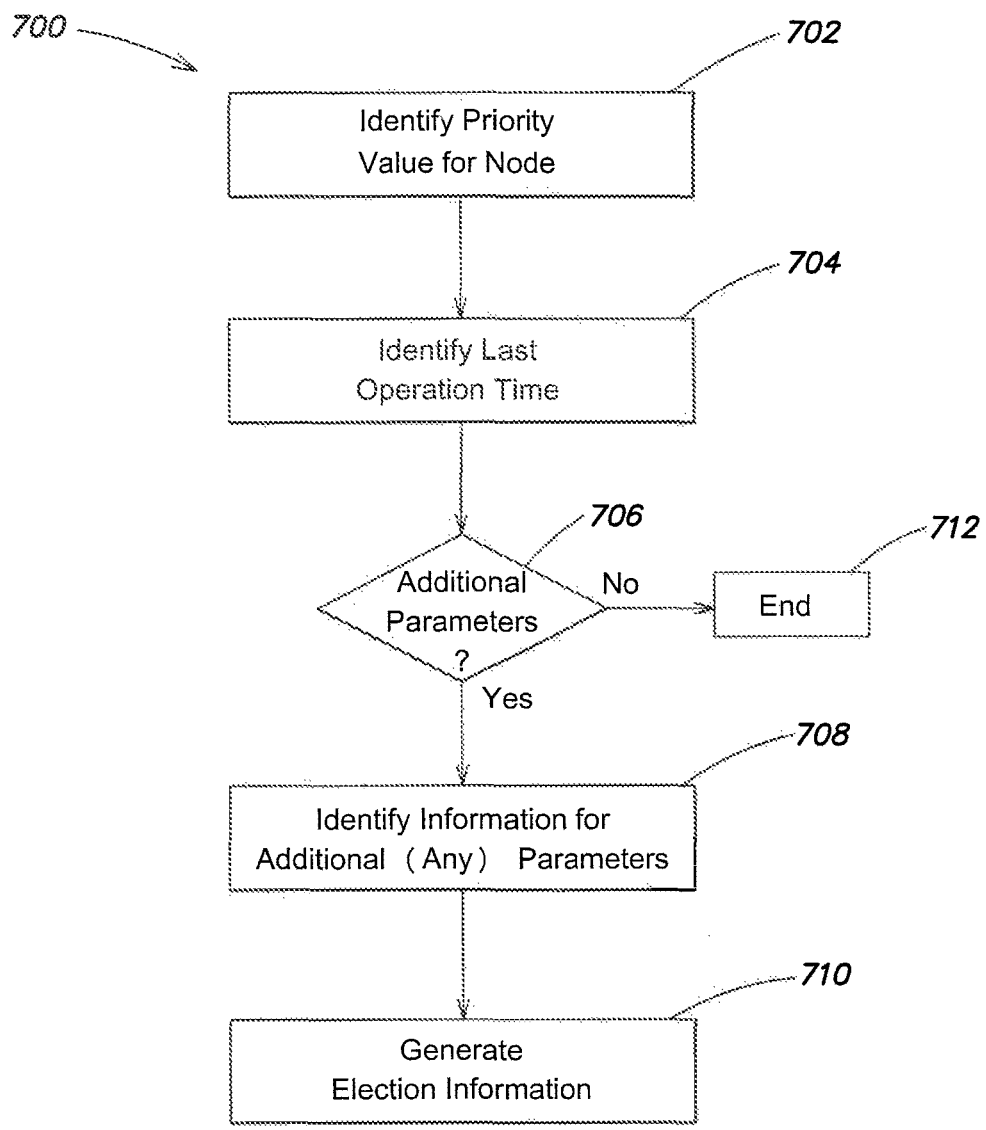
FIG. 7 illustrates an example process for determining election information for nodes in a replica set, according to one aspect of the present invention.

Further, the calculation of election values can include execution of election information generation sub-process. An example process 700 for determining election information is illustrated in FIG. 7. Process 700 begins with a node determining its priority from its local database at 702. In addition to priority value, a value associated with the node's last executed operation can be retrieved from the node's the local database at 704. In the event of equal priority value, the node with the freshest data will be elected (i.e. the node with the better operation value). In one example, the node with the smallest lag from the former primary node will generate the highest election value. Other embodiments can resolve additional parameters in determining its election value. For example, 706 YES, additional parameters can be included in the determination of a node's election information. In one embodiment, location of the node can be given a value depending on a preferred location and captured at 708. In another embodiment, nodes within the same rack as the former primary node can be favored over other nodes in the replica set. In yet another embodiment, location values can depend on geographic position, and a node with a different location than the current primary node can be favored. Hardware size of a node can be assigned a value in determining, an overall election value. Communication history can also be factored into election information for a particular node. For example, historic communication stability can improve a determined election value, and conversely a history of communication failure can lower an election value.

If an election information has been received from another node, and the present node has a lower priority value, and/or older data 706 NO no further evaluation is required and process 700 can terminate at 712. If no election information has been received, a node will aggregate election information for an attempt to self elect. In one example, the election value can include priority, last operation time, location, and hardware configuration. Other embodiments can use different values, different combination, or subsets of the identified parameters and generate election information/election values including those parameters at 710.

According to one embodiment, once a new primary system is elected, the replica set continues to response to read and write requests normally. Although for clients with connections established to the former primary node, errors will be returned as the client attempts to perform operations against the former primary. The errors can be returned based on an inability to communicate if, for example, a communication failure caused a new primary to be elected. Errors will also be returned if the former primary itself failed. Additionally, errors will also be returned if the former primary has been re-established as a secondary node. In response to a write request a former primary responds with an error message indicating that it is not primary. In one embodiment, the former primary can also be configured to respond with the address of its current primary. In one alternative, a client can discover a new primary in response to the error message. A new primary may need to be discovered any time the primary node changes from one node to another in a replica set. Discovery can occur by connecting to the entire replica set, as one example. In one alternative, the node returning a not primary error message can be configured to identify the node it believes is primary and if the node returning the error message does not have the address of the primary yet, that state can be indicated in a returned error message. The return of additional information with the not primary error message can be limited to systems that had the primary node responsibility within a configurable amount of time from receiving the request.

FIG. 8 illustrates an example process, 800, FIG. 8, for automatic recovery of a former primary node into the replica set. Processes for reintegration can be configured to execute in minimum time. In particular, reintegration can be performed to automatically remove uncommitted data to return to a database state from which normal replication operations can be performed to bring the former primary node to a synchronized state with the new primary node. By configuring the reintegration process to permit data loss, rather than on focusing on maintaining all written data, failed primary node can be efficiently reintegrated into a replica set. In one particular example, the reintegration of a failed primary node can take place without any administration. Further, in some examples, reintegration can occur without any conflict resolution logic. In one embodiment, eliminating conflict resolution and administration provides for streamlined and efficient reintegration of nodes into a replica set.

Example process 800 provides for reintegration of a former primary node into a replica set. Process 800 begins at step 802 with a former primary node executing a recovery process. Step 802 can include an act of the former primary node placing itself in a recovery state. Entering a recovery state can be used to trigger other processes, for example, an election process for a new primary. Step 802 may be the result of the former primary node returning to an operative condition. For example, power loss may have rendered the former primary node inoperable or networks failures prevented communication from the former primary to other nodes. Hardware failures may also cause outages. At step 802 the source of the failure event is rectified and the former primary node will attempt to participate in the replica set. Executing a recovery process at 802 can also include various state checks for the node. For example, upon start up any node may determine its last executed operation, and/or last communication time to determined if it should continue normal operation. Further a node can identify if it has lost power, was not gracefully shutdown, among other state checks that can be used to identify the need for recovery processing.

At 804, the former primary node detects the new primary node in the system and identifies a consistent state with the new primary system. In some examples, a new primary may not be elected yet, which requires execution of a wait operation and subsequent identification of the newly elected primary node. As discussed above, the former primary node can connect to the entire replica set to identify the new primary. In some alternatives, the former primary can receive information on the new primary from secondary nodes, etc. The former primary queries the operation log of the new primary to identify a point of consistency between the two databases. The query can be based on an operation time stamp, for example. In some examples, the query can identify the last operation received from the former primary. In one alternative, a query can identify the last operation in the new primary operation log with the former primary's identifier. Various queries can be used to identify, for example, a historical point of consistency between the former primary and the new primary. Additionally, the query employed may identify that no point of consistency exists. For example, the new primary may no longer have the operations in its operation log that would permit the former primary to rejoin the replica set. The former primary can be required to refresh its database to resolve that situation. Alternatively, the former primary can be configured to enter an off-line state that requires intervention.

According to one embodiment, at 804 the former primary node identifies point of consistency between its database and the database of the new primary. The former primary rolls back the operations that were executed against its database to achieve the point of consistency at 806. The data represented by each rolled back transaction is removed from the database. According to one embodiment, the data can be sacrificed to achieve zero administration reintegration. In some settings, the rolled back operations can be copied to the local database (a not replicated database). The locally tracked operations can be monitored for determining performance of the database for example. Further, it is realized that highly efficient reintegration can be achieved by permitting data loss, as no conflict resolution is required to reintegrate. The time to reintegrate the former primary becomes a function of identifying the point of consistency (which can be determined from one query), rolling back any subsequent transactions, and entering normal replication for new operations performed on the new primary.

According to one embodiment, the former primary node can be configured with an undo log to facilitate roll back of executed operations at 806. In some implementations, each node in a replica set can be configured with an undo log. In one example, the undo log is only made active for nodes that assume the primary role. As the primary role can migrate throughout the replica, each node capable of assuming the primary role is configured with an undo log capability.

Once the former primary node reaches the point of consistency, replication processes can bring the former primary in sync with the new primary. The former primary node can retrieve any new operations from the primary, execute the new operations, 808, and re-enter the replica set as an active secondary node at 810. In one example, the former primary node queries the new primary to determine any operations that need to be applied. In some examples, the query to identify the point of consistency and the query to obtain new operations can occur at the same time.

Figure 12A:
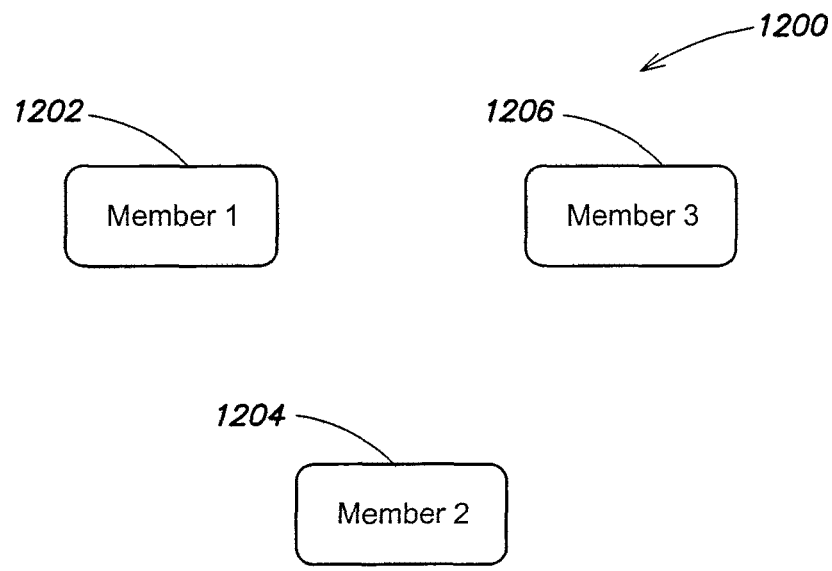
FIGS. 12A-F illustrate an example implementation of a replica set, and transitions of state of respective nodes during recovery and re-integration of a primary node.
Figure 12B:
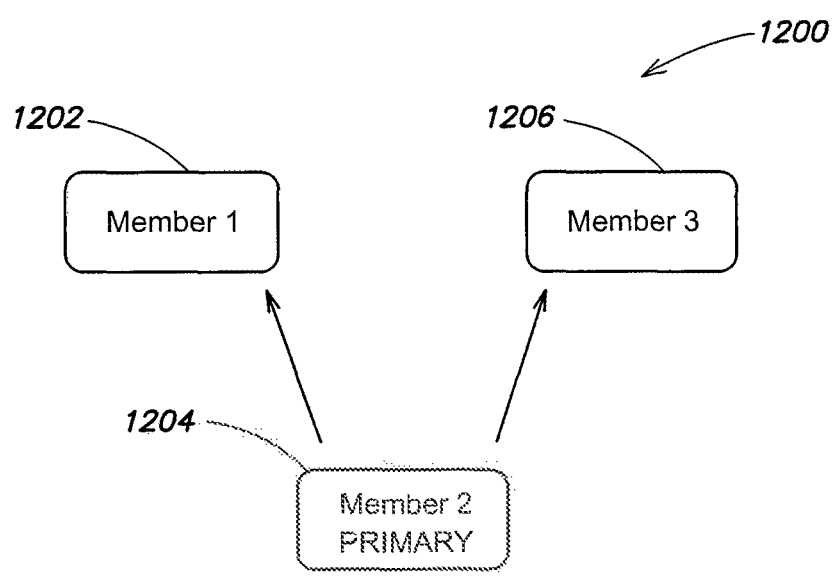
Figure 12C:
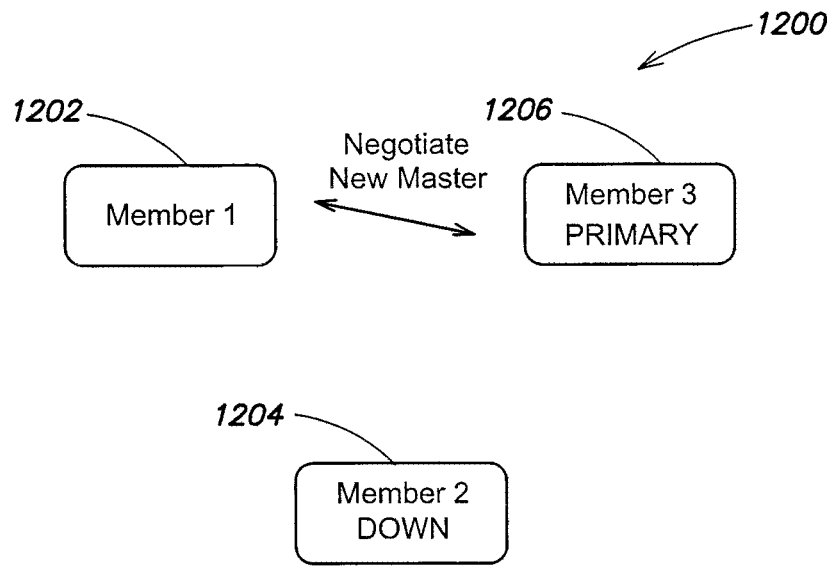
Figure 12D:
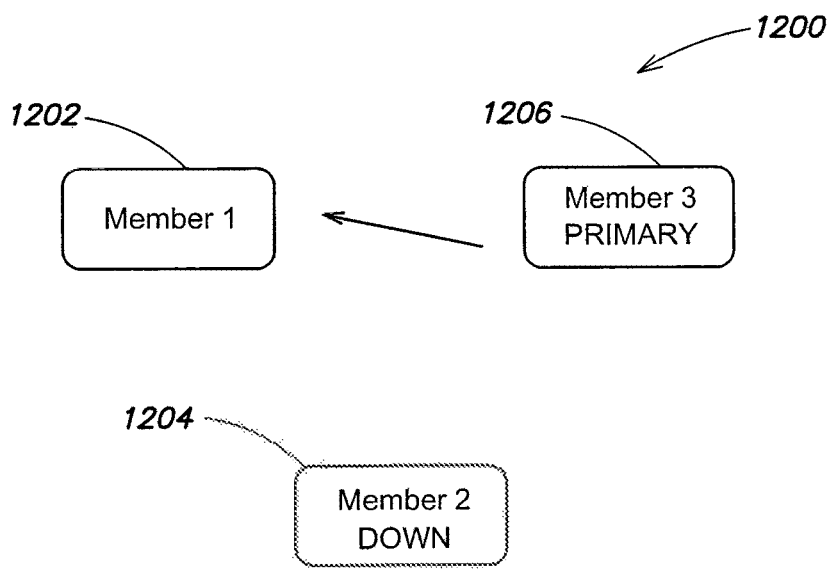

FIGS. 12A-F illustrate an example replica set, 1200, and resulting transitions of state for the members of the replica set during recovery and re-integration of a primary node. Shown in FIG. 12A are three nodes 1202-1206 configured to operate as a replica set. The replica set serves client requests for database operations. At initialization the replica set can be configured with a primary node 1204 that serves as a master node for secondary nodes 1202 and 1206 as shown in FIG. 12B. In some settings, the replica set can be initialized without a primary node. The members of the replica set are configured to promote one of the nodes as a primary node, and in response to initialization, the node 1204, can be selected as primary. FIG. 12C illustrates one example of a replica failure, and in particular, failure of the primary node 1204. The failure of 1204 triggers operations for set members 1202 and 1206 to identify and establish a new primary node for the replica set.

Figure 12E:
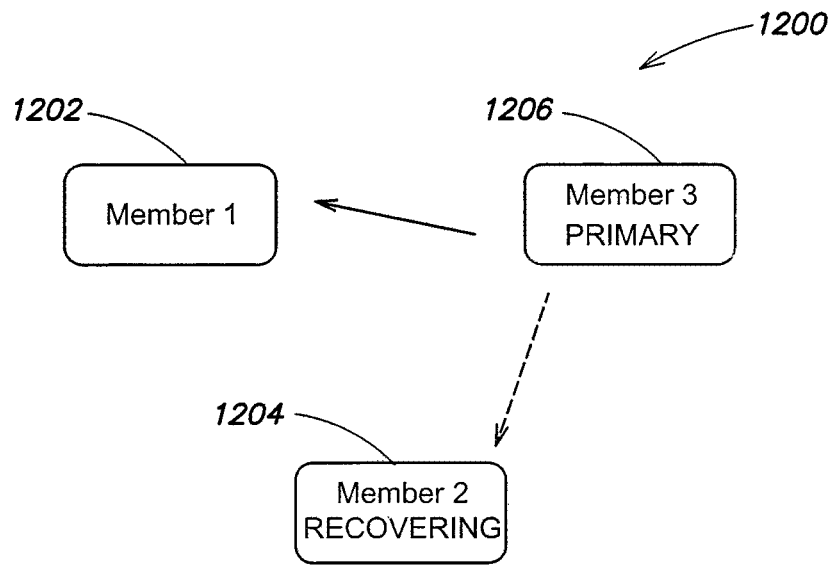
Figure 12F:
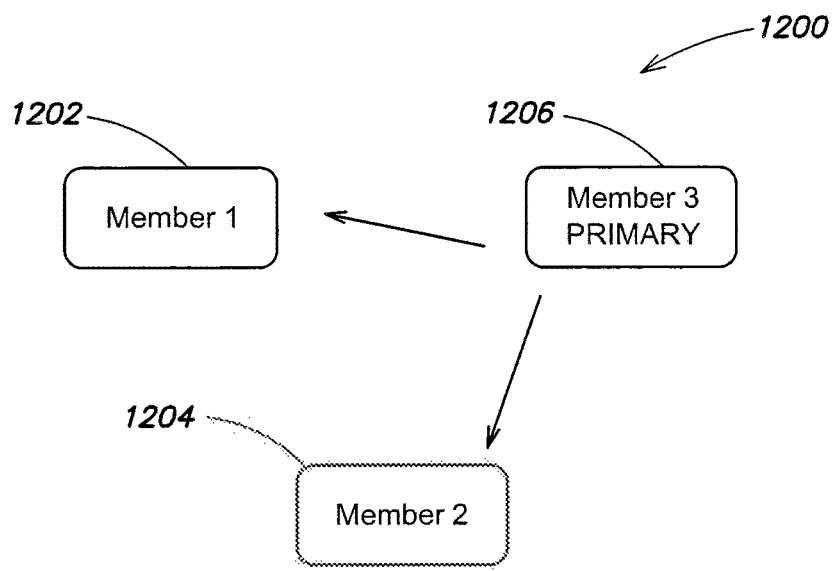

Various replica sets can be configured with one or multiple protocols for identifying and establishing a new primary node. For example, a replica set can be configured to perform processes 600, 700, and/or individual steps of those processes. Shown in FIG. 12D, node 1206 is identified and established as the new primary node for the replica set, 1200. FIG. 12E illustrates the former primary node 1204 coming back online. The return of a failed primary 1204, results in operations performed by 1204 to determine its state with respect to the replica set. The operations can determine that the node was down for any period of time and/or determine that the replica set has a new primary node. In response, former primary node, 1204 transitions its state to a recovery mode. During recovery, the failed primary 1204 attempts to identify a point of consistency between its database and the database hosted on the new primary mode. Typically, failed primary 1204, synchronizes its database by reversing transactions not present on the new primary node, until the failed primary node reflects the last transaction it replicated to the new primary node. Once the failed primary achieves a consistent state with respect to the new primary node, the failed primary can apply all the subsequent transactions that have been executed on the new primary.

In some settings, the processes of applying the subsequent transactions can be optimized, by providing for merging of transactions and other processes designed to minimize the number of operations required to bring the respective database to the same point. Upon reaching a consistent state with the new primary, the failed primary 1204, exits the recovery state and becomes another fully functional member of the replica sets as a secondary node shown in 12F.

In some settings, a replica set can be configured to perform various processes to re-integrate failed primary nodes and can, for example, execute process 800 and/or steps from process 800 to automatically re-integrate failed primary nodes. In some embodiments, each member of the replica set is configured to perform re-integration procedures, as the various members of the replica set can at any time during operation of the replica set, become the primary node and/or fail while primary.

A particular node can be configured with a number of procedures to identify that it was down or that it suffered a replication failure. For example, a node can track is communication status and upon exceeding a specified interval put itself into an offline state. In another example, the node can be configured to determine if it can only communicate with subsets of the entire replica set and/or a node can be configured to execute various queries on other nodes of the replica set. One query can establish how out of date a querying node is from the queried node. In another, a query can establish if another primary node exists in the replica set, among other options.

The various processes described herein can be configured to be executed on the systems shown by way of example in FIGS. 1-3 and FIGS. 12A-F. The systems shown can be programmed to execute the processes and/or functions described. Additionally, other computer systems can be specially configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to host a database or a database replica, take on a primary node role, perform the operations associated with a secondary node role, an arbiter node, a passive node, a backup node, or perform the functions associated with the various nodes in a replica set, or a subset of the functions associated with the various nodes in a replica set according to various embodiments of the invention. Further, the computer systems can be configured to participate in election of new primary nodes and reintegrate failed primary nodes without administration. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the described operations and/or algorithms, including but not limited to providing for processing of write requests at a primary node, permitting read requests on secondary nodes, generating operation log entries for executed operations, replicating asynchronously operations throughout a replica set, defining a cluster of nodes to participate in a replica set, monitoring communication, generating heartbeat communication messages, acknowledging replication operations based on a threshold number of nodes, automatically failing over a primary node role, participating in a primary node election processes, automatically reintegrating failed primary node(s) with no administration intervention, among other options. It should be appreciated, however, that the system may perform other operations and/or algorithms, including operations for generation operation transforms, merging operations, identifying replica status, saving replication state, configuring priority for a given node, weighting location of a node in primary election processing, weighting hardware, communication history, data state in election processing, etc. The operations and/or algorithms described herein can also be encoded as software executing on hardware that define a processing component, that can define portions of a general-purpose computer, reside on an individual general-purpose computer, and/or reside on multiple general-purpose computers.

Figure 9:
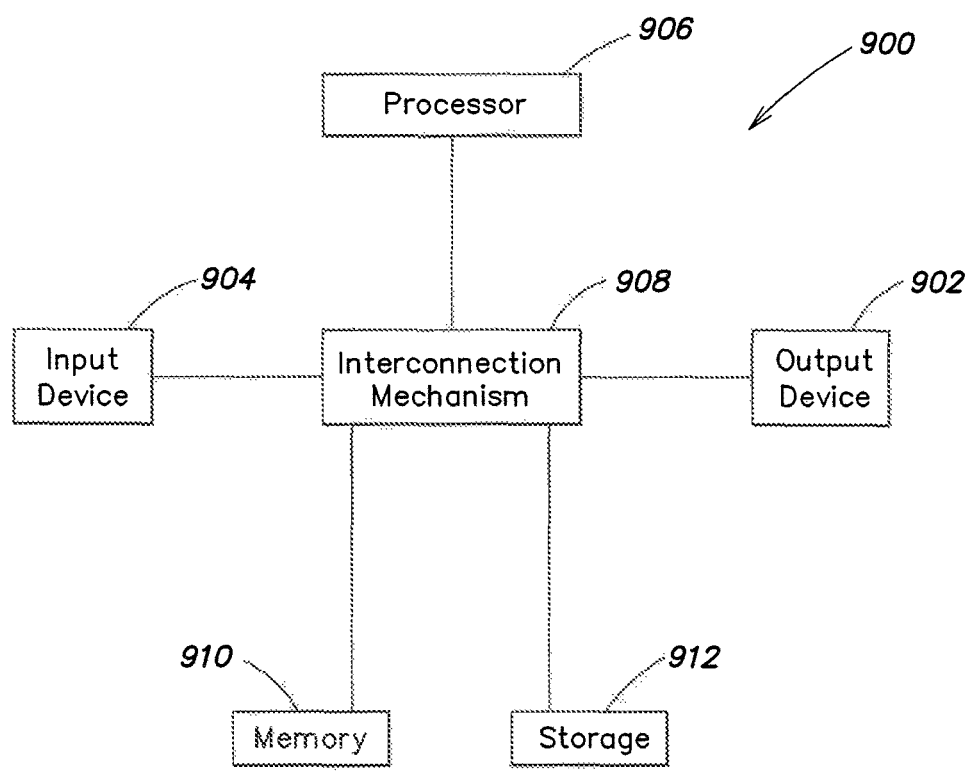
FIG. 9 is a block diagram of an example distributed database system on which various aspects of the present invention can be practiced.

FIG. 9 shows a block diagram of an example general-purpose computer system 900 on which various aspects of the present invention can be practiced. For example, various aspects of the invention can be implemented as specialized software executing in one or more computer systems including general-purpose computer systems 1104, 1106, and 1108 communicating over network 1102 shown in FIG. 11. Computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writable nonvolatile recording medium in which computer executable instructions are stored that define a program to be executed by the processor or information stored on or in the medium to be processed by the program.

Figure 10:
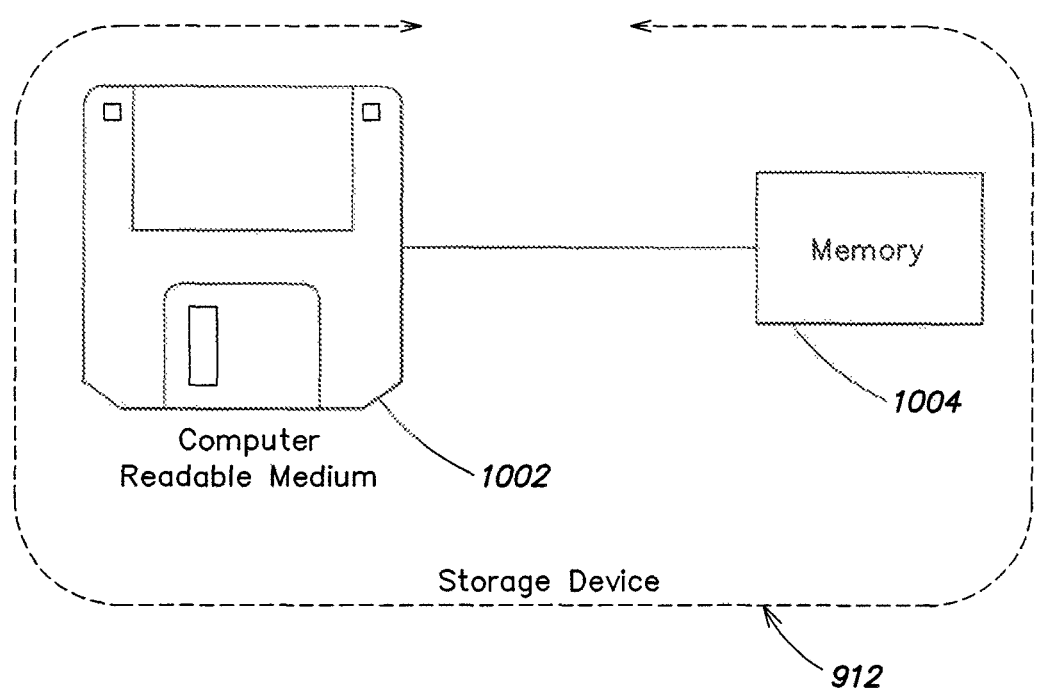
FIG. 10 is a block diagram of an example distributed database system on which various aspects of the present invention can be practiced.

The medium can, for example, be a disk 1002 or flash memory as shown in FIG. 10. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 9, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 9. Various aspects of the invention can be practiced on one or more computers having a different architectures or components than that shown in FIG. 9.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 900. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs which receive and process client requests, interfacing with driver operations, performing operations associated with a primary node, a secondary nodes, an arbiter node and a backup node, configuring local non-replicated database instances, configuring replicated database instances with different indexes, for example. These systems can also permit client systems to request database write operations only at a primary node, restrict read operations to a primary node, permit read operations at secondary nodes, perform replication status operations, and restrict processing based on status, among other operations.

There can be other computer systems that perform functions such as hosting back up only replicas of a database, arbitrating election protocols, executing vote only rights in an election protocol, changing role from secondary to primary, changing role from primary to secondary, reintegrating into a replica set, among other functions. These systems can be distributed among a communication system such as the Internet. One such distributed network, as discussed below with respect to FIG. 11, can be used to implement various aspects of the invention.

Figure 11:
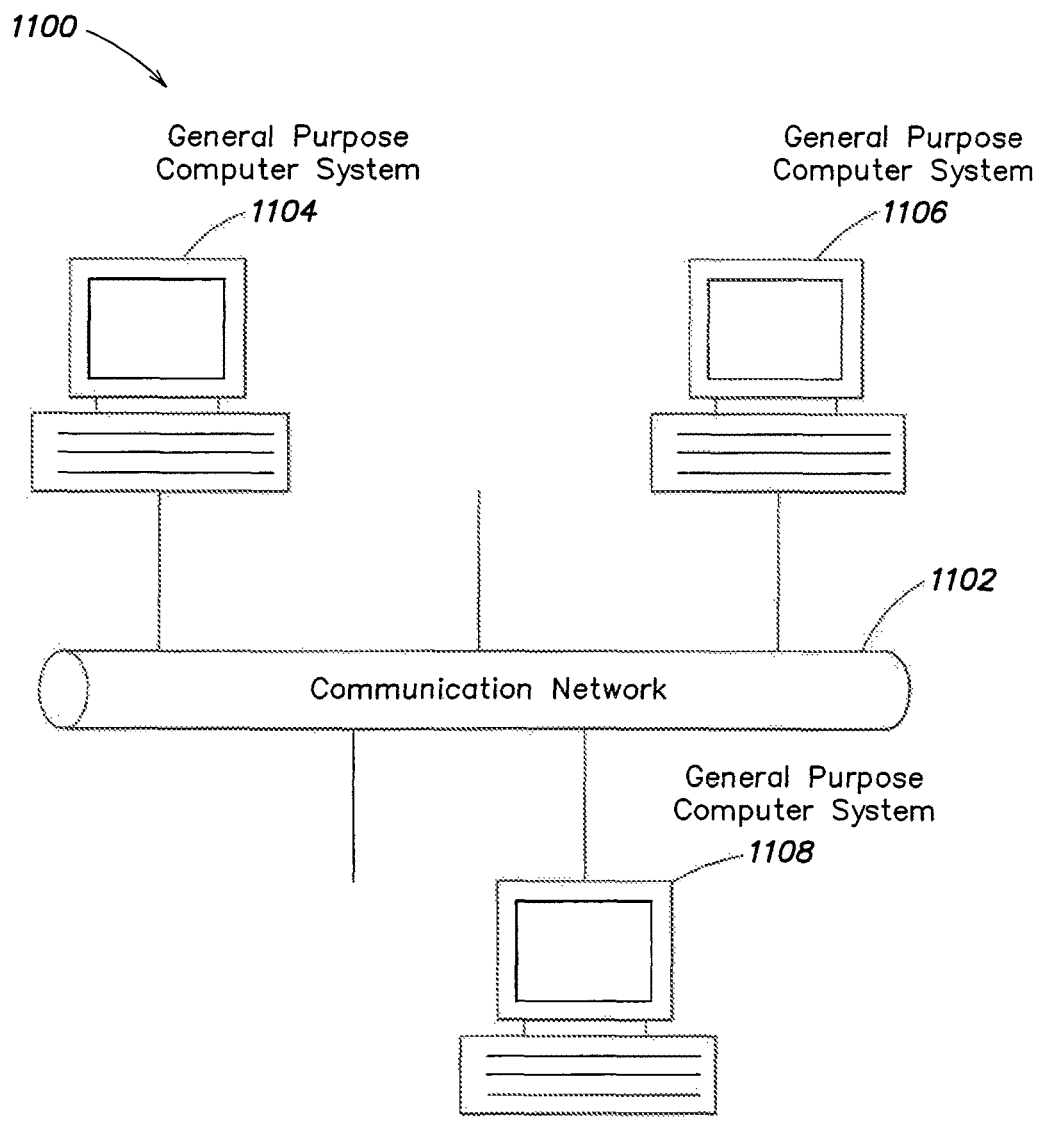
FIG. 11 is a block diagram of an example distributed database system on which various aspects of the present invention can be practiced.

FIG. 11 shows an architecture diagram of an example distributed system 1100 suitable for implementing various aspects of the invention. It should be appreciated that FIG. 11 is used for illustration purposes only, and that other architectures can be used to facilitate one or more aspects of the invention.

System 1100 may include one or more specially configured general-purpose computer systems distributed among a network 1102 such as, for example, the Internet. Such systems may cooperate to perform functions related to hosting a replicated databases, and/or automatic failover of primary node role, and/or reintegration of failed primary nodes. In an example of one such system, one or more computer systems 1104, 1106, and 1108 are configured to be nodes in a replica set. The replica set is configured to response to client requests for database access. In one setting access to the database occurs through various APIs and associated drivers. It should be understood that the one or more computer systems 1104, 1106, and 1108 can also be used to execute failover operations, determine replication state, participate in elections processes, etc. In one example, client computer systems can interface with computer systems 1104-1108 via an Internet-based interface.

In another example, a system 1104 can be accessed through a browser program such as the Microsoft Internet Explorer application program, Mozilla's FireFox, or Google's Chrome browser through which one or more websites can be accessed. Further, there can be one or more application programs that are executed on system 1104 that perform functions associated with responding to client interactions. For example, system 1104 may include one or more local databases that are not replicated for storing local configuration and state information on a given node. Local state information can be used to determined eligibility for responding to client request, eligibility for primary node responsibility, as examples.

Network 1102 may also include, as part of a system for asynchronous replication of a distributed database, one or more server systems, which can be implemented on general-purpose computers that cooperate to perform various functions including assigning roles to nodes within a replica set, responding to client database requests, generating operation logs, asynchronously replicating operations throughout a replica set, automatically migrating the primary node role in response to failure, and permitting reintegration of former primary nodes as secondary nodes in the replica set without administration. System 1100 may execute any number of software programs or processes on various hardware and the invention is not limited to any particular type or number of processes. Such processes can perform the various workflows associated with a system for asynchronously replicating distributed database operations.

Certain implementations of replication systems, can employ any number of the following elements. Each of the elements can be configured to perform the listed functions individually collectively and in various combination.

In one embodiment, an asynchronous replication system can include one or more of the following elements:
  A primary node, wherein the primary is configured to perform any one or various combination of the following functions:
    process all write requests from client systems
    generate an operation log
    commit operations once a threshold is established, which can be a majority of nodes in the replica set
    generate undo log
    monitor communication status
    change state automatically in response to failure
    assign a monotonically increasing ordinal to each operation
    assign a node identifier to each operation
  At least one secondary node, wherein the secondary node is configured to perform any one or various combination of the following functions:
    replicates database from primary
    from client perspective offers read only database
    retrieves operations from primary/master
    participate in quorums and consensus determination
    respond to read request with most up-to-date data, which in some examples can include not set wide committed data
    participate in election of new primary/master
    monitor communication state
    submit vote for new master based on most up-to-date data
    query other nodes for freshest data determination
    attempt to elect self if freshest data
    weight additional information in election determination, including for example any one or more of location information, rack information, communication history, reliability, and hardware configurations.
  An arbiter node, wherein the arbiter node is configured to perform any one or various combination of the following functions:
    participate as a vote only entity in a new primary election process
    resolve conflicts in determining consensus for a new primary
  And a backup node, wherein the backup node hosts a non-indexed replica of the database.

The asynchronous replication system can be configured to conduct a consensus protocol to elect a new primary system. The protocol can include one or more of the following elements:
  priority data for quick election, wherein each node has a priority setting—highest priority is elected resolve priority match with healthiest (most up-to-date) data, which in one example can be determined by querying a maximum operation lag time status information to determine/confirm votes, which can be based on any or more of most up-to-date data, best location, weighted determination, most consistently available, and sufficiently distant locations quorum establishment through voting and/or confirmation of votes conflict resolution A voting example can include one or more of the following operations:

query all nodes for maxappliedoptime (reflects timeliness of data on any given node)

each node should try to elect itself where it has freshest maxappliedoptime and can see a majority of nodes resolve tie by at least one of: delaying short random amount of time, check maxappliedoptime, and attempt election again; random selection; and use other status information to resolve tie.

a vote can include an identifier and the node's maxappliedoptime (Elect (selfid, maxoptime) communicate to other nodes confirm vote if receiving node maxoptime<=maxoptime and reject vote if recipient maxoptime> confirmation primary when a majority of nodes agree

In another example, a voting process can include an act of automatically responding No to all subsequent vote requests after a Yes (including a self elect vote) for a given period of time. In one implementation, the period is set for 1 minute.

The asynchronous replication system can also be configured to automatically reintegrate a filed primary node into a replica set. A reintegration protocol can include one or more of the following elements:

identification of consistent state of the database roll back of failed primary system to consistent state, wherein the roll back operation can include for each operation in operation log that does not exist at the new primary: remove from the operation from the operation log and re-sync the document/data/object in question by a query to the new primary for the document/data/object, delete document/data/object if not existent at primary Apply any subsequent operations from new primary Sharded Environment According to one aspect, a database management system can be configured to minimize overhead associated with horizontal scaling of database operations. In some embodiments, any conventional database system can be configured for horizontal scaling, and more particularly, the database system can be augmented to enable sharding of the data and distribution of the database shards across multiple machines. A server can host multiple shards of data, and each shard can be configured to respond to database requests as if the shard was a complete database. In one embodiment, a routing process can be employed to insure the database requests are routed to the appropriate shard or shards. Sharding refers to the process of partitioning the database into partitions, referred to as "shards." Conventional databases such as network-based, file-based, entity-based, relational, and object oriented, can be configured to operate within a sharded environment. It is appreciated that various aspects of the present invention can be practiced in association with any type of database, database organization, and/or database management system.

Figure 13:
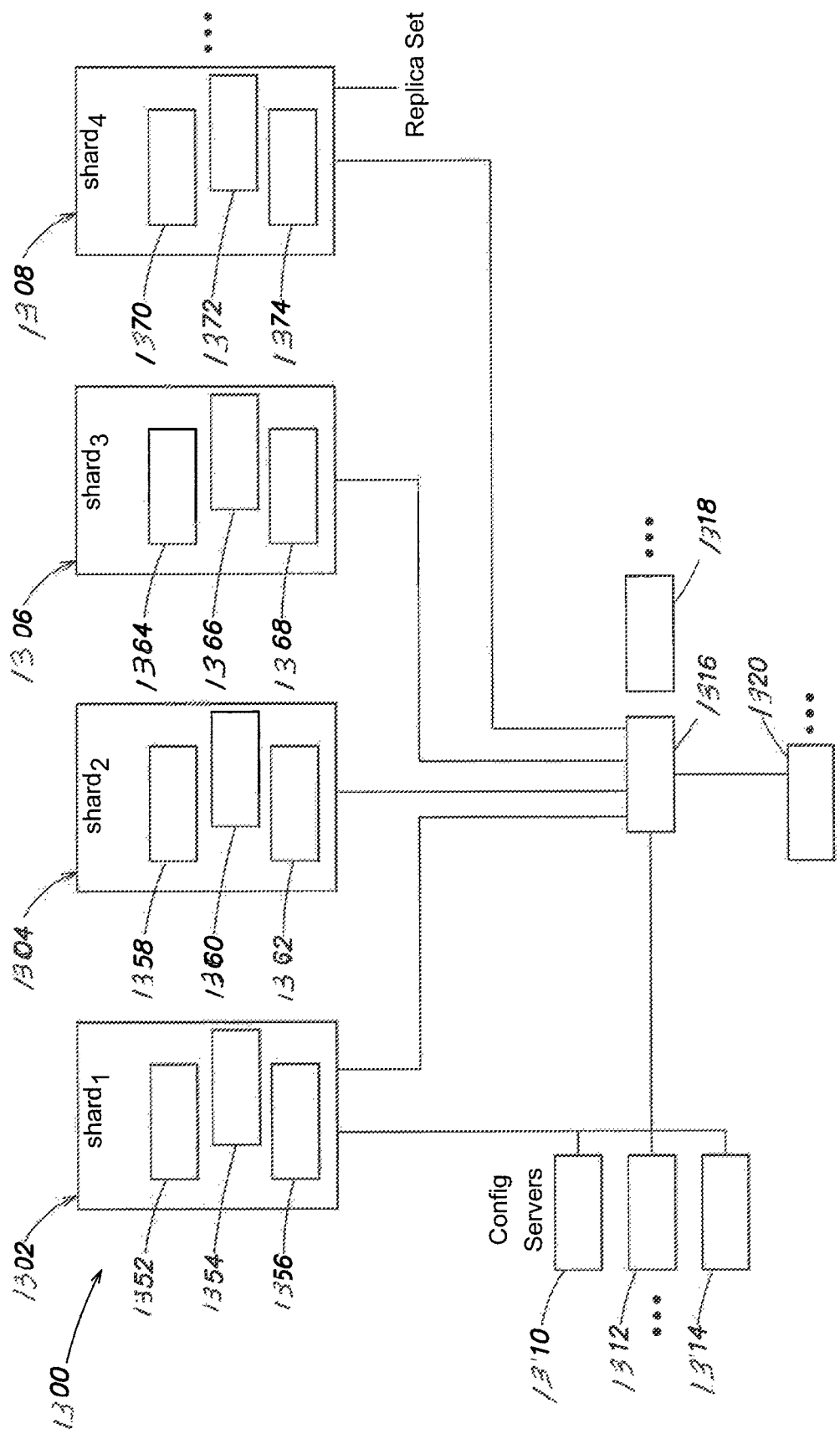
FIG. 13 illustrates a block diagram of an example architecture for a database management system according to aspects of the invention.

FIG. 13 shows a block diagram of an example architecture for a managed database system 1300. The managed database system 1300 has been specially configured as a shard cluster. The shard cluster is the grouping of shards that collectively represent the data within the database A shard cluster typically comprises multiple shard servers (e.g., 1302-1308) hosting multiple partitions (e.g., 1352-1374) or shards of data, one or more configuration servers (e.g., 1310-1314) for metadata management, and shard router processes (e.g., 1316-1318). Metadata for the shard cluster can include, for example, information on the ranges of data stored in each partition, information associated with managing the shard cluster, partition counts, number of shard servers, data index information, partition size constraints, data distribution thresholds, among other options.

Each shard of data (e.g., 1352-1374) can be configured to reside on one or more servers executing database operations for storing, retrieving, managing, and/or updating data. According to one embodiment, the operations for storing, retrieving, managing, and/or updating data can be handled by a daemon process executing on the server(s) hosting the shard. Where the shard server(s) are implemented as replica sets, each replica set is responsible for a portion of a collection. The router processes send client data request to the right replica set based on configuration metadata (e.g., hosted by configuration servers/processes). In some embodiments, the router processes can be configured to communicate only with the primary node of each replica set (e.g., this can be a default configuration), and if the replica set elects a new primary, the router processes are configured to communicate with the newly elected primary. In one example environment, a client and/or client application can connect to the routing processes, which connects to a daemon process executing on a replica set hosting the respective shard of data containing requested or targeted data. The daemon process can be configured to handle query execution (e.g., reads at the primary only, reads at primary and secondary nodes, reads and writes at the primary only) and return requested data.

In some embodiments, a shard server 1302 contains multiple partitions of data which can also be referred to as "chunks" of database data. In some embodiments, a shard of data corresponds to a chunk of data. A chunk is also a reference to a partition of database data. A chunk can be configured as a contiguous range of data from a particular collection in the database. Collections are logical organizations of subsets of database data. In one example, a collection of documents is a named grouping of the data, for example, a named grouping of documents. The named grouping can be homogenous or heterogeneous. In some embodiments, collections are organizations of database data similar to relational database tables.

Configurations within a shard cluster can be defined by metadata associated with the managed database referred to as shard metadata. Shard metadata can include information on collections within a given database, the number of collections, data associated with accessing the collections, database key properties for a given collection, ranges of key values associated with a given partition, shard, and/or chunk of data within a given collections, to provide some examples.

In some embodiments, sharding of the database in data chunks, that is the partitioning of the data in the database, occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. In some examples, BSON is designed to be efficient in space, but in many cases is not much more efficient than JSON. In some cases BSON can employ more space than JSON to encode information. In one embodiment, this results from on e of the BSON design goals: traversability. In some examples, BSON adds some additional information to documents, like length prefixes, that make it the document easier and faster to traverse.

BSON is also designed to be fast to encode and decode. For example, integers are stored as 32 (or 64) bit integers, so they don't need to be parsed to and from text. This uses more space than JSON for small integers, but is much faster to parse.

Returning to FIG. 13, the three dots illustrated next to the system components indicate that the system component can be repeated. In some embodiments, adding additional shards, configuration servers, and/or shard routing processes can increase the capacity of the managed database system. The shard router processes 1316-1318 handle incoming requests from clients 120 (e.g., applications, web services, user initiated requests, application protocol interfaces, etc). The router processes 1316-1318 are configured to provide a transparent interface to handle database requests. In particular, client 1320 need not know that a database request is being served by a sharded database. The shard router processes receive such client requests and route the database requests to the appropriate shard(s), e.g., 1352-1374 on shard servers 1302-1308.

According to some embodiments, a router process, e.g., 1316, can be configured to operate as a routing and coordination process that makes the various components of the cluster look like a single system, for example, to client 1320. In response to receiving a client request, the router process 1316 routes the request to the appropriate shard or shards. The shard(s) return any results to the router process. The router process 1316 can merge any results and communicate the merged result back to the client 1320. In some examples, the router process 1316 is also configured to establish current state information for the data distributed throughout the database by requesting metadata information on the database from the configuration server(s) 1310-1314. The request for metadata information can be executed on startup of a routing process. Further requests can be initiated by the routing process and/or can be initiated by a configuration server. In one example, a change at the configuration server can trigger a distribution of updates to any routing processes.

In some embodiments, any changes that occur on the configuration server(s) can be propagated to each router process 1316-1318, as needed. In one example, router processes 1316-1318 can be configured to poll the configuration servers(s) 1310-1314 to update their state information periodically. In others examples, router processes can be configured to poll the configuration servers(s) 1310-1314 to update their state information on a schedule, periodically, intermittently, and can be further configured to received updates pushed from the configuration server(s) 1310-1314 and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process 1316 can be configured without persistent state information. For example, at initiation the router process 1316 cannot fully route data requests until its state is updated with the metadata describing the distribution of data throughout the shards.

According to some embodiments, router processes can run on any server within the managed database and/or on any number of server(s) that is desired. For example, the router to processes can be executed on stand-alone systems, and in other examples the router processes can be run on the shard servers themselves. In yet other examples, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the managed database. In some examples, the router processes do not coordinate processing, rather each router process can be configured to act independently. In some environments, this property enables unlimited numbers of router processes with virtually no additional complexity, as all the router processes receive their state information from the configuration servers and no coordination between the router processes is required for routing data requests.

According to one embodiment, configuration server(s) 1310-1314 are configured to store and manage the database's metadata. In some examples, the metadata includes basic information on each shard in the shard cluster (including, for example, network communication information), server information, number of chunks of data, chunk version, number of shards of data, shard version, and other management information for routing processes, database management processes, chunk splitting processes, etc. According to some embodiments, chunk information can be the primary data stored by the configuration server(s) 1310-1316. In some examples, chunks are defined by a triple (collection, minKey, and maxKey) and the metadata stored on the configuration servers establishes the relevant values for a given chunk of data.

In some examples, each of the installed configuration server(s) has a complete copy of all the chunk metadata information for the managed database. According to one aspect, various replication strategies can be implemented to maintain consistency between configuration servers. In one embodiment, updates to configuration data stored on the configuration server can require additional processes for insuring consistency. In one example, a two-phase commit operation, is used to ensure the consistency of the configuration data amongst the configuration servers. In other examples, various atomic commitment protocols (ACP) are used to insure consistency of the database metadata on any configuration servers.

In addition to the consistency processes executed on the configuration servers, the shard cluster can be configured with various replication models to insure consistent replication of any changes to the database's metadata stored on the configuration servers. In some embodiments, the replication model for the configuration servers can be different from the replication model used within the rest of the shard cluster, for example, on the shard servers 1302-1308. In one embodiment, the configuration servers can be configured to perform operations under various all-or-nothing approaches while the data stored in database shards can be configured to operate under an eventual consistency model.

In some implementations, if any of the configuration servers is or goes down, the shard cluster's metadata becomes read only. Various monitor processes can be implemented to insure that any configuration servers within a given cluster are available. Upon detection of an unavailable configuration server, the monitor process can be configured to lock the data stored on the remaining configuration servers. The lock can be accomplished using a "locks" file that is referenced prior and/or during updates to the configuration servers. In response to a monitor process detecting a failed configuration sever (e.g. loss of communication, power failure, etc.) the monitor process can be configured to write a lock record into the locks file. In one example, a metadata update process can be configured to check the locks file to determine if any updating process can proceed. In one example, an update processes can be executed on the configuration servers, and in another example, can be executed on shard servers.

Additionally, the replication processes used to insure consistency across the configuration servers can include information about the state of the data on the configuration servers. The state information can be used to halt update requests and/or return errors, for example, in response to attempts to update shard metadata. For example, a state variable stored on a configuration server can reflect that any of the configuration servers are reachable and available for updates. In the event of failure, the state variable can be updated to reflect the state of the failed configuration server. In some embodiments, when metadata updates are requested, an update process can be configured to check the current state of the data. In response to an identified failure state, an update process can be configured to return an error. In another example, the update process can be configured to block for a period of time, and re-attempt the update after the period of time has expired. Further update processes can be configured to wait a variable amount of time to re-try any failed update.

The configuration servers are configured to permit read only access in the event of the failure of one or more of the configuration servers. Thus, even when a configuration server has failed, as long as a configuration server is still available routing processes can receive state information for the database. In the read only state, new shards cannot be established nor can data migration to new shards be finalized, however, even in such a failure state, the shard cluster can still process read and write operations on the database data, e.g., in response to client requests. Typically, sharded database systems can handle operating in read only mode for significant periods of time. Under typical operating conditions it can take a long period of time, days, even weeks, before the inability to rebalance and/or generate new shards will affect system performance.

According to some embodiments, establishing an appropriate shard key facilitates the efficient management of data within the shard cluster. To partition a collection, a shard key pattern can be specified. The shard key pattern, in some embodiments, can be similar to the key pattern used to define an index. The shard key pattern establishes one or more fields to define the shard key upon which the managed database can distribute data. In some embodiments, the shard key pattern can be input through a management process. The shard key pattern can be predefined and/or dynamically generated. Once established, the shard key pattern can be used to control the partitioning of data. The data can be partitioned in chunks of data. A shard of data can be a chunk. The chunks of data are typically constructed of contiguous ranges of data.

According to one embodiment, the contiguous range of data is defined based on database key values or database key patterns associated with the data. In some examples, chunks are defined by a triple (collection, minKey, and maxKey). A given chunk can be configured with a named for the collection to which the chunk belongs corresponding to collection in the triples and a range of key values that defined the beginning and the end of the data found within the chunk corresponding to minKey and maxKey. In one example, the shard key K associated with a given document within a collection assigns that document to the chunk where the value for K falls within the values defined by minKey and maxKey. Thus, the shard database key/shard database key pattern defines the ranges of data found within a given chunk. The shard key ranges associated with a given partition can be used by the shard cluster (e.g. through a router process) to direct database requests to appropriate shard servers hosting the particular partition.

According to some embodiments, a chunk of a data can also be associated with a maximum size threshold which defines that maximum size a given chunk can reach before a splitting operations is performed on the data within the chunk. In some embodiments, once the data within a given chunk reaches the maximum size, a managed database or a shard cluster can be configured to automatically generate a new chunk having its own range of contiguous data. In some examples, the data within the original chunk is split, approximately half the data remaining in the original chunk and approximately half the data being copied into the new created chunk. Although in some embodiments, the split can occur so that different portions of data remain in the original chunk and/or are copied into the new chunk.

In some implementations, the maximum size can be predetermined In other embodiments, the maximum size can be dynamically established. In one embodiment, a maximum size of 200 Mb establishes a good threshold that balances the costs of sharding (e.g., the computational burden associated with the copying/moving of the data and the versioning the chunks) against the improvement in processing by having sharded data. Various embodiments support compound shard keys/shard key patterns.

Table I describes some example shard keys and effects on cardinality (e.g., can the data be broken down enough), query isolation (e.g., query targeting to a specific shard), write distribution, index locality, and reliability based on a database for e-mail storage organized as follows:

```
{
    _id: ObjectId( ),
    user: 123,
    time: Date( ),
    subject: "...",
    recipients: [ ],
    body: "...",
```

-continued

```
    attachments: [ ]
}
```

For the example illustrated in Table I, the database is organized where each document can be up to 16 MB and each user may have GBs of storage. In one example environment the most common query is get user e-mails sorted by time. Additionally, the database includes to indexes on {_id}, {user, time}, and {recipients}.

TABLE I

| | Cardinality | Write Scaling | Query Isolation | Reliability | Index Locality |
|---|---|---|---|---|---|
| _id | Doc level | One shard | Scatter/gather | All users affected | Good |
| hash(_id) | Hash level | All Shards | Scatter/gather | All users affected | Poor |
| user | Many docs | All Shards | Targeted | Some users affected | Good |
| user, time | Doc level | All Shards | Targeted | Some users affected | Good |

Reliability of Table I provides information on what would happen if a shard is lost or down as to the effect on the system and/or users. User, time provides an example of a compound shard key and some benefits that may be obtained from compound keys. Compound shard key may result in querying against more than one shard even in targeted query execution.

In some embodiments, the shard key should be selected to insure they are granular enough to provide for an even distribution of data. For instance, when a shard key is based on name, the database can be checked to insure there are not a disproportionate number of users with the same name. In such a case, an individual chunk can become too large and further, because of the key selected, be unable to split. In some implementations, logic can be implemented within the shard cluster to assist in selecting of the shard key. Distributions can be established and analyzed, for example during a testing phase, to insure that key does not invoke disproportionate distributions. For example, where the entire range comprises just a single key on name and a disproportionate number of users share the same name, it can become impossible to split chunks of the data without creating a new shard key. Thus, for a database where it is possible that a single value within a shard key range might grow exceptionally large, a compound shard key can be constructed that enables further discrimination of the values than a single key selection.

In some embodiments, the system can include tag aware sharding where ranges of shard keys can be tagged (e.g., collection, minKey, maxKey, and tag name). In further embodiments, shard can also be tagged (e.g., shard name, tag name). Tag aware sharding can be configured to enable finer tune control over distribution of data with a managed database.

Figure 14:
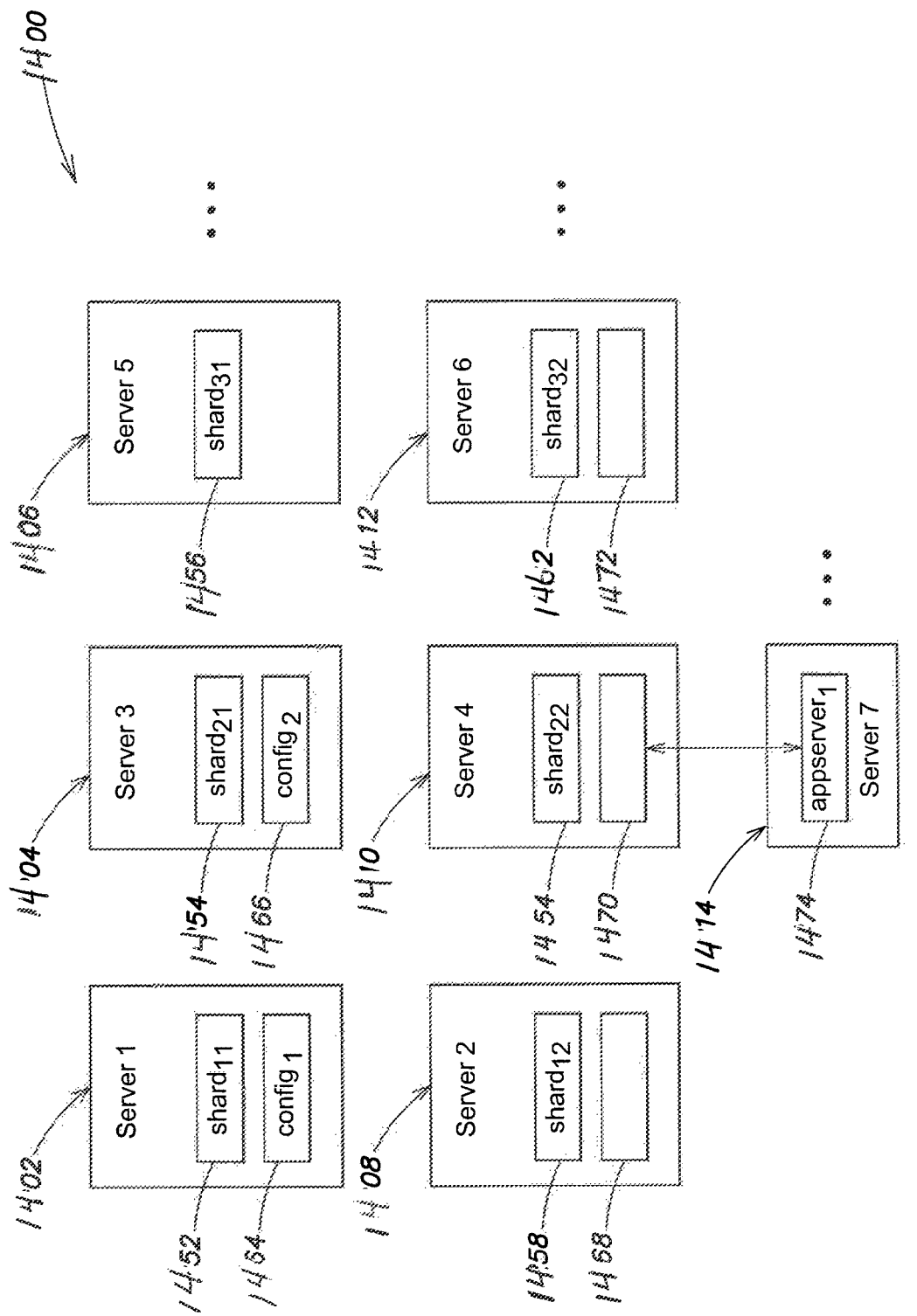
FIG. 14 illustrates a block diagram of an example architecture for a shard cluster, according to aspects of the invention.

FIG. 13 illustrates one example architecture for a managed database. In some embodiments, various configurations of the routing processes and the shard servers are possible. Shown in FIG. 14 is a block diagram of an example architecture for a database managed as a shard cluster. FIG. 14 illustrates an example configuration of a shard cluster 1400. Servers 1402-1412 host the various shards of data that make up the data of a managed database. Each shard 1452-1462 has an associated versioning number that assist the system in tracking various versions. The versioning numbers can be used during creation of new shards and, in some examples, can be assigned only when the data associated with a new shard has been tested correct. For example, during a data move from one server to another, a process can control the copying and verification of the moved copy. Further logic can be implemented to facilitate data availability. In one example, the shard and an associated chunk of data being moved can still be read from and written to in its original location. Until the shard metadata is updated, routing processes will continue to route data requests to the original shard location. In one embodiment, the process for copying and/or moving the data chunk can include operation reconciliation to resolve data requests that occur during a migration. The operation reconciliation can be configured to resolve any changes in a chunk that occurs during the move process.

Configuration processes 1464 and 1466 are executed on servers 1402-1404. As discussed above with respect to the configuration servers, the configuration processes control the metadata information associated with the shard cluster. Further, the routing processes 1468-1472 running on servers 1408-1412 receive their state information from the configuration processes 1464-266. As shown, server 1414 hosts the client application server 1474 which manages client requests. The client requests are communicated to a routing process, as illustrated, process 1470, which, in some examples, can determine from the received request, which database shard or chunks are necessary to respond. Routing process 1470 forwards the request to the appropriate shards. The shards capture any relevant data and return it to the calling routing process. The routing process, e.g., 1470, can be configured to merge the results, as necessary, and communicate the result to the client appserver 1474.

Figure 15:
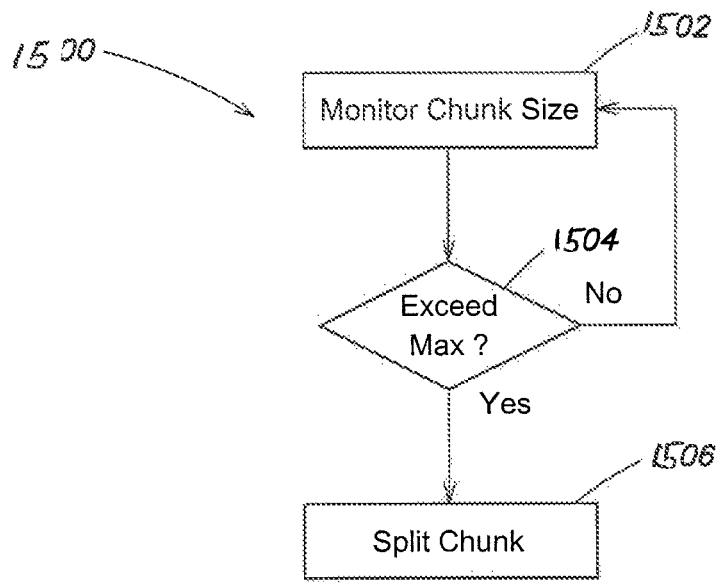
FIG. 15 illustrates an example process flow for monitoring data size, according to aspects of the invention.

In one embodiment, data within the database is organized into BSON type documents. A BSON document is a binary-encoded serialization of JSON-type document. BSON can be configured to be lightweight, traversable, and efficient. BSON documents, like JSON counterparts, are configured to support the embedding of objects and arrays within other objects and arrays. The documents can be organized into collections, and each collection can be distributed onto a number of shard servers based, in part, on the size of the respective collection. During normal operation a shard cluster can be configured to monitor shard size or chunk size on the shard servers and create new shards or chunks as needed. FIG. 15 illustrates an example process flow 1500 for generating new chunks within a shard cluster. Process 1500 likewise can be executed to generate new database shards with associated chunks of data. A routing process can be configured to execute the monitor process 1500. The routing process can be configured to monitor chunk size across each of the shards in the database at 1502. In some alternatives, individual shards can be configured to monitor the sizes of their chunks, and/or the size of chunks located on other shards. In one example, the routing process can be configured to monitor chunk size at 1502 based on metadata for the shard cluster. If the threshold for chunk size is exceeded 1504 (YES), the routing process can be configured to executed a procedure for splitting chunks at 1506, otherwise at 1504 (NO) monitoring continues at 1502. In some examples, the system can determine that a data size difference exits between chunks with a managed database, where the data size difference exceeds a system specified threshold. For example, the difference in data size of a most dense shard and the least dense shard may exceed a migration threshold prompting the system to move data between the most dense shard and the least dense shard.

The threshold for chunk size can be established through a management interface displayed to an end user at a host computer system. In some settings, the management interface is configured to allow an end user (e.g., an administrator) to define the threshold. Typical thresholds fall within a range of 100-200 Mb, however, other thresholds can be used. In some embodiments, splitting processing and/or migration processing can be monitored to determine if the threshold is inappropriate. Fine tuning to the threshold can be performed automatically. For example, if processing associated with splitting chunks occurs too frequently or over too great a period of time, the system can be configured to increase the threshold chunk size. Alternatively, chunk size can be decreased if little or no activity occurs over an analyzed period. According to one embodiment, such a period would typically be quite long days, even in some examples weeks, before triggering a reduction in chunk size. In some implementations, processing consumption by components of the shard cluster can be monitored and logged to determine that the processing associated with splitting and/or migrated chunks consume too much (in one alternatively too little) of the processing resources of the cluster. In one example, if the processing exceeds 10% of the clusters processing capacity the chuck size could be decreased automatically.

Figure 16:
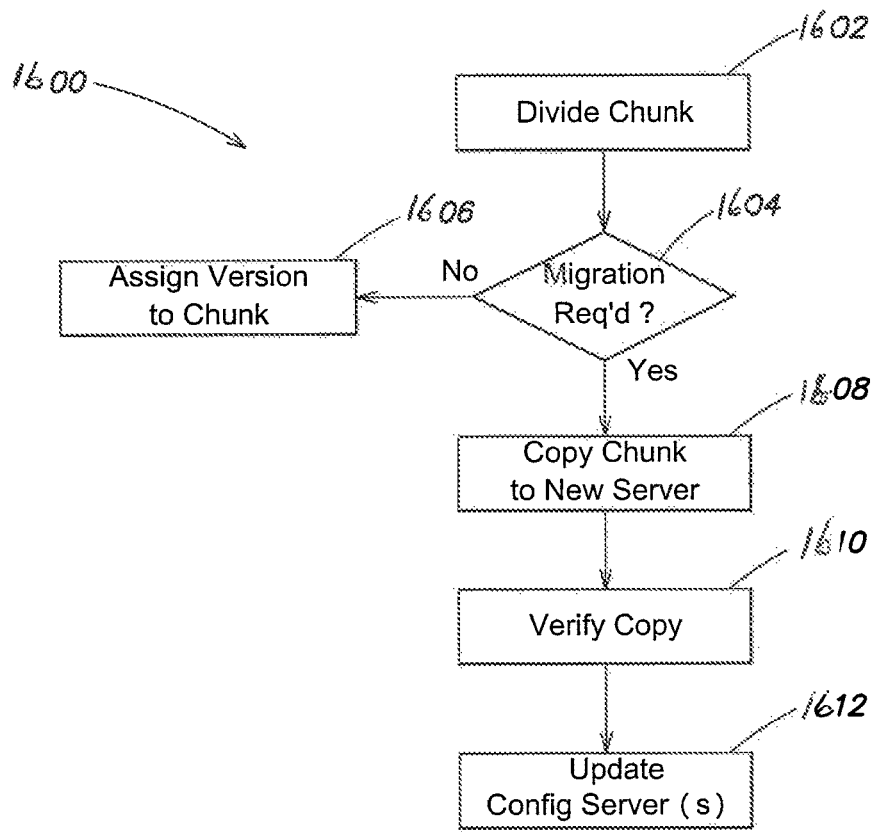
FIG. 16 illustrates an example process flow for dividing data, according to aspects of the invention.

Step 1506 can include execution of other processes and/or sub-processes for splitting data chunks. Shown in FIG. 16 is an example process 1600 for dividing and/or migrating a chunk to a new server, executed as necessary. Process 1600 can also be executed to generate new shards with associated chunks of data. Once a chunk maximum size has been exceeded, the chunk is divided or split at the server on which it currently resides at 1602. According to one embodiment, during division the data within the chunk is still fully accessible to client operations (e.g., read, write, insert, update, etc.). Process 1600 can include operations to resolve changes made to documents within the database during division and/or migration. For example, the chunk can remain fully accessible until a version number is assigned to the new chunk at 1606 or a chunk copy is verified and given a new version number at 1610. In some examples, creation of a new chunk can include splitting the chunk with the data as it exists when the split is initiated. The new generated chunk can be updated using an operation log that tracks all of the operations that have been performed on the original chunk not reflected in the new chuck. Shards can be versioned in according with the same process. In some examples, shards can be assigned versions numbers based on the versions of an associated chunk of data.

At 1604 it is determined whether migration is required for the newly divided chunk. In one implementation, a balancing component can be configured to monitor chunk distribution across shards. Where chunk distribution is unbalanced a determination is made at 1604 (YES) that migration is required. The new chunk is copied to another shard server configured to host a portion of the database at 1608. The copying activity is typically configured to occur at a reduced pace. In some embodiments, the goal is to prioritize client data requests over migration operations. In other embodiments, copying at 1608 will only take place if there is sufficient capacity on the shard server. Process 1600 can be configured to determined current processing load on the shard server. In some examples, both the source and destination servers can be tested to determine a baseline processing capacity is available. Further, the shard cluster can be configured to determine if a baseline network bandwidth limitation is satisfied prior to processing the copy. In some examples, copy operations can be limited to scheduled windows, and process 1600 can include steps to delay chunk splitting until a window occurs.

In some alternatives, the determination that a chunk should be divided can be followed immediately by a test to determine if migration may be required. If not, then splitting can proceed, however, if migration is necessary the process also can be delayed to occur in a specified window. The time window is configured to minimize migration operations at peak activity. The time window can be manually entered by an end-user and/or dynamically established by the shard cluster to adapt to changes in use of the cluster.

Once copying is completed, the new chunk will be verified at 1610 to insure a complete and consistent copy has been generated. In some embodiments, the verification process can include applying any updates to the data handled by the original shard during the copying process. Once the new chunk is verified and/or new operations are applied, the new chunk is given a new version number and the configuration server(s) are updated at 1612. The verification step 1610, can include an operation to lock the data records during the versioning of the new chunk. For example, a locks filed can be written to, to include a document reflecting that the new chunk is locked for writes. In some embodiments, reads can still occur. In some embodiments, the original chunk can be locked as well (e.g., to writes) to insure a consistent copy is generated.

In one embodiment, each chunk can be assigned a major and minor version number. In some embodiments, shard clusters can be configured to use version numbers to route database requests. For example, configuration servers can store metadata information on the shard cluster, including versions numbers for any available chunk. In some examples, metadata information includes key ranges associated with the data stored in each chunk. In one example, a routing component can capture the metadata from the configuration server(s) and direct data requests appropriately. According to one embodiment, the major version number is associated with a shard hosting chunks, and each individual chunk is assigned a unique minor number on that shard. Assignment of version numbers can occur as part of step 1610. In some embodiments, the configuration servers are configured to control at least parts of process 1600. For example a versioning component can be executed on a configuration server that controls versioning of a chunk. In other embodiments, the configuration servers can include a verification component that is configured to verify a new chunk copy is consistent. In some embodiments, the functions for verifying and versioning can be handled concurrently, separately, serially, and can be controlled by one, the other, or both of the verification and/or versioning components.

Figure 17:
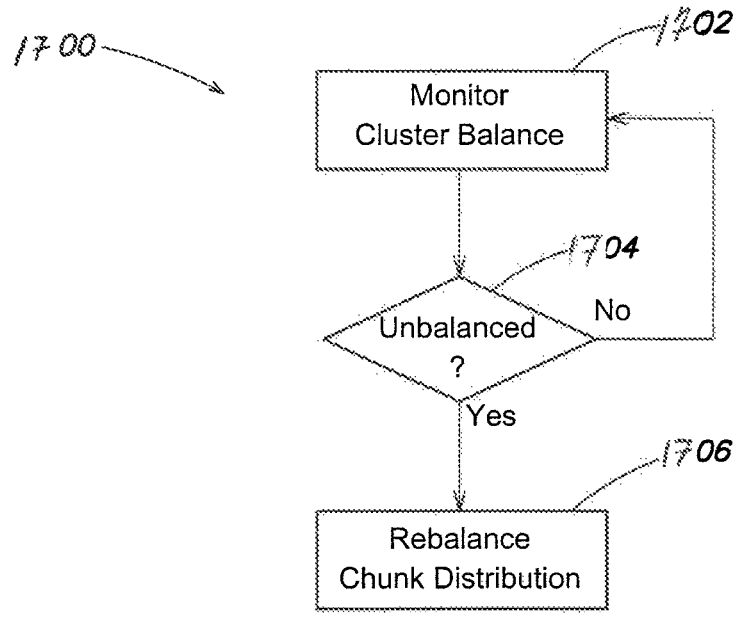
FIG. 17 illustrates an example process flow for rebalancing data distribution according to aspects of the invention.

According to some embodiments, processes for splitting chunks can be executed in conjunction with processes for rebalancing chunk distribution within a shard cluster. FIG. 17 shows an example process flow 1700 for rebalancing chunks within a shard cluster. Process 1700 can be executed to rebalance shard distribution throughout the database according to the same process. At 1702 the distribution of chunks is monitored. A software based monitor can be executed on various hardware elements, and the monitor can be configured to analyze the distribution of chunks across shard servers. In some embodiments, a monitor can be configured to query data from the configuration servers and in others the monitors can be configured to query the shard servers directly.

At 1704, the chunk distribution is analyzed to determine if there in an imbalance. At 1704 (YES), the shard cluster can determine that an imbalance is present. The shard cluster is configured to rebalance the chunk distribution at 506. In some embodiments, a monitor component can be configured to execute monitor processes, can be configured to determine chunk distribution is imbalanced, and/or can further be configured to migrate chunks between shard servers. When no imbalance is detected 1704 (NO), step 1702 is repeated. The monitoring activity can be repeated periodically, on a schedule, and/or can be dynamically initiated. Further, a shard cluster can be configured with manual processes to initiate a monitoring and/or redistribution process. In one example, an end-user can initiated monitoring and/or rebalancing from a management interface.

According to one embodiment, monitoring the shard cluster at 1702 includes determining a chunk count for each shard server in the shard cluster. In order to determine that a shard cluster is imbalanced, a variety of operations can be performed. In one example, comparisons are made between the shard server having the largest number of chunks and the shard server having the least number of chunks. Where the compared values indicate a difference in distribution greater than an established threshold, the shard cluster is configured to determine the shard cluster imbalanced, for example, at 1704 (YES). In some settings, a state variable can be modified to indicate that the shard cluster is imbalanced, in other settings, once imbalance is identified, a rebalancing process can be executed. As rebalancing typically involves migrating chunks between shard servers, rebalancing activity can be delayed until a scheduled window occurs.

For example, burdensome operations can be delayed until a minimum processing capacity is detected. In another example, rebalancing windows can be established to favor times of lower database usage. In other embodiments, the processes for controlling monitoring and/or rebalancing can be given lower priority than other database operation, favoring execution of client data requests, for example, over monitoring and/or rebalancing.

The established threshold for identifying imbalance can be set in advance and/or, dynamically determined by the shard cluster. In some embodiments, the threshold can be entered by an end-user in a management interface. In one example, the threshold is based on a chunk count on the most burden shard server exceeding a chunk count on the least burdened shard server by at least eight chunks. The initial threshold can be arbitrarily selected. In some embodiments, the lower the threshold the greater the volume of rebalancing processing that will result. In some settings, a monitor process can be configured to determine that the processing of the shard cluster consumes too much of the shard cluster's resources. In response to a determined that rebalancing consumes too much processing capacity (for example by exceeding a user defined threshold) the shard cluster can dynamically increase the threshold, thereby reducing rebalancing across the cluster. The shard cluster can also be configured to reduce the threshold, where little or no rebalancing processing has been detected by the shard cluster. Further, a user can set and re-set thresholds for the shard cluster that establish when a cluster is imbalanced.

Various statistics can be used to determine when a shard cluster is imbalanced. In particular, a determination that a shard cluster is imbalanced is not limited to differences in chunk count between a least loaded server and a most loaded server. For example, a chunk count distribution can be determined to exceed a mean and/or exceed an average across the shard cluster. In some examples, individual shard servers can be rebalanced if their associated chunk count exceeds a threshold. In other embodiments, imbalance can be determined on processing distribution in addition to and/or instead or chunk count. Other metrics can also be employed to determine a cluster is imbalanced. As before, once an imbalance is identified, the shard cluster is configured to automatically re-allocate chunks to reduce the imbalance, for example, at step 1706 of process 1700.

Figure 18:
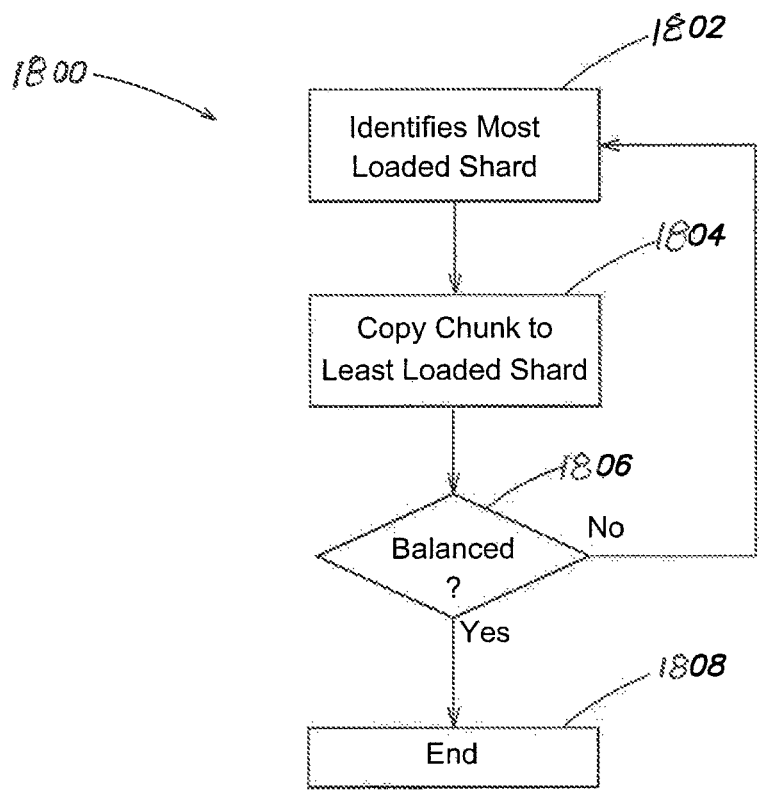
FIG. 18 illustrates an example process for data migration, according to aspects of the invention.

FIG. 18 illustrates an example process flow 1800 for rebalancing chunks across a shard cluster. At 1802, a most loaded shard is detected. At 1804, a chunk from the most loaded shard server is migrated to another shard server. According to some embodiments, a chunk count associated with the shard servers in the shard cluster can be used to identify a most and least loaded shard. At 1804, the chunk form the most loaded shard server can be copied to the least loaded shard. Typically, a rebalancing operations proceeds on a chunk by chunk basis, copying one chunk at a time and testing the chunk count after copying to determine if the shard cluster is sufficiently rebalanced at 1806. If at 1806 (NO) the shard cluster is not sufficiently rebalanced an additional chunk is copied from a most loaded shard server (e.g., identified at 1802) to a least loaded shard server (e.g., identified at 1804). The cluster is again tested against a balance metric to determine if additional repetitions of 1802-1806 are required. In some embodiments, the shard cluster has an established threshold for determining that the shard cluster is imbalanced. Likewise a range can be established that defines a rebalanced shard cluster. It can be possible to reduce differences in chunk count to zero, however, in typical implementations the threshold is greater than a zero difference. It is also possible that a rebalancing process cannot reduce the difference in chunk count between a most loaded shard and least loaded shard to zero owning to the number of shards, shard servers, and/or the number of chunks in a cluster. In one embodiment, once the count difference reaches 2 or less, the state of the cluster can be changed from an imbalanced state to a balanced state. In one example, once the count difference reaches an established threshold 1806 (YES), process 1800 ends at 1808. One should appreciate that process 1800 is illustrated as one example process for rebalancing chunk distribution. Other processes can be executed to redistributed chunks across a cluster. Further process 1800 can be used to rebalance shard and associated chunks of data.

In some embodiments, a shard cluster also includes processes for automatic failover and/or recovery. Proper operation of a shard cluster can require that each shard always remain online, or from a more practical standpoint, as available as is reasonably possible. Inconsistent results can be returned if one of the shards hosting necessary data is unavailable. According to one embodiment, each shard server in a shard cluster can be implemented as a replica set, e.g., shard server 1308. A replica set can be configured to perform asynchronous replication across a series of nodes, with various processes implemented to handle recovery of primary node operations within the replica set. Such a configuration insures high availability of the data replicated throughout the replica set. By implementing each shard as a replica set, the shard cluster can provide for high availability and high consistency in the underlying data. In one example, a replica set can be a set of n servers, frequently three or more, each of which contains a replica of the entire data set for the given shard. One of the n servers in a replica set will always be a primary node. If the primary node replica fails, the remaining replicas are configured to automatically elect a new primary node. Each server 1402-1412 can be implemented as a replica set, for example, as discussed in co-pending application Ser. No. 12/977,563 entitled "METHOD AND APPARATUS FOR MAINTAINING REPLICA SETS" filed on Dec. 23, 2010, incorporated herein by reference in its entirety. Other replication methodologies can be used to insure each shard remains available to respond to database requests. In some examples, other multi-node systems can be used to provide redundancy within a sharded database. In one example, master/slave configurations can be employed. In others, various distributed architectures can be used for each shard within the shard cluster.

According to some embodiments, shard clusters also include operations for balancing the distribution of chunks across shards. According to one example, a balancer component executes a balancer process as a background process across the shard cluster. In one implementation, the balancer process can be executed by a balancer component executed on a configuration server or servers, on the shard server(s), and/or as part of routing processes. In some embodiments, the balancer process can be executed as a stand-alone process. Once instantiated the balancer process is configured to monitor the number of chunks distributed throughout the shard cluster and balance the distribution as appropriate. In one embodiment, the balancer process can monitor the state of the shard cluster by monitoring the shard metadata stored on the configuration server(s). In other implementations, the balancer process can execute operations against the individual shard servers to determine associated state information. The balancer can be a background task configured to keep the number of chunks even across all servers of the cluster. The shard cluster can be configured to insure the activity of balancing is transparent to any querying/updating activity that occurs across the database. According to some embodiments, a goal can be to insure that the client side is unaware that there is any data allocation activity ongoing. The balancer component can be configured to perform any disclosed operation for shards of data.

According to some embodiments, the balancer is configured to reduce the computational burden associated with data movement. In some examples, the balancer process is configured to monitor current load on the database, and adjust data movement operations accordingly. Further, in some examples, the balancer process is configured to limit the amount of data being transferred at any given time. Typically, the assignment of a maximum chunk size assists in limiting the amount of data that needs to move whenever a new chunk is created. The typical unit of transfer in a shard cluster can be a chunk. In some examples, chunk size can be set at 200 MB, although other sizes can be employed. Various implementations of sharded databases have shown that a good threshold for chunk size falls within the range of 100-200 MBs of data per chunk. Although some implementation have been configured to use smaller sizes and/or larger chunk sizes, including for example, 64 MB as the chunk size. In some implementations, more than 200 MB can result in a data migration taking longer, which increases the risk of affecting response time for any client queries.

According to one embodiment, the balancer process is configured to determine a chunk count across the shard servers in the database. The balance process can be configured with a threshold for uneven chunk count. Once the threshold has been exceeded the balancer process can trigger migration of the chunks of data to re-establish a balanced distribution. According to one example, setting the threshold to require a difference of 8 chunks between the least and most loaded shards provides a good balance between invoking data migrations against the benefit of distributing chucks and consequently data accesses. Although in some embodiments, both larger and smaller thresholds can be used to determine when data migration would be appropriate. Further, other differences beyond an uneven chuck count can be analyzed to determine if data migration is appropriate. One should appreciate, that according to some embodiments, the balancer process should not incur the overhead of a data migration if the benefit in distributing the data does not exceed the incurred overhead.

Once the balancer determines that the uneven chunk count exceeds the threshold, the balance process is configured to redistribute chunks. In one example, the balancer process is configured to redistribute the uneven load one chunk at a time until the difference in chunks between any two shards in the cluster is down to, for example, 2 chunks. Other implementations can include complete rebalancing, so that the difference in the number of chunks between any two shards is minimized, reducing the difference between shared servers to 1 or less. Other stopping conditions can be implemented. Further, the rebalancing process can be configured to halt during periods of significant activity within the database, to insure no significant latency to client requests is introduced. In one embodiment, the balancing task can be configured to execute at any arbitrary routing process server in a given shard cluster. In some embodiments, there can be several routing processes running on different servers, thus the balancing process can be configured to invoke a lock operation to insure other routing process servers do not initiate a concurrent balancing process while another is undertaking data migration. The routing process service executing the balancer process takes a "lock" by inserting a document into a "locks" collection of the configuration database. The lock can be replicated across any additional configuration servers depending on the number of configuration servers. The balancer process can be configured to establish a lock in response to the balancer process being executed, a balancer process being active, and/or when the balancer process initiates balancing operations.

In some embodiments, a balancer process can be configured to check the state of any lock, or determine its absence on start-up. In other examples, the balancer process can be configured to periodically check for locks, or check the lock prior to starting any data migration operations. A balancer component can be configured to perform any of the operations associated with the discussed balance processes. The balancer component can be configured to execute the balancer processes and/or data migration processes.

According to another aspect, an overarching goal of a sharded database system is to minimize the impact of sharding operations on requests for data or data access. According to one embodiment, shard maintenance and data migration operations can be optimized based on properties of a key assigned to a collection of data. Stated generally, database shards and/or chunks represent ranges of ordered data within the database. The ordered ranges are based off of the keyed ordering of the underlying data. According to one example, sequential keys for any collection can be exploited to produce "zero cost" shards. Typically, data is organized into chunks and as the chunks grow past a threshold size, the chunk is split, which can result in the need to migrate a chunk populated with data. The size of the chunk that may need to be migrated will typically depend on the threshold established for chunk splitting. Such data migration represents an expensive process for maintaining sharded databases.

By analyzing the keys employed for a given collection, a sharded database system can insure that any resulting copying from migrating chunks is minimal and, in some examples, completed without the need to copy database data from one shard to the next, even when a new chunk and/or shard must be generated on a different shard server. In one embodiment, a key type associated with a collection's key pattern is retained for optimizing the processing of chunk splitting and/or shard generation. In some implementations, the shard cluster is configured to analyze a key pattern for a given collection to determine a type for the key pattern automatically. In one example, the shard cluster is configured to determine if the key pattern is sequential. In some embodiments, an end-user can specify a key type for a given key pattern during key creation for a collection.

Figure 19:
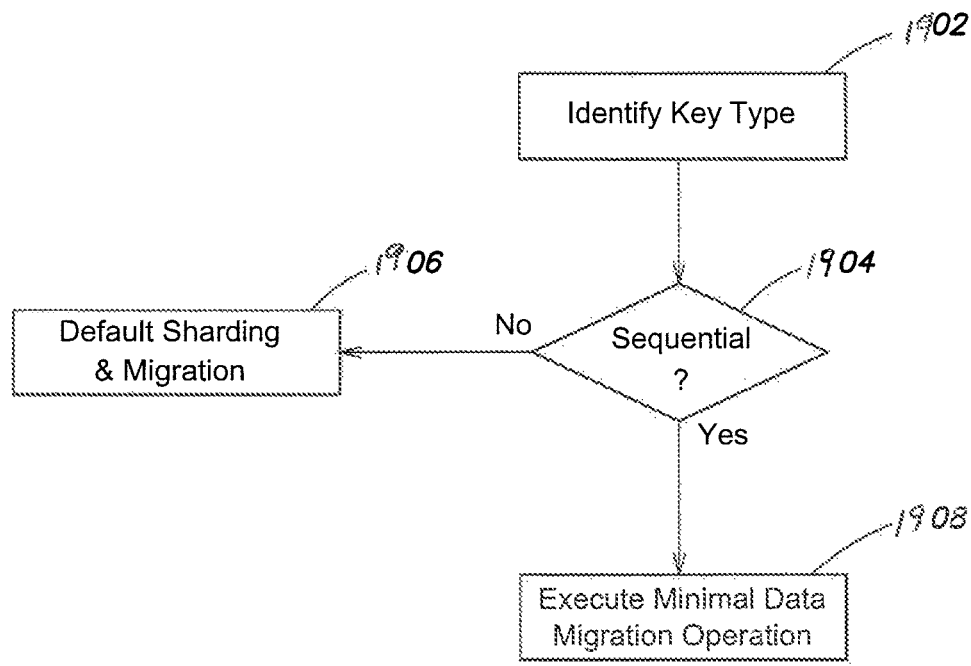
FIG. 19 illustrates an example process for optimizing data partitioning, according to aspects of the invention.

Shown in FIG. 19 is an example process flow for optimizing data sharding. At 1902, a key type associated with a key pattern for a collection is analyzed to determine the type of the key that organizes the collection. Based on the type of the key assigned to the collection, a shard cluster can be configured to optimize the sharding of data within the database. According to one embodiment, at 1904 (NO) it is determined that the key type is not sequential. For non-sequential keys/key patterns default sharding operations can be executed to manage data within the given collection, for example at 1906. For example, processes 1500 and/or 1600 can be employed to manage data growth and migration for collections having non-sequential key types. In some examples, processes 1700 and 1800 can also be used either alone or in conjunction with 1500 and/or 1600 to manage data rebalancing for the given collection. In some embodiments, different processes can be executed to manage the size of the data and any chucks, as well as different processes for rebalancing data distribution throughout a shard cluster. In some alternatives, default processes for splitting and migration (e.g., 1500 and 1600) can be modified based on the presence of collections with sequential key types in a database cluster. The processes can be modified to prioritize key type optimized operations during execution as discussed further below. For example, default operation can be delayed if the shard cluster detects an optimized process is close to occurring. The shard cluster can be configured to determine state associated with optimized operations based on various thresholds, including timing metrics (e.g., average time to split), chunk size logging (e.g., at or near threshold for splitting) among other examples.

At 1904 (YES), a sequential key pattern has been established for the collection under analysis. At 1908, minimal data migration operations are executed. In some embodiments, minimal data migration operations replace default processes for chunk splitting and chunk migration across shard servers. In one example, a minimal data migration process includes some of the steps involved in, for example, process 1500. The example minimal data migration process includes monitoring chunk size within the collection and determining that the chunk size exceeds a threshold. Although in some embodiments, different thresholds can be established for a maximum chunk size for a collection having a sequential key type versus collections without sequential key types. In one example, the maximum threshold for the chunk is set as a percentage less than the maximum chunk size established for a collection without a sequential key type. Further, when the chunk within the collection having the sequential key pattern is split, as discussed below, it may be permitted to continue to increase in size up to another threshold, for example, the maximum chunk size established for collections having non sequential keys. Using multiple thresholds can establish a range in which a chunk with a sequential key pattern can grow in size without requiring additional splitting.

In some embodiments, an end-user can enter maximum sizes for both types of collections, and in some examples set a first threshold for chunk size in a collection having a sequential key and a second growth threshold after which a default split operation can be required. Under ideal circumstances a minimal data migration operation can result in a "zero cost" split of a data chunk. In particular, once the chunk size exceeds a size threshold, a maximum key value within the chunk can be readily identified. The chunk of data can be split based on the maximum key value. In some examples, owing to the properties of the sequential key/key pattern, all the data (e.g., records, documents, data entities, data relations, etc.) existing in the chunk have associated key values that are less than the maximum key value. The new chunk is created to contain any data having associated key values greater than the maximum. In essence, the new chunk is empty of data records, but becomes the target for any new data stored, created, and/or moved into the collection. In another example, a chunk without data can be migrated across the servers hosting shards with little or no computational burden. In some embodiments, data migration can be reduced to changes in the meta-date stored on, for example, configuration servers, which can then be propagated to routing processes. In some embodiments, verification processes can still be employed. By modifying splitting operations to result in chunk having no or limited amounts of data, subsequent verification processes are optimized, and require significantly less processing in order to verify data migration has occurred appropriately.

Further, such data migrations can be configured to select shard servers that are the most imbalanced within a shard cluster. For example, whenever an optimized chunk (e.g., a chunk having little or no data) is created, an optimized rebalancing process can be configured to identify a least loaded shard server. The determination of a least loaded shard server can include establishing chunk counts for the shard servers in a given cluster and identifying the shard server with the least number of chunks. According to some embodiments, migrating an optimized chunk to a least loaded server reduces the overall imbalance in a shard cluster. In other embodiments, rebalancing processes (e.g., 1700 and 1800) can run in conjunction with optimized rebalancing processes. In some alternatives, optimized rebalancing processes include at least some the functions described in 1700 and 1800 and are modified to prioritize migration of newly created optimized chunks. In some examples, metadata can include information on when a chunk was created, as well as status information identifying an optimized chunk, further metadata information on chunks within a sharded database can include state information reflective of key type, and can include state information identifying chunks within a collection having a sequential key, and in some further examples can include state information identifying if those chunks have been split.

Step 1908 can include various sub-processes for optimizing splitting of chunk data and/or optimizing migration of data to other shard servers. Process 1900 can also include steps for establishing new chunks on shard servers added to a cluster (not shown). In some embodiments, these processes can be executed as part of 1908 and/or instead of step 1908.

Figure 20:
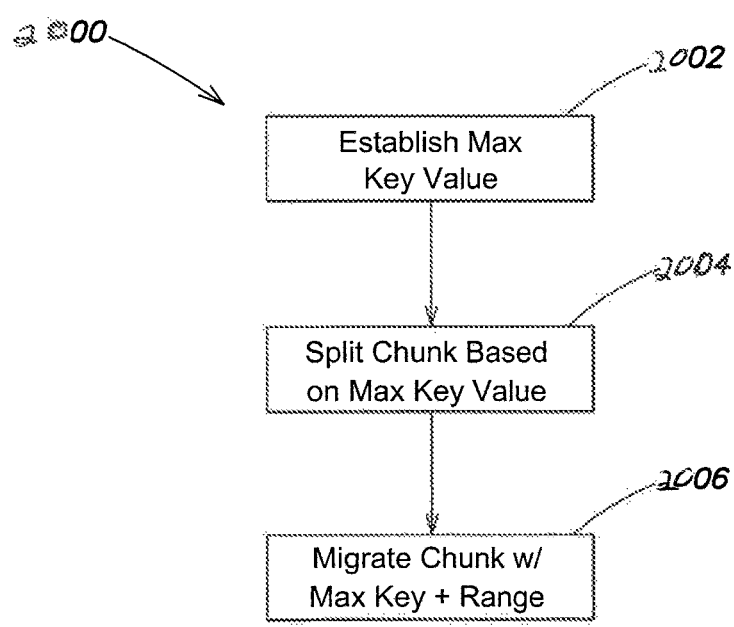
FIG. 20 illustrates an example process for generating an optimized chunk, according to aspects of the invention.

Shown in FIG. 20 is an example process 2000 for optimizing the generation of a new chunk of data in a sharded collection. In some embodiments, process 2000 can be executed as part of process 1900, for example in conjunction with and/or instead of 1908. Process 2000 begins at 2002 with establishing the maximum key value associated with a given chunk of data. Typically, process 2000 can be executed after a shard cluster determines that data splitting is required. At 2004, a chunk of data can be split based on the maximum key value. According to one embodiment, the original chunk is split such that little or no data needs to be copied to the new chunk. In one example, the original chunk contains all the data within the collection associated with a range of key values. The range is defined to start at a minimum key value and for convenience to include any value greater than the minimum. Maximum values can also be set for such ranges, however, in some embodiments it can be efficient to have the range include any data associated with a key value greater than the minimum key value within the collection. When the data within the chunk exceeds a size threshold, the shard cluster is configured to split the chunk into two partitions. In some embodiments, zero cost splitting can be executed by: 1) leaving the original data in the first partitioned chunk—in essence no data migration or movement is required, simply establishing a maximum key value for the range of data in the first partition; and 2) creating a new chunk having data with a minimum key value greater than the maximum key value for the first partitioned chunk. The new chunk can be referred to as a maximum key range chunk as the data routed to that chunk will be associated with data having key values greater than the current maximum key value determined at 2002.

Figure 24:
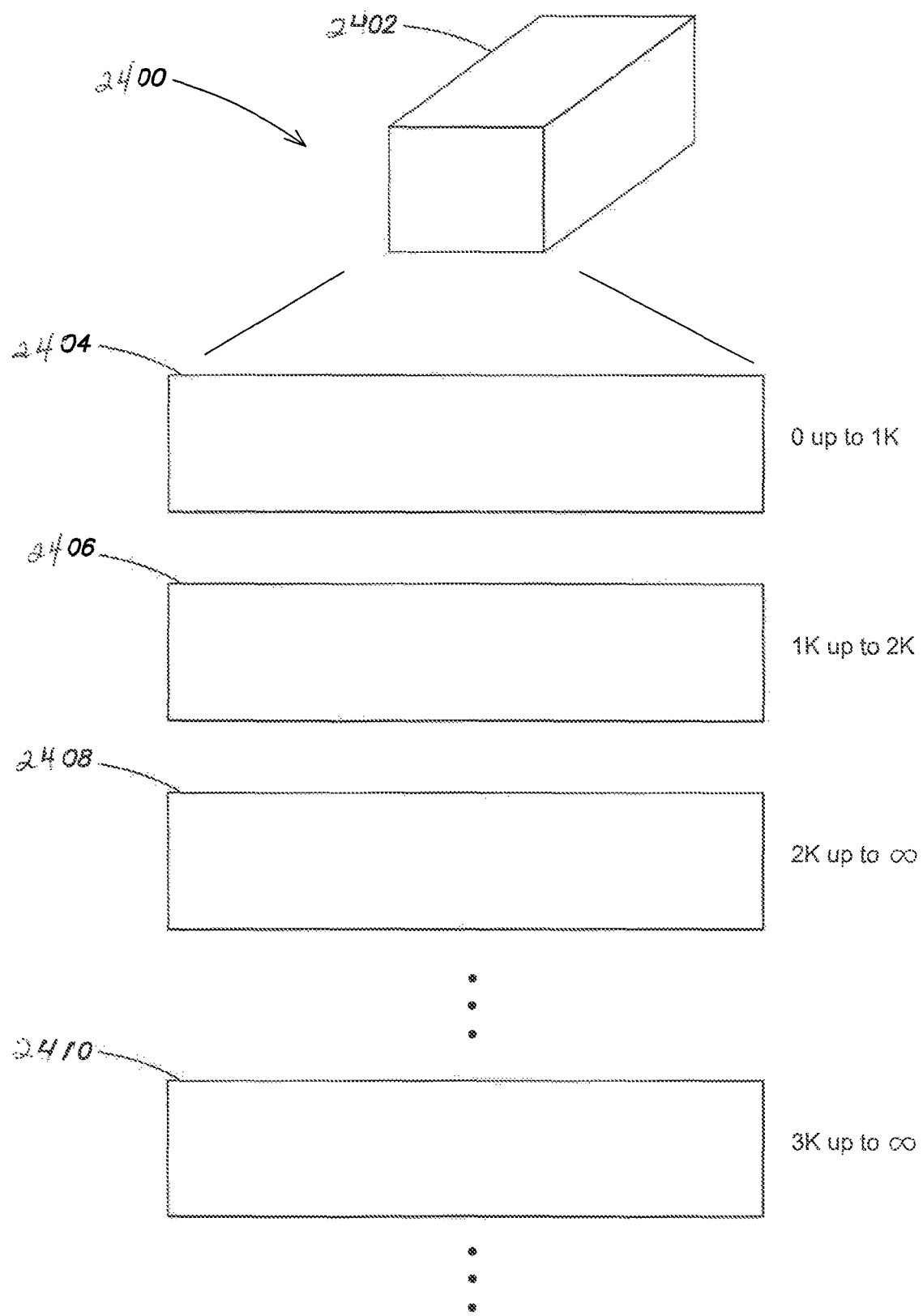
FIG. 24 is a logical diagram of a shard server, according to aspects of the invention.

To provide an example, illustrated in FIG. 24 is a logical diagram 2400 of a shard server hosting database chunks with ranges of key values for a given collection. Shard server 2402 maintains data chunks 2404-2408. Each chunk describes data within the collection associated with its own unique key. In this example, the key pattern for the collection represented by 2404-2408 is sequential. Thus, according to one embodiment, all new data elements that are added receive a key value that is greater than any previously used key value. A simple example of such a key pattern includes a monotonically increasing key value. In some embodiments, other sequences can be used. Compound keys can also be regarded and operated on as sequential keys so long as a portion of the key is sequential.

Chunk 2404 includes data having key ranges from 0 up to 1K. The size of chunk 2404 is controlled by a chunk size threshold. In one example, the chunk size threshold can be established by an end-user in a management interface. In another example, the chunk size can be a default value. Chunk 2406 includes data having key ranges from 1K up to 2K, and its size is also controlled by the chunk size threshold. Chunk 2408 represents the maximum key range chunk with key value from 2K up to ∞. The three dots shown in FIG. 24 reflect the ability to define additional chunks and additional key ranges for those chunks.

As the key assignment occurs sequentially in the given collection, new data will be routed to the maximum key range chunk 2408. Chunk 2408 will grow as new data is added to the collection until the threshold chunk size is exceeded. Shown in dashed line at 2410 is a hypothetical split of chunk 2408. Once chunk 2408 exceeds the chunk size threshold, a new chunk 2410 is created for key range values of 3K up to ∞. During the split process chunk 2408 can be associated with a range of key values having a new maximum key value including the range of values of 2K up to 3K. According to some embodiments, the majority of any growth in the collection will occur at the maximum key range chunk, and consequently the vast majority of splitting will be executed on the maximum key range chunk. In some embodiments, internal chunks (i.e. not the maximum key range chunk) can still be split. For example, modification to existing data can result in internal chunks that exceed a chunk size threshold. Although in some embodiments, internal chunks can be associated with additional chunk size thresholds to permit some growth in internal chunk size without requiring splitting. Internal chunk splitting can be performed, for example, through the execution of processes 1500 and/or 1600 as described above.

Returning to FIG. 20, new data entries (e.g., inserts, adds, etc.) will be routed to the new chunk by shard cluster routing processes. The metadata governing the routing processes can be updated at the configuration servers and propagated to the routing processes based on the new key value ranges associated with the two partitions. Thus, in an ideal scenario none of the data in the collection needs to be copied to establish the new chunk, rather only metadata changes are required to establish a maximum key value for the key range of the first chunk, and a new range of key values for the second chunk.

According to some embodiments, data requests can continue even during chunk splitting, and reconciliation processing can be required to complete the generation of a new chunk. Reconciliation processing can occur as part of step 2004. In some embodiments, data copying can also be required to generate the new chunk and occur as part of step 2004. According to one embodiment, sub-processes can be executed as part of step 2004, including for example a reconciliation process for resolving database operations received during chunk splitting and/or a verification process to insure any data copied was copied correctly. Sharding data based on a maximum key value reduces the computational burden associated with chunk generation on any sharded database. Additional benefits can also be derived in some embodiments. Optimizing chunk creation to generate chunks with little or no data provides for significant advantage by reducing the computation burden of migrating the new chunk to another shard server. Further, any network traffic associated with chunk migration of a populated chunk, e.g., as discussed above, includes copying and verification of data which can be reduced negligible levels by migrating chunks having little or no data. Migration of a maximum key range chunks can in some examples, require only updating of metadata in configuration servers and propagation of the updates to routing processes. In some embodiments, chunk migration to another shard server occurs as part of process 2000 at 2006. In some embodiments, data migration is optional and step 806 need not be performed in all executions of process 2000.

In some embodiments, migration of chunks can occur as part of process 2000. In other embodiments, chunk migration can occur as part of separate rebalancing operations (e.g. as part of processes 1700 and/or 1800). In some settings, migration of a chunk of data having a sequential key can be optimized as discussed herein, for example, as part of processes 1900 and/or 2000.

The various processes described herein can be configured to be executed on the systems shown by way of example in FIGS. 13-14 and FIG. 24. The systems and/or system components shown can be programmed to execute the processes and/or functions described. Although a shard can be associated with one or more chunks of data, a shard can be associated with one chunk, and any operations disclosed for data chunks can be performed on shards. Some references to shard are intended to include the partitioned data associated with a shard and the data management processes used to access and/or modify the data. Various operations disclosed for splitting, migrating, rebalancing, chunks can be executed in conjunction with the instantiation of additional database instances that are then associated with new data chunks forming new database shards.

Additionally, other computer systems can be configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to host a database partition, host a database shard, host a database chunk, or execute the processes discussed above for migrating data partitions, splitting data partitions, verifying data migration, verifying data splitting, maintaining partition versions, routing database requests, balancing data distribution, balancing distribution of partitions, balancing distribution of chunks, determining a state of the database based on data distribution, determining a partition count for each server hosting a partition, identifying a least loaded server, identifying an most loaded server, maintain metadata for a partitioned database, maintaining metadata for a shard cluster, updating metadata, replicating metadata to routing processes, routing database operations, and reconciling database operations on migrated and/or split partitions. Further, the computer systems can be configured to provide for replication of the data within the data partitions by implementing each server hosting one or more partitions as a replica set, insuring automatic failover for each server hosting one or more partitions. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the described operations and/or algorithms, including but not limited to monitoring partition size throughout the database, splitting database partitions in response to exceeding size thresholds, migrating database partitions between servers, verifying migrations of partitions, reconciling database operations for migrated partitions, rebalancing partition distribution, determining an unbalanced state exists, identifying most loaded and/or least loaded servers, analyzing collections for database key type, analyzing collections for database pattern type, optimizing migration operations for collections with sequential keys (patterns and/or key), optimizing splitting operations for collections with sequential keys (patterns and/or key), identifying maximum key values in a collection, splitting database partitions based on maximum key value, generating maximum key range partitions, etc. The operations and/or algorithms described herein can also be encoded as software executing on hardware that define a processing component, that can define portions of a general-purpose computer, reside on an individual general-purpose computer, and/or reside on multiple general-purpose computers.

Figure 21:
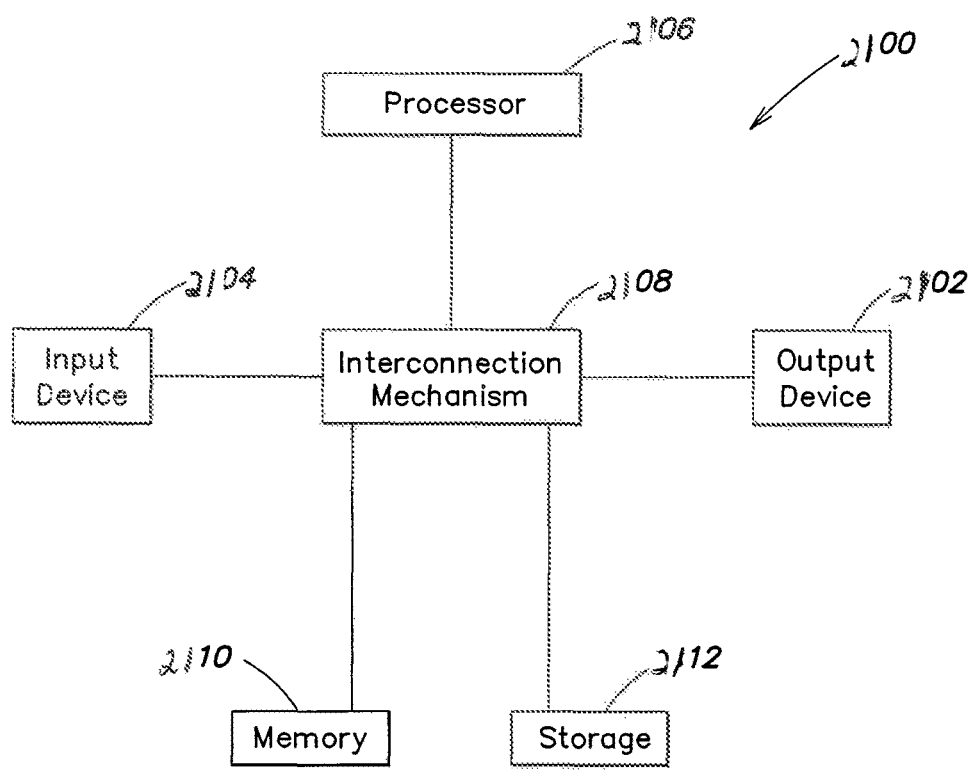
FIG. 21 is a block diagram of an example distributed database system in which various aspects of the present invention can be practiced.

FIG. 21 shows a block diagram of an example general-purpose computer system 2100 on which various aspects of the present invention can be practiced. For example, various aspects of the invention can be implemented as specialized software executing in one or more computer systems including general-purpose computer systems 2304, 2306, and 2308 communicating over network 2302 shown in FIG. 23. Computer system 2100 may include a processor 2106 connected to one or more memory devices 2110, such as a disk drive, memory, or other device for storing data. Memory 2110 is typically used for storing programs and data during operation of the computer system 2100. Components of computer system 2100 can be coupled by an interconnection mechanism 2108, which may include one or more busses (e.g., between components that are integrated within a same machine) and/or a network (e.g., between components that reside on separate discrete machines). The interconnection mechanism enables communications (e.g., data, instructions) to be exchanged between system components of system 2100.

Computer system 2100 may also include one or more input/output (I/O) devices 2102-2104, for example, a keyboard, mouse, trackball, microphone, touch screen, a printing device, display screen, speaker, etc. Storage 2112, typically includes a computer readable and writable nonvolatile recording medium in which computer executable instructions are stored that define a program to be executed by the processor or information stored on or in the medium to be processed by the program.

Figure 22:
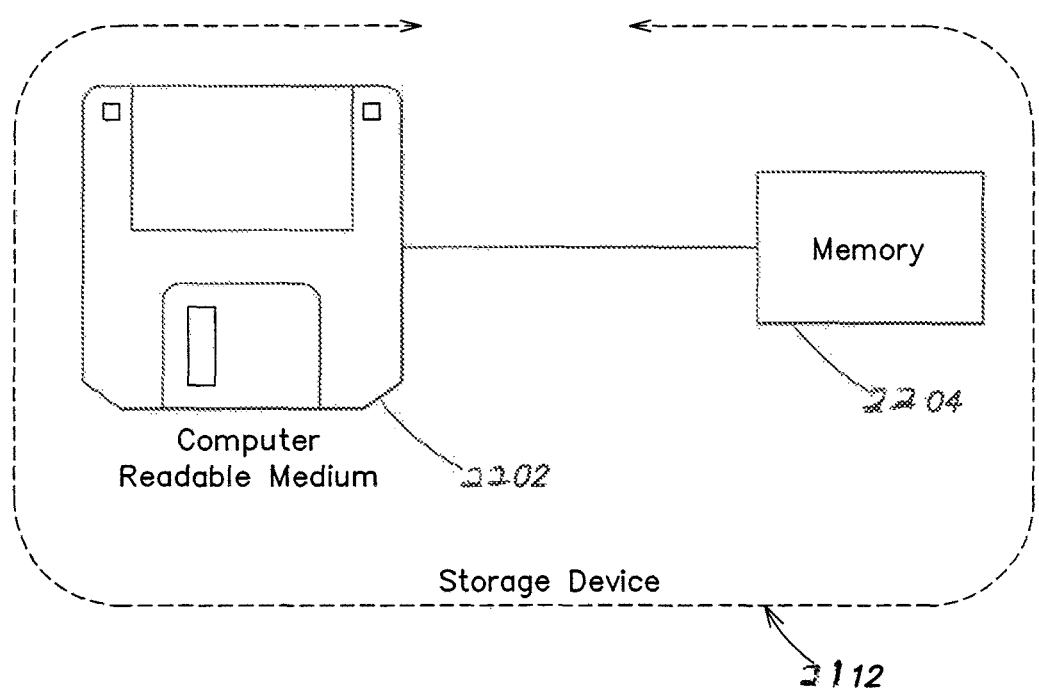
FIG. 22 is a block diagram of an example distributed database system in which various aspects of the present invention can be practiced.

The medium can, for example, be a disk 2202 or flash memory as shown in FIG. 22. Typically, in operation, the processor causes data to be read from the nonvolatile recording medium into another memory 2204 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 21, the memory can be located in storage 2112 as shown, or in memory system 2110. The processor 2106 generally manipulates the data within the memory 2110, and then copies the data to the medium associated with storage 2112 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 2100 is shown by way of example, as one type of computer system upon which various aspects of the invention can be practiced, it should be appreciated that aspects of the invention are not limited to being implemented on the computer system as shown in FIG. 21. Various aspects of the invention can be practiced on one or more computers having a different architectures or components than that shown in FIG. 21.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 2100. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, the routing processes can manage data retrieval from database partitions, merge responses, and return results as appropriate to the client, among other operations.

There can be other computer systems that perform functions such as hosting replicas of database data, each server hosting database partitions can be implemented as a replica set, among other functions. These systems can be distributed among a communication system such as the Internet. One such distributed network, as discussed below with respect to FIG. 23, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring dual phase commit operations for updates.

Figure 23:
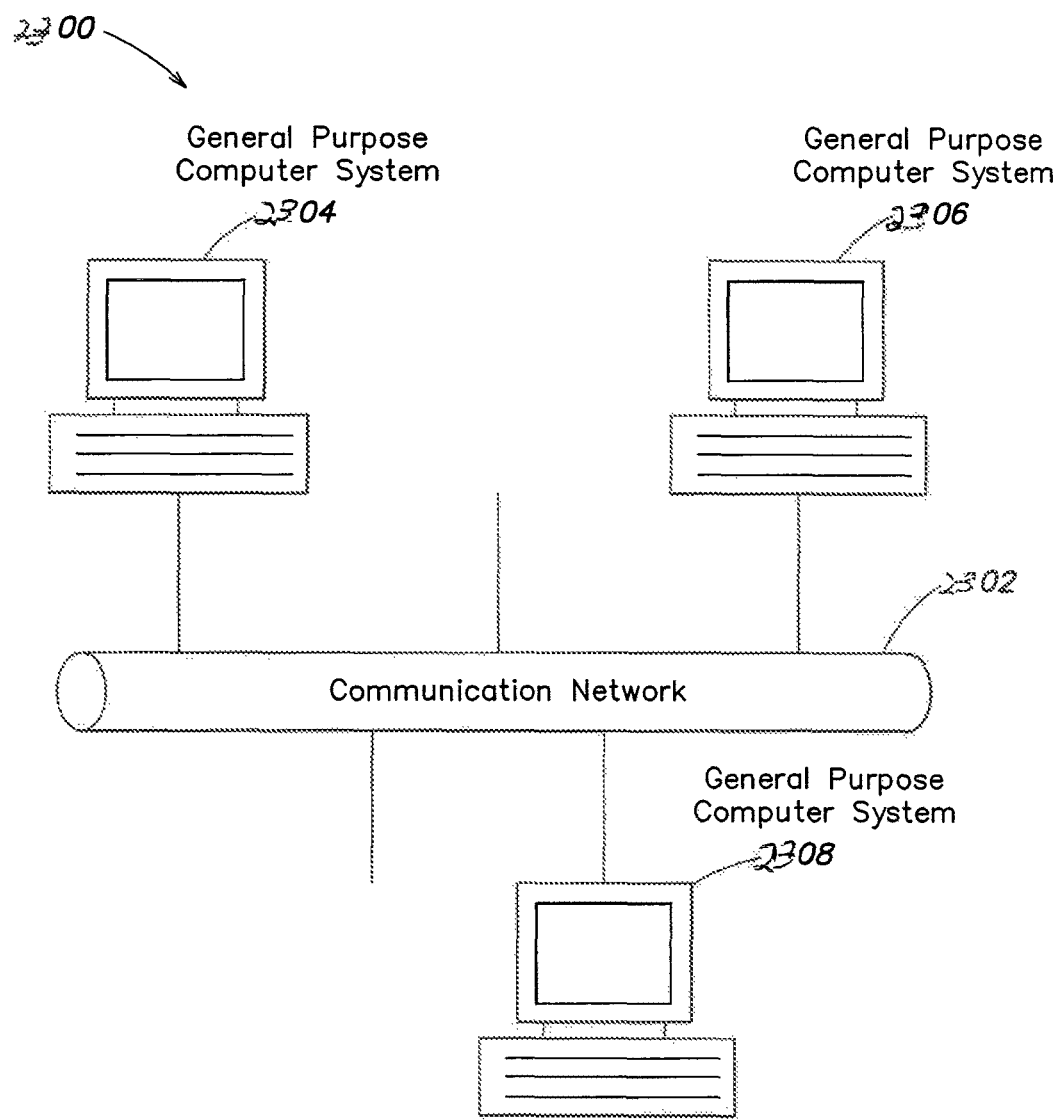
FIG. 23 is a block diagram of an example distributed database system in which various aspects of the present invention can be practiced.

FIG. 23 shows an architecture diagram of an example distributed system 2300 suitable for implementing various aspects of the invention. It should be appreciated that FIG. 23 is used for illustration purposes only, and that other architectures can be used to facilitate one or more aspects of the invention.

System 2300 may include one or more specially configured general-purpose computer systems distributed among a network 2302 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

In an example of one such system, one or more computer systems 2304, 2306, and 2308 are configured to be nodes in a shard cluster. The shard cluster set is configured to response to client requests for database access. In one setting, access to the database occurs through various APIs and associated drivers. It should be understood that the one or more computer systems 2304, 2306, and 2308 can also be used to execute routing processes, monitoring processes, rebalancing operations, determining distributions database data, etc. In one example, client computer systems can interface with computer systems 2304-2308 via an Internet-based interface.

In another example, a system 2304 can be accessed through a browser program such as the Microsoft Internet Explorer application program, Mozilla's FireFox, or Google's Chrome browser through which one or more websites can be accessed. Further, there can be one or more application programs that are executed on system 2304 that perform functions associated with responding to client interactions. For example, system 2304 may include one or more local databases that are not replicated for storing local configuration and state information on a given node. Local state information can be used to determine eligibility for responding to client requests, hosting metadata copies, as examples.

Network 2302 may also include, as part of a system for optimizing data distribution, one or more server systems, which can be implemented on general-purpose computers that cooperate to perform various functions discussed herein, including migrating database partitions across servers in a shard cluster, reconciling database operations during and/or after migrations, identifying maximum key values in a collection, splitting partitions based on the maximum key value, etc. System 2300 may execute any number of software programs or processes on various hardware and the invention is not limited to any particular type or number of processes. Such processes can perform the various workflows associated with a system for asynchronously replicating distributed database operations.

Certain implementations of a managed database, a shard cluster, and/or a partitioned database can employ any number of the following elements, with each of the elements configured to perform the listed functions individually, collectively, and/or in various combination, with each indent representing a refinement of an element that can also be used individually, collectively, and/or in various combination:

Shard Server configured to host one or more database partitions
    Further configured to receive and respond to database requests
Configuration Server configured to manage metadata associated with the partitioned database
    Further configured to distribute metadata to routing processes
    Further configured to update metadata via highly consistent operation
        Wherein highly consistent operation includes two phased commit updates
    Further configured to control versioning of the plurality of partitions
    Further configured to assign version numbers to the split partitions
    Further configured to verify split occurred properly
    Further configured to verify migration occurred properly
    Further configured to assign version in response to verification Routing process configured to received database request as a single interface and direct requests either to targeted shards or globally
    Further configured to determined if target or global request is required based on the received data request Balancing process configured to redistribute database partitions across any shard servers in the database
    Further configured to monitor distribution of data across the partitioned database
    Further configured to monitor distribution of data based on partition counts for each server hosting database partitions
    Further configured to redistribute partitions from most loaded to least loaded servers
    Further configured to rebalance partitions until difference between most and least <=2

Database partitions defined by ranges of database keys and/or key patterns
    Wherein the partitions are "chunks" of data
    Wherein the partitions are "shards" of data
        Wherein the shard of data is a chunk of data Replica Sets configured to provide automatic failover functionality
    Wherein a database server hosting a database partition, chunk, and/or cluster can be implemented as a replica set Partition component configured to detect a partition size that exceeds a size threshold, split the partition into at least a first and a second partition and control a distribution of data within the first and the second partition based on a value for a database key associated with the data in the partition, wherein controlling the distribution includes minimizing any data distributed to the second partition based on a maximum value for the database key associated with the data in the partition.
    Further configured to identify a collection comprising a group of database partitions having a sequential database key wherein controlling the distribution of data occurs in response to an identification of the sequential database key
    Further configured to define the first partition having a minimum key value and a maximum key value less than or equal to the maximum key value for the partition's data, define the second partition range to include values greater than or equal to the maximum key value Migration component configured to migrate partitions between servers hosting database partitions
    Further configured to migrate partitions responsive to partition splitting
    Further configured to determine a distribution of the plurality of partitions across the plurality of servers, in response to splitting
    Further configured to migrate a partition to a least loaded server
    Further configured to deny write operations to data within the partition.

Reconciliation component configured to log database operations received on partitions during at least one of a migration operation and a splitting operation
    Further configured to update at least one partition in response to the completion of a respective migration and splitting operation Additionally, the operations and/or functions identified with respective components are not intended to be mutually exclusive. The operations and/or functions disclose with respect to one component can be executed by other disclosed components, either by configuring a component to perform the operation directly or by incorporating various components into other components.

Certain implementations of a managed database, a shard cluster, and/or a partitioned database can be configured to respond to client data requests as if a single database were responding to the requests. According to some embodiments, operations can be resolved by a routing to process to target specific partitions and/or the servers hosting the partitions with the necessary data. Additional global operations can be run against all the partitions where specific partitions cannot be targeted. In one implementation, operations on a sharded system can be configured to fall into one of two categories: global and targeted.

For targeted operations, routing processes communicate with a very small number of shards, in some examples a single shard to return responsive data. Global operations involve the routing process reaching out to all (or most) shards in the system. The following table shows various operations and their type for an example implementation of a partitioned database system. The table assumes a shard key of for the queried collection of {x:1}. Requests can be targeted based on the received request having a queried property in common with the key used to organize the collection. In some embodiments, routing processes can also resolve internal indexes in the collection to target specific requests to specific partitions and/or shard servers.

| Operation | Type |
| --- | --- |
| db.foo.find( { x : 300 } ) | Targeted |
| db.foo.find( { x : 300, age : 40 } ) | Targeted |
| db.foo.find( { age : 40 } ) | Global |
| db.foo.find( ) | Global |
| db.foo.find(...).count( ) | Variable |
| db.foo.find(...).sort( { age : 1 } ) | Global |
| db.foo.find(...).sort( { x : 1 } ) | Global |
| db.foo.count( ) | Global |
| db.foo.insert( <object> ) | Targeted |
| db.foo.update( { x : 100 }, <object> ) | Targeted |
| db.foo.remove( { x : 100 } ) | |
| db.foo.update( { age : 40 }, <object> ) | Global |
| db.foo.remove( { age : 40 } ) | |
| db.foo.ensureIndex(...) | Global |

According to some embodiments, globally executed request—those directed all shards in a database can be delivered to each shard, which execute queries and sort locally at the receiving shard. The returned data from the responding shard are merges and communicated to the, for example, the client. Execution of the merge operation can be proceed without loading the whole data set into memory since each shard sorts locally. Thus, the results can be returned to the client incrementally, and based on a request to received the sorted results.

Examples Shard Replica Operations

According to some embodiments, environments implementing a sharded database system with replica sets for each shard server reduce various database operations to manipulation of replica sets roles assigned to nodes within replica sets or by adding additional nodes to replica sets.

According to one embodiment, data duplication strategies can be implemented within sharded databases environments by adding nodes or manipulating roles within members of replica sets. For example, upon adding a new node to a replica set, replica set operations duplicate data existing on the primary to the newly added secondary. Likewise, a first secondary node of a first replica set can be transitioned into a second replica set. In one implementation, the secondary node transition can also include a protection scheme to enable existing data and records to be preserved during the transition to the new replica sets, so that the first secondary node can maintain a copy of the first replica set and eventually a copy of the data served by the second replica set.

In some examples, a back up on a secondary node can be generated such that the system assigns secondary nodes to insure at least one secondary node is isolated from the other nodes of a replica set. In some settings, replica sets are implemented to position the nodes of the replica sets close to an analyzed data demand (e.g., optimizing location of responding members of a replica set based on location of client request). In some embodiments, disaster recovery concerns can be implemented on the system to automatically locate at least one secondary node outside a system defined threshold distance from other nodes of the replica set, irrespective of geo-positioning optimizations. In further embodiments, the system can be configured to insure geographic distribution of nodes within a replica set. In some examples, the system can create new secondary nodes based on a distance from other nodes in the replica sets.

According to one embodiment, data merge processes can be executed by transitioning nodes between existing replica sets. For example, an existing secondary node can be re-assigned to a new replica set. In response to the re-assignment, the database of the new replica set in copied to the secondary node. Existing data on the secondary node (e.g., prior to re-assignment) can be protected such that the transitioned node includes copies of two databases or two shards of data. Assigning the secondary node a primary role results in replication of both copies of the database across its replica set.

According to another embodiment, a computing system can operate as more than one node in more than one replica set. In some examples, a computer system can have multiple replica set roles with respect to different replica sets.

According to another embodiment, various shards and/or the replica sets implementing the shards can execute predictive sharding to facilitate zero cost sharding. For example, as chunks of data within a shard grow, the system can be configured to identify chunks that reach a percentage of a system maximum size. The system can analyze the chunk and historical growth to determine when a new chunk will be needed. In some embodiments, the system can pre-allocate a new chunk when an existing chunk meets 75% of a system defined maximum chunk size. The system can predict key values for pre-allocation that will be assigned when the chunk sized is 90-95% of the maximum sized chunk. The system can be configured to leave additional room for growth on the existing chunk (e.g., based on edits made to existing records) while allocating and assigning resources for the new chunk. The pre-allocation and facilitate generation and movement of new chunks having no data, and thus "zero costs" to move.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for managing a large distributed database, the system comprising:
    at least one processor operatively connected to a memory, the at least one processor configured to execute a plurality of system components from the memory, wherein the plurality of system components comprise:
    a configuration component configured to organize a plurality of database partitions and assign a key value or key pattern to new data added to the database greater than previously used key values or patterns;
    a shard server configured to host one or more of the plurality of database partitions, wherein the shard server further comprises a replica set, which includes a primary system and at least two secondary systems for replication of a primary copy of the one or more of the plurality of the database partitions to secondary copies of the one or more partitions;
    wherein the configuration component is further configured to:
        manage cloning of the one or more partitions by adding configuration information for a new computer system into configuration information for the replica set implementing the shard server hosting the one or more partitions,
    wherein the replica set is configured to split the one or more partitions into additional partitions by filtering at least some data from the one or more partitions into the additional partitions, and a partition component configured to:
  detect a partition size for at least one of the plurality of database partitions that exceeds a size threshold;
  split the at least one of the database partitions into at least a first and a second partition; and
  control a non-uniform distribution of data within the first and the second partition based on unique values for database keys associated with the data within the at least one of the plurality of database partitions, wherein controlling the non-uniform distribution includes maximizing any data distributed to the first partition and minimizing any data distributed to the second partition based on a maximum value for the database keys or database key pattern associated with the data in the at least one of the plurality of database partitions;
a routing component configured to:
  route new data that would have been directed to the at least one partition prior to the split to the second partition.

2. The system according to claim 1, wherein the partition component is further configured to:
  assign at least any data in the at least one of the plurality of database partitions having associated database key values less than the maximum value to the first partition; and
  assign at least any data in the at least one of the plurality of database partitions having database key values greater that the maximum value to the second partition.

3. The system according to claim 2, wherein the partition component is further configured to:
  identify database partitions having a sequential database key.

4. The system according to claim 1, wherein the system further comprises a plurality of shard servers, wherein the plurality of servers are configured to host the plurality of database partitions.

5. The system according to claim 1, further comprising a migration component configured to migrate database partitions between a plurality of servers configured to host the database partitions.

6. The system according to claim 5, further comprising a rebalancing component configured to determine a state of the database based on a distribution of the plurality of partitions across the plurality of servers, wherein the rebalancing component is further configured to migrate at least one partition in response to the state indicating an imbalanced distribution of partitions.

7. The system according to claim 5, further comprising a routing component configured to route database requests to identified partitions, wherein the routing component is further configured to identify partitions based, at least, on key values associated with the data request.

8. The system according to claim 5, further comprising a configuration component configured to manage metadata information associated with each of the plurality of partitions, the metadata information including a defined range of key values associated with each partition.

9. The system according to claim 8, wherein the configuration component is further configured to replicate the metadata across any routing component of the system.

10. The system according to claim 1, wherein maximizing any data distributed to the first partition includes distributing data to the first partition until a threshold is reached.

11. A computer-implemented method for managing a distributed database, implementing a sharded data architecture and replica set configuration of computer systems hosting the distributed database, the method comprising:
  organizing, by a computer system, a plurality of database partitions and assigning a key value or key pattern to new data added to the database greater than previously used key values or patterns;
  hosting, by a shard server, one or more of the plurality of database partitions, wherein the shard server comprises a replica set;
  replicating, by the replica set, the one or more of the plurality of database partitions from a primary system to at least two secondary systems that comprise the replica set;
  cloning, automatically, the one or more of the plurality of database partitions by adding a new computer system to the replica set;
  splitting, the one more of the plurality of database partitions into at least one additional partition during the act of cloning, wherein the act of splitting includes filtering at least some data from the one or more of the plurality of database partitions into the at least one additional partition;
  monitoring, by the computer system, a distributed database including a plurality of database partitions, wherein at least one of the plurality of database partitions includes a contiguous range of data from the database;
  detecting, by the computer system, a partition size of the at least one of the plurality of database partitions exceeds a size threshold;
  splitting, by the computer system, the at least one of the plurality of database partitions into at least a first and a second partition; and
  controlling, by the computer system, a non-uniform distribution of data within the first and the second partition based on unique values for database keys associated with the data in the at least one of the plurality of database partitions, wherein controlling the non-uniform distribution includes minimizing any data distributed to the second partition based on a maximum value for the database keys associated with the data in the at least one of the plurality of database partitions; and
  routing, by the computer system, new data that would have been directed to the at least one partition prior to the split to the second partition.

12. The method according to claim 11, wherein the act of minimizing any data distributed to the second partition includes acts of:
  assigning at least any data in the at least one of the plurality of database partitions having database key values less than the maximum value to the first partition; and
  assigning at least any data in the at least one of the plurality of database partitions having database key values greater that the maximum value to the second partition.

13. The method according to claim 11, wherein the method further comprises hosting the distributed database on a plurality of servers, wherein the act of hosting the distributed database includes hosting the plurality of database partitions on the plurality of servers.

14. The method according to claim 11, further comprising an act of identifying a sequential database key, wherein the act of controlling is executed responsive to the act of identifying the sequential database key.

15. The method according to claim 14, further comprising an act of migrating database partitions between the plurality of servers.

16. The method according to claim 14, further comprising acts of:
- determining a state of the distributed database based on a distribution of the plurality of partitions across the plurality of servers; and
- migrating at least one partition in response to the state indicating an imbalanced distribution of partitions.

17. The method according to claim 14, further comprising an act of routing database requests to identified partitions, wherein the act of routing includes identifying partitions based, at least, on key values associated with the data request.

18. The method according to claim 14, further comprising an act of managing metadata information associated with each of the plurality of partitions, wherein the metadata information includes a defined range of key values associated with the data contained in each partition.

19. The method according to claim 18, further comprising an act of replicating the metadata across any routing component of the system.

20. The method according to claim 18, further comprising an act of updating the metadata information in response to splitting the at least one of the plurality of database partitions into at least the first and the second partition.

21. A system for managing a large distributed database, the system comprising:
- a distributed database;
- at least one processor operatively connected to a memory, the at least one processor configured to execute a plurality of system components from the memory;
- a configuration component, executed by the at least one processor, configured to organize the distributed database into a plurality of database partitions, wherein the configuration component provides data routing information for accepting and routing client requests to the plurality of database partitions;
- a shard server configured to host one or more of the plurality of database partitions, wherein the shard server further comprises a replica set,
- wherein the replica set comprises:
  - a primary node and at least two secondary nodes for replication of a primary copy of the one or more of the plurality of the database partitions to secondary copies of the one or more partitions hosted on the secondary nodes; and wherein the replica set is configured to replicate data operations within the replica set based on an eventually consistent model;
- a recovery component, executed by the at least one processor, configured to:
  - automatically establish a new primary node in the distributed database system in response to a replication failure, wherein automatically establishing includes executing functions to establish one of the plurality of secondary nodes as the new primary node, and delete replicated write operations from the new primary node received from the former primary node to establish a point of consistency within the database between the new primary node and the remaining secondary nodes as a new current state of the database; and
- a partition component configured to control a non-uniform distribution of data during splitting of at least one of the plurality of database partitions into a first and a second partition based, at least in part, on unique values for database keys associated with the data in the at least one of the plurality of database partitions, wherein controlling the non-uniform distribution includes maximizing any data distributed to the first partition and minimizing any data distributed to the second partition based on a maximum value for the database keys associated with the data in the at least one of the plurality of database partitions; and
- a routing component configured to route new data based on having a database key value that exceeds the maximum value to the second partition, wherein the new data is assigned increasing key values relative to existing data.

22. The system of claim 21, wherein the system is configured limit database write operations to respective primary nodes of the replica sets to provide for strong consistency within the distributed database.

23. The system of claim 22, wherein the system is configured to limit database read operations to the respective primary nodes to provide read your own writes consistency.

24. The system of claim 22, wherein the system is configured to provide strong consistency for committed operations, wherein the system is configured to commit operations in response to the operations being replicated to a majority of nodes in a respective replica set.

25. A computer implemented method for managing a large distributed database, the method comprising:
- organizing, by a computer system, a distributed database into a plurality of database partitions, wherein organizing the distributed database includes defining data routing information for accepting and routing client requests to the plurality of non-uniform database partitions;
- hosting, by the computer system, one or more of the plurality of database partitions;
- replicating, by the computer system, a respective one of the one or more of the plurality of database partitions between a primary node and at least two secondary nodes;
- automatically recovering a primary node role in the distributed database system in response to a failure of the primary node, wherein the act of automatically recovering includes establishing one of the plurality of secondary nodes as a new primary node, and wherein establishing the one of the plurality of secondary nodes as the new primary node includes deleting replicated write operations by the new primary node received from the primary node to establish a point of consistency within the database between the new primary node and the remaining secondary nodes as a new current state of the database;
- wherein the primary node and at least two secondary nodes host a primary copy of the one or more of the plurality of the database partitions at the primary node, and the act of replicating includes replicating the primary copy to secondary copies of the one or more partitions hosted on the secondary nodes; and
- controlling, by the computer system, a non-uniform distribution of data during an act of splitting at least one of the plurality of database partitions into a first and a second partition based on unique values for database keys associated with the data in the at least one of the plurality of database partitions, wherein controlling the non-uniform distribution includes maximizing any data distributed to the first partition and minimizing any data distributed to the second partition based on a maximum value for the database keys associated with the data in the at least one of the plurality of database partitions;

routing, by the computer system, new data based on having a database key value that exceeds the maximum value to the second partition, wherein the new data is assigned increasing key values relative to existing data.

26. The method of claim 25, wherein the method further comprises limiting database write operations to respective primary nodes to provide for strong consistency within the distributed database.

27. The method of claim 25, wherein the method further comprises limiting database read operations to the respective primary nodes to provide read your own writes consistency.

28. The method of claim 25, wherein the method further comprises committing operations in response to the operations being replicated to a majority of secondary nodes associated with a respective primary node.

* * * * *